US012784076B2

(12) United States Patent
Meli

(10) Patent No.: US 12,784,076 B2
(45) Date of Patent: Nov. 3, 2026

(54) SYSTEM AND METHOD FOR AUTONOMOUS AGENT PRE-SPEND QUALIFICA-TION USING CRYPTOGRAPHICALLY-SECURED BILATERAL ATTESTATION WITH CLOSED-LOOP PERFORMANCE FEEDBACK

(71) Applicant: Peter Meli, Boca Raton, FL (US)

(72) Inventor: Peter Meli, Boca Raton, FL (US)

( * ) Notice: Subject to any disclaimer, the term of this patent is extended or adjusted under 35 U.S.C. 154(b) by 0 days.

(21) Appl. No.: 19/456,646

(22) Filed: Jan. 22, 2026

(65) Prior Publication Data

US 2026/0330509 A1 Oct. 22, 2026

Related U.S. Application Data

(63) Continuation of application No. 19/438,443, filed on Dec. 31, 2025, and a continuation of application No. 19/404,365, filed on Dec. 1, 2025.

(Continued)

(51) Int. Cl.
*G06Q 30/02* (2023.01)
*G06Q 30/0207* (2023.01)

(Continued)

(52) U.S. Cl.
CPC ..... *G06Q 30/0271* (2013.01); *G06Q 30/0225* (2013.01); *G06Q 30/0277* (2013.01); *G06Q 2220/00* (2013.01)

(58) Field of Classification Search
CPC ........... G06Q 30/0271; G06Q 30/0225; G06Q 30/0277
See application file for complete search history.

(56) References Cited

U.S. PATENT DOCUMENTS 11,876,915 B2 1/2024 Doney et al.
11,971,862 B1 * 4/2024 Han ........................ G06F 16/18

(Continued)

FOREIGN PATENT DOCUMENTS

WO WO2025160388 A1 7/2025

*Primary Examiner* — Scott C Anderson
(74) *Attorney, Agent, or Firm* — LAW OFFICES OF ALOZIE N. ETUFUGH, PLLC; Alozie Etufugh, Esq.

(57) ABSTRACT

A system and method are disclosed for protocol-layer authorization of distributed computational actions using cryptographic attestation and deterministic gateway enforcement. Execution requests originating from autonomous computational entities are subjected to pre-execution eligibility verification, qualification assessment, and authorization gating prior to any resource commitment or state transition. In one embodiment, autonomous agents generate cryptographically bound attestation packages comprising credential identifiers, policy references, and requested authorization scopes. A gateway authorization layer performs parallel validation operations including credential verification against an agent registry, qualification score computation consistent with behavioral qualification engines, and atomic resource allocation using compare-and-swap primitives. Authorization decisions or outcomes are immutably recorded in tamper-evident data structures, and outcome data is collected through closed-loop feedback mechanisms that update qualification policies using privacy-preserving aggregation techniques. The disclosed architecture operates independently of hardware-rooted attestation and maintains cookie-free, personally identifiable information-free operation while enforcing non-bypassable, pre-execution control.

41 Claims, 13 Drawing Sheets

AUTONOMOUS AGENT AUTHORIZATION LANDSCAPE

Related U.S. Application Data

(60) Provisional application No. 63/818,574, filed on Jun. 5, 2025, provisional application No. 63/792,381, filed on Apr. 22, 2025.

(51) Int. Cl.

| | |
|---|---|
| ***G06Q 30/0241*** | (2023.01) |
| ***G06Q 30/0251*** | (2023.01) |

(56) References Cited

U.S. PATENT DOCUMENTS

| | | | | |
|---|---|---|---|---|
| 12,316,753 | B1 | 5/2025 | Dahme et al. | |
| 2024/0370865 | A1 * | 11/2024 | Bernardi ................ | G06Q 20/36 |
| 2025/0307436 | A1 | 10/2025 | Doyle et al. | |
| 2025/0307877 | A1 * | 10/2025 | Craft ...................... | G06Q 10/02 |
| 2025/0373451 | A1 | 12/2025 | Jungerman et al. | |

* cited by examiner

AUTONOMOUS AGENT AUTHORIZATION LANDSCAPE

ENFORCEMENT GATEWAY INTERNAL ARCHITECTURE

ATTESTATION TOKEN STRUCTURE & NONCE LINKAGE

IMMUTABLE LEDGER & HASH-LINKED STRUCTURE

CLOSED-LOOP FEEDBACK & FEDERATED LEARNING

SEQUENCE DIAGRAM: AUTHORIZATION FLOW

Complete authorization process demonstrating sub-50ms latency requirement

DISTRIBUTED BUDGET VERIFIACTION
Consistent hashing, atomic operations, and double-spend prevention

CONSTANT-TIME CRYPTOGRAPHIC OPERATIONS
Ed25519 signature verification and side-channel attack prevention

TRANSPORT-LAYER SECURITY BINDING
TLS 1.3 mutual authentication with attestation token binding

CORE BEHAVIORAL QUALIFICATION SYSTEM ( PARENT-1 FOUNDATION)

Foundational layer for AI-toAI authorization infrastructure

CLOSED-LOOP FEEDBACK AND CALIBRATION (PARENT-2 + PARENT-1 FOUNDATION)

Privacy-preserving federated learning layer for continuous policy refinement

AI-TO-AI ATTESTATION AND AUTHORIZATION (CIP + PARENT-2 + PARENT-1)
Complete three-layer system: autonomous agent authorization with cryptographic attestation

SYSTEM AND METHOD FOR AUTONOMOUS AGENT PRE-SPEND QUALIFICA-TION USING CRYPTOGRAPHICALLY-SECURED BILATERAL ATTESTATION WITH CLOSED-LOOP PERFORMANCE FEEDBACK

CROSS-REFERENCE TO RELATED APPLICATIONS

This application is a continuation of each of the following applications and claims priority under 35 U.S.C. § 120, as appropriate, to:

U.S. Non-Provisional patent application Ser. No. 19/404,365 filed Dec. 1, 2025, titled, "HYBRID AI-DRIVEN ADVERTISING & SPONSORSHIP SYSTEM WITH REAL-TIME DECISIONING AND ENFORCEMENT ARCHITECTURE", (hereinafter, "the '365 patent application") which claims priority benefit under 35 U.S.C. § 119(e) to U.S. Provisional Patent Application No. 63/792,381, filed Apr. 22, 2025, titled "AVATAR-DRIVEN ADVERTISING & SPONSORSHIP SYSTEM"; and U.S. Non-Provisional patent application Ser. No. 19/438,443 filed Dec. 31, 2025, Titled, "SYSTEM AND METHOD FOR CLOSED-LOOP BEHAVIORAL QUALIFICATION, COMPLIANCE GATING, AND ENGAGEMENT VERIFICATION IN DIGITAL MEDIA CAMPAIGNS" (hereinafter, "the '443 patent application") which claims priority benefit under 35 U.S.C. § 119(e) to U.S. Provisional Patent Application No. 63/818,574, filed Jun. 5, 2025, titled "SYSTEM AND METHOD FOR CLOSED-LOOP BEHAVIORAL QUALIFICATION AND ACTIVATION VERIFICATION", (the '365 patent application, the '443 patent application, Provisional Patent Application Nos. 63/792,381 and 63/818,574, collectively, hereinafter, "Parent Applications"), the entire disclosures of the aforementioned patent applications are herein incorporated by reference in their entireties as if fully stated herein.

This application also claims priority under 35 U.S.C. § 119(e), as appropriate, to:

U.S. Provisional Patent Application No. 63/792,381, filed Apr. 22, 2025, titled "AVATAR-DRIVEN ADVERTISING & SPONSORSHIP SYSTEM"; and U.S. Provisional Patent Application No. 63/818,574, filed Jun. 5, 2025, titled "SYSTEM AND METHOD FOR CLOSED-LOOP BEHAVIORAL QUALIFICATION AND ACTIVATION VERIFICATION", the entire disclosures of the aforementioned patent applications are herein incorporated by reference in their entireties as if fully stated herein.

All subject matter disclosed herein that is supported by the above-identified non-provisional patent applications and provisional patent applications are entitled to the benefit of their respective filing dates under 35 U.S.C. §§ 119(e) and 120. Nothing in this application is intended to, nor should be interpreted to, limit, disclaim, narrow, or otherwise alter the scope of the inventions disclosed in the above-identified non-provisional patent applications or their corresponding provisional patent applications.

STATEMENT REGARDING RELATED APPLICATIONS AND PRIORITY FOUNDATION

This continuation application extends the cryptographically-attested qualification, enforcement, verification, and closed-loop optimization frameworks disclosed in the above-identified applications to autonomous artificial-intelligence agent embodiments. The above-identified applications describe entity-agnostic behavioral qualification architectures—including hybrid rules-based and machine-learning scoring, pre-spend gating, cryptographic tokenization, signature-based reconciliation, distributed ledger recording, and closed-loop optimization—that operate independently of whether signals originate from human-operated systems or automated software entities. The present application applies these disclosed frameworks to autonomous agents while preserving the technical interdependencies and system-governance structures described in the above-identified applications.

Previously Filed Patent Application Disclosures Forming Priority Basis

The '365 patent application, the '443 patent application, and U.S. Provisional Application Nos. 63/792,381 and 63/818,574, incorporated herein by reference in their entireties, disclose:

1. Hybrid Scoring Architectures using rules-based algorithms, machine-learning models, or hybrid combinations to compute qualification scores for "users or avatars," evidencing an entity-agnostic scoring framework.
2. Pre-Spend Qualification and Enforcement Mechanisms applying threshold-based gating, score computation, and pre-exchange interception to prevent unqualified transactions.
3. Cryptographic Attestation, Tokenization, and Verification including digital signatures, nonces, hash-based validation, and immutable authorization records.
4. Signature-Based Behavioral Reconciliation using one-way hash functions, behavioral fingerprints, and similarity-metric comparison.
5. Closed-Loop Feedback Optimization supporting automated model refinement based on verified post-activation outcomes.
6. Distributed Ledger and Audit Frameworks including Merkle structures, append-only logs, and cryptographic audit artifacts.
7. Federated Learning, Secure Aggregation, and Multi-Tenant Coordination enabling cross-system optimization without revealing individual-level data.
8. Unified Scoring Governance (BQS Unity Framework) providing a single governing qualification metric for heterogeneous decision-making entities.

These disclosures define a generalized, entity-agnostic qualification and enforcement architecture capable of operating on any decision-making entity producing behavioral signals.

Autonomous Agent Embodiment as a Species within Disclosed Genus

The present continuation describes autonomous artificial-intelligence agents implementing the same qualification-enforcement-verification-feedback cycle disclosed in the parent applications. Because the parent applications disclose:

- entity-agnostic "user or avatar" processing,
- hybrid ML scoring applicable to any signal-emitting entity,
- cryptographically attested authorization tokens,
- signature-based reconciliation, and
- closed-loop feedback systems.

The autonomous-agent embodiments described herein constitute a species within the genus of systems described in the parent applications. The parent applications' structural and functional disclosures apply identically to autonomous agents performing the same operations.

Priority Entitlement

To the extent subject matter disclosed herein finds written-description and enablement support in the parent applications, such subject matter is entitled to the benefit of the parent applications' respective filing dates under 35 U.S.C. §§ 119(e) and 120. The autonomous-agent embodiments rely on, and are supported by, the parent applications' disclosure of entity-agnostic hybrid scoring, cryptographic attestation, pre-spend enforcement, signature-based reconciliation, unified scoring governance, and closed-loop optimization frameworks that operate equivalently across human-operated systems and autonomous agents.

RELATED PATENT FAMILY

This application forms part of an integrated patent family directed to digital advertising waste prevention, pre-spend behavioral qualification, cryptographic enforcement, and closed-loop verification architectures. The patent family comprises the following related filings:

1. Non-Provisional application Ser. No. 19/404,365, disclosing, inter alia, a unified pre-spend behavioral qualification and enforcement framework encompassing multiple interdependent system components.

2. Non-Provisional application Ser. No. 19/438,443, disclosing, inter alia, the corresponding verification, reconciliation, cryptographic attestation, and closed-loop optimization frameworks that interact with the qualification engine.

Together, the above-identified applications form a coordinated technical architecture comprising twenty-six interrelated inventions, supported by the disclosures in the corresponding provisional applications—U.S. Provisional Application Nos. 63/792,381 (filed Apr. 22, 2025) and 63/818,574 (filed Jun. 5, 2025)—which collectively provide the original written-description foundation for the unified behavioral qualification system.

TECHNICAL FIELD

The present invention relates to systems and methods for secure autonomous-agent authentication, qualification, and transaction authorization. More particularly, the invention pertains to cryptographically-verified pre-spend evaluation and enforcement mechanisms enabling artificial intelligence-to-artificial intelligence (AI-to-AI) interactions, including secure attestation, trust scoring, and verified transaction execution.

RELATIONSHIP TO PARENT APPLICATIONS

The parent applications (U.S. Provisional Patent Application Nos. 63/792,381 and 63/818,574, and their corresponding non-provisional applications) disclose behavioral-qualification systems, cryptographically-secured enforcement mechanisms, signature-based reconciliation techniques, and closed-loop optimization architectures. These disclosures describe an entity-agnostic framework capable of computing qualification scores, enforcing pre-spend authorization rules, generating cryptographic verification artifacts, and refining scoring parameters based on observed outcomes.

The present continuation application extends these disclosed systems to autonomous artificial-intelligence agent embodiments. In these embodiments, autonomous agents perform the qualification, attestation, enforcement, and verification functions using the same hybrid rules-based and machine-learning architectures disclosed in the parent applications. The parent applications' references to qualification of "users or avatars," combined with their disclosure of hybrid scoring models, token-based verification, pre-spend gating mechanisms, pattern-based reconciliation, and closed-loop learning frameworks, provide the technical foundation that supports application of the same system architecture to autonomous software agents.

In the embodiments described herein, the behavioral inputs, trust indicators, and verification signals correspond to agent-generated operational data rather than human-generated interaction data. However, the underlying qualification, attestation, enforcement, and closed-loop optimization mechanisms operate according to the same architectural principles disclosed in the parent applications.

Extension of Avatar-Driven Personalization to Autonomous Agents

The parent applications disclose avatar-driven personalization systems wherein user avatars—represented by loyalty affiliation, engagement parameters, or contextual attributes—serve as privacy-compliant proxies for behavioral qualification. These avatar representations constitute specific embodiments of non-human entities requiring behavioral qualification without direct access to personally-identifiable information. The autonomous agent systems described in this continuation application extend this avatar-based qualification framework to fully autonomous software agents operating in virtual environments, gaming platforms, metaverse ecosystems, and AI-to-AI transaction networks. Where the parent applications compute Behavioral Qualification Scores (BQS) from behavioral inputs and contextual signals associated with avatars, the present application applies the same architectural principles and signal aggregation structures to agent-generated operational telemetry, capability attestations, and transaction history. The technical architecture remains consistent: both avatar-driven and agent-driven systems reuse the disclosed BQS computation modules and scoring architecture from the parent applications. This continuity of technical implementation establishes that autonomous agents constitute agent embodiments of the same qualification-enforcement framework expressly disclosed in the parent specifications.

Unified Coordination Through C, M, E Variables Across all Applications

The parent applications introduce the BQS Unity Framework, which coordinates all qualification decisions through three unifying variables: Coordination (C), Monetization (M), and Engagement (E). This framework operates across the parent applications' multiple coordinated embodiments as disclosed in both parent non-provisional patent applications. The present continuation maintains this unified qualification model: autonomous agent qualification scores are computed using the same C×M×E coordinate system, where C represents inter-agent coordination quality, M represents transaction monetization potential, and E represents sustained engagement patterns. When this Continuation describes cryptographically-attested BQS values propagating through bilateral authentication protocols, those BQS values are computed using the same weighted scoring modules, nonlinear transformation functions, and dynamic threshold adjustment mechanisms disclosed in the parent applications. The coordination variables C, M, and E thus serve as the technical thread unifying the coordinated embodiments across the parent non-provisional patent applications, and the autonomous agent extensions disclosed herein. This mathematical consistency demonstrates that the present application describes implementation of the same unified qualification framework in autonomous agent contexts, rather than introducing a fundamentally different technological approach. In all embodiments, qualification remains governed by coordinated C×M×E scoring, establishing a unified behavioral metric that deterministically drives enforcement and authorization.

Cryptographic Attestation and Bidirectional Verification Support

The parent applications extensively disclose cryptographic verification architectures, including digital signature generation, signature-based reconciliation, and tamper-evident attestation mechanisms for qualification decisions. The parent application disclosures describe systems where: (a) BQS computation engines generate cryptographic signatures binding qualification scores to entity identifiers and timestamps; (b) downstream systems verify these signatures using public key infrastructure; and (c) closed-loop reconciliation compares cryptographically-signed pre-authorization decision(s) (also known as authorization outcome(s)) against actual engagement outcomes. The bilateral attestation protocols described in this continuation extend these cryptographic verification mechanisms to environments wherein attestation is exchanged between two or more autonomous agents, with both requesting agents and authorizing agents exchanging mutually-verifiable attestation artifacts. Where embodiments of the parent applications describe signature propagation from qualification to enforcement systems, the present application implements bidirectional attestation exchanges implemented using the same categories of cryptographic primitives disclosed in the parent applications, including digital signatures, nonce binding, and timestamp-based freshness checks. This represents a refinement of the disclosed verification workflow while relying on the same cryptographic validation model defined in the parent applications. This bidirectional application of the parent applications' disclosed attestation mechanisms finds written description support in the parents' entity-agnostic framework and their explicit disclosure of cryptographic signature generation, propagation, and verification across distributed system components. All embodiments—avatar, user, or autonomous agent—implement the same qualification→enforcement→verification→feedback chain, producing one deterministic control system.

In all embodiments disclosed herein, including avatar-driven, user-driven, and autonomous-agent embodiments, the qualification, attestation, enforcement, and reconciliation functions operate exclusively on behavioral and contextual signals that do not require, contain, or reference cookies, device identifiers, or personally identifiable information. Because the parent applications disclose a privacy-preserving qualification and enforcement architecture that computes Behavioral Qualification Scores (BQS) and post-engagement Qualified Attribution Scores (QAS) using non-PII inputs, the autonomous-agent embodiments necessarily inherit this non-PII constraint as a structural property of the underlying system. No embodiment introduced in this continuation adds identity-resolution, persistent identifiers, or identity-bearing data to the qualification pipeline.

INDUSTRY APPLICATIONS

The systems and methods described herein apply to environments in which autonomous or semi-autonomous software agents perform authenticated, pre-spend authorization actions and exchange cryptographically-verifiable attestation artifacts. Representative operational domains include:

1. Programmatic Transaction and Resource Allocation Systems: Autonomous agents evaluating, negotiating, or authorizing transactions across distributed marketplaces, real-time decisioning platforms, media activation environments, compute resource exchanges, and service capacity markets.

2. Autonomous Financial Transaction Platforms: Agent-based trading, lending, settlement, or payment systems requiring cryptographic identity verification, real-time risk assessment, and pre-transaction authorization before capital commitment or contract execution.

3. Fraud Prevention and Transaction Integrity Enforcement: Enforcement gateways performing agent authentication, behavioral risk scoring, and budget-integrity validation before committing computational, network, or financial resources.

4. Outcome Verification and Performance Attribution Systems: Closed-loop architectures comparing cryptographically-verified transaction outcomes to pre-authorization predictions, enabling continuous refinement of agent qualification models and dynamic policy threshold adjustments.

5. Distributed Autonomous Agent Coordination Networks: Multi-agent environments requiring bilateral or quorum-based authorization protocols, capability attestation exchanges, federated learning coordination, or complex multi-party transaction workflows.

The disclosed systems and methods apply to any autonomous-agent environment requiring cryptographically-verified pre-spend qualification, bilateral authentication, and closed-loop performance validation. The foregoing examples demonstrate representative operational domains without limiting the scope of the claimed invention.

TECHNICAL STANDARDS

Aspects of embodiments of the present invention operates within established technical standards and protocols, including, but not limited to: • Cryptographic Standards: SHA-256 (FIPS 180-4), RSA-2048, ECDSA (FIPS 186-4) • Data Formats: JSON (RFC 8259), JWT (RFC 7519), UUID v4 (RFC 4122) • Network Protocols: HTTPS/TLS 1.3 (RFC 8446), WebSocket (RFC 6455) • Distributed Systems: Byzantine Fault Tolerance (Castro & Liskov, 1999) • Machine Learning: Federated Learning (McMahan et al., 2017) • Blockchain Integration: Merkle Trees (Merkle, 1987), Zero-Knowledge Proofs (Goldwasser et al., 1985)

TECHNICAL PROBLEMS SOLVED

Aspects of embodiments of the present invention specifically address and solve the following technical problems:

1. Replay Attack Prevention: Through cryptographic nonces and expiration timestamps in attestation tokens;
2. Sybil Attack Mitigation: Via agent qualification scoring and budget allocation constraints;
3. Byzantine Fault Tolerance: Using quorum-based consensus for multi-agent transactions;
4. Privacy-Preserving Learning: Through federated learning without raw data exposure;
5. Scalability Bottlenecks: Via distributed enforcement gateways with local caching;
6. Regulatory Compliance: Through immutable ledger integration with cryptographic evidence; and 7. Dynamic Adaptation: Using closed-loop feedback for continuous system improvement.

Improvement to Computer Functionality

Accordingly, aspects of embodiments of the present invention improve the functioning of computer-implemented transaction systems by introducing deterministic, cryptographically-verifiable pre-spend gating between autonomous agents, thereby reducing computational waste from invalid transactions, preventing system resource exhaustion, and enabling parallel processing of agent interactions through distributed enforcement gateways.

BACKGROUND OF THE INVENTION

Field of the Invention

The present invention relates to computer-implemented systems and methods for real-time, pre-spend qualification and verification of machine-to-machine transactions through cryptographically secured autonomous agent attestation protocols. More particularly, the invention concerns deterministic authorization workflows in which autonomous artificial intelligence agents generate, exchange, and validate cryptographically signed attestation tokens prior to resource commitment. These workflows incorporate real-time behavioral-qualification scoring, budget enforcement, and closed-loop feedback mechanisms operating within distributed, privacy-preserving trust frameworks.

Description of Related Art

Modern digital transaction infrastructures—including advertising exchanges, financial trading platforms, resource allocation networks, autonomous decisioning systems, and distributed agent marketplaces—lack mechanisms for verifying the trustworthiness, authority, and behavioral reliability of transacting entities before computational, financial, or network resources are committed. Existing infrastructures rely predominantly on post-spend or post-execution detection methods, meaning invalid or unauthorized transactions are identified only after the underlying system has already consumed resources.

Representative Example: Post-Spend Waste in Digital Advertising. One representative example of this broader systemic issue appears in digital advertising. Independent industry research organizations have reported that a substantial portion of digital advertising expenditure is lost due to fraud, non-human traffic, context violations, and measurement inconsistencies. These losses arise because current platforms authorize spending before determining whether the requesting entity is legitimate, human, trustworthy, or contextually valid. Although financial credits or adjustments may be issued later, the underlying computing, bandwidth, and opportunity costs cannot be recovered.

Limitations of Reactive Enforcement Models. Conventional transaction systems follow a reactive enforcement paradigm. A transaction is executed; signals are collected afterward; fraud, misattribution, or policy violations are identified later; and remediation occurs only after resources have been consumed. This architecture creates inherent inefficiencies because enforcement occurs downstream of resource commitment, and because downstream verification cannot prevent upstream computational and financial waste.

Temporal Disconnect Between Qualification and Authorization. A foundational weakness in existing systems is the temporal disconnect between qualification assessment and authorization. Fraud detection, behavioral anomaly detection, device signature modeling, and policy-compliance checks typically occur only after a transaction has been initiated or completed. Even so-called "real-time" fraud systems operate as inline filters that assess individual events during execution, rather than establishing persistent, cryptographically verifiable trust relationships between entities before resources are allocated or state changes occur.

Absence of Autonomous Agent Trust Models. Existing commercial and technical platforms further assume that the requesting entity is human-operated, human-supervised, or tethered to human behavioral signals. This assumption renders these systems unsuitable for autonomous software agents operating independently at machine speed. Prior-art frameworks do not provide bilateral agent-to-agent authentication, do not support cryptographically verifiable attestation prior to resource commitment, do not compute qualification or risk scores for autonomous agents, and do not employ closed-loop reinforcement mechanisms that adjust authorization logic based on verified post-transaction outcomes. As a result, current architectures cannot establish trust, authority, or behavioral reliability among autonomous agents.

Limitations Across Distributed Transaction Domains. These deficiencies appear across multiple machine-mediated environments, including programmatic transaction systems, autonomous financial platforms, distributed agent marketplaces, federated-learning coordination networks, and real-time resource-allocation infrastructures. In each case, prior-art systems lack integrated mechanisms to authenticate autonomous agents cryptographically prior to authorization, evaluate qualification or behavioral reliability before committing resources, enforce budget and policy constraints deterministically, generate verifiable evidence for each authorization event, or refine agent-level qualification continuously through closed-loop feedback.

Summary of Technical Gap. The absence of pre-spend, cryptographically verifiable, autonomous-agent qualification frameworks leaves existing transaction systems vulnerable to waste, fraud, adversarial manipulation, and resource exhaustion. The present invention addresses these deficiencies by introducing a unified, pre-spend qualification and attestation architecture—described in detail herein—that establishes trust and authorization deterministically before any resource-consuming transaction is executed.

Limitations of Existing Authentication Frameworks

Traditional identity and authentication mechanisms used in digital ecosystems—including cookies, device identifiers, and IP-based heuristics—were developed for human-centric browsing environments rather than autonomous agent ecosystems. Cookie-based tracking is increasingly constrained by privacy-engineering practices and platform-level restrictions, while device identifiers provide only device-level correlation rather than authenticated entity identity. These identifiers can be reset, spoofed, proxied, or blocked, offering little assurance regarding the legitimacy or trustworthiness of the requesting party.

Existing token formats within digital advertising and similar machine-mediated environments also lack cryptographic binding to qualification attributes or behavioral integrity criteria. A transaction request may include audience segments, contextual metadata, or behavioral classifications, but such claims cannot be validated cryptographically by downstream participants. As a result, counterparties cannot independently verify the authenticity, authority, or reliability of the requesting entity.

Moreover, current programmatic transaction infrastructures assume that supply-side and demand-side systems operate within an implicitly trusted consortium. This assumption does not extend to autonomous software agents that initiate, negotiate, and execute transactions independently. Without a mechanism for cryptographically verifying autonomous agent identity, authority delegation, or qualification status, current systems remain vulnerable to impersonation, unauthorized execution, and the inability to attribute responsibility accurately in multi-agent environments.

Post-Spend Detection Versus Pre-Spend Prevention

Most existing fraud-prevention and quality-assurance mechanisms operate retrospectively, evaluating signals only after a transaction has occurred. Bot-detection systems analyze behavioral telemetry collected from embedded scripts after content is delivered; viewability systems determine whether an impression met minimum rendering criteria after the impression cost has already been incurred; attribution systems infer causal influence from historical engagement sequences after the budget has been spent; and content safety verification occurs only after the advertisement or asset has already appeared in a given context.

Although these retrospective systems yield diagnostic insight, they do not prevent invalid or low-quality transactions before resources are consumed. The fundamental limitation of such post-spend approaches is that they operate downstream of resource commitment, leaving upstream compute expenditure, bandwidth allocation, and budget utilization unprotected from invalid or manipulative activity.

Emergence of Autonomous AI Agents

The increasing deployment of autonomous AI agents capable of initiating, evaluating, and executing transactions introduces new trust and accountability challenges that prior-art systems are not designed to address. Modern AI agents can make rapid independent decisions, allocate budget, negotiate transactional parameters, and act on behalf of organizations without continuous human oversight. Yet these agents rarely possess cryptographically verifiable credentials that enable counterparties to authenticate their authority or evaluate their behavioral reliability before approving a transaction.

Complex transactions may involve multiple cooperating AI agents-such as agents that procure resources, agents that validate contextual parameters, agents that measure performance, and agents that enforce policy constraints. Existing infrastructures provide no mechanism for bilateral or multiparty attestation in which each agent cryptographically commits to its role or is bound to verifiable accountability for its contribution. As a result, when an autonomous agent executes a transaction that yields waste, error, or fraud, current systems cannot reliably determine whether the cause was improper training data, flawed decision logic, compromised signals, or adversarial manipulation. The absence of immutable, agent-linked audit trails makes post-event attribution and accountability extremely difficult.

Need for Pre-Spend Qualification Architecture

Given the persistent inefficiencies associated with post-spend detection, the declining viability of traditional tracking identifiers, and the rapid emergence of autonomous AI agents, prior-art systems lack a unified pre-spend qualification architecture capable of preventing waste before resource commitment. Existing infrastructures do not evaluate agent-level trustworthiness, historical reliability, or compliance constraints prior to transaction execution; nor do they establish cryptographically verifiable trust relationships across distributed systems; nor do they provide deterministic enforcement of budget, policy, or threshold requirements before a transaction is authorized.

Prior-art systems also lack mechanisms for bilateral or multi-party attestation in which multiple agents cryptographically affirm their roles in a coordinated transaction, and they do not incorporate closed-loop feedback mechanisms that refine future qualification logic based on verified post-transaction outcomes. Without these capabilities, modern transaction systems remain reactive rather than preventive, and cannot ensure transaction integrity, trust, or accountability in environments dominated by autonomous, machine-speed decision systems.

Prior Art Deficiencies

A review of the prior art as understood at the time of the earliest priority date reveals no systems that provide an integrated architecture combining pre-spend qualification, cryptographic autonomous-agent attestation, real-time budget enforcement, multi-agent coordination, and closed-loop feedback within an AI-native transaction environment. Existing fraud-detection systems analyze completed transactions to identify anomalous or suspicious behavior, operating only after an impression has been served or a transaction has been executed. These systems lack mechanisms for pre-transaction behavioral qualification or authorization gating based on cryptographically verifiable agent credentials.

Post-Transaction Analysis Systems. Prior-art fraud-detection and traffic-quality systems evaluate behavioral or telemetry data only after the transaction has occurred. Although useful for diagnostic purposes, these systems do not disclose pre-authorization scoring, autonomous-agent verification, or cryptographic binding of behavioral attributes to authorization decisions/authorization outcomes. They provide no mechanism for preventing upstream computational, network, or budget expenditures associated with invalid requests.

Digital Rights Management Systems. Digital rights management (DRM) and access-control frameworks protect distributed content using encryption and license-validation mechanisms executed after content delivery or decryption. While effective for access control, these systems do not teach behavioral qualification, pre-spend authorization gating, or agent-to-agent attestation workflows in which autonomous entities verify authority and reliability prior to transaction execution.

Digital Signature and Authentication Frameworks. Cryptographic signature schemes, public-key infrastructure systems, and identity-verification protocols authenticate identity but do not incorporate behavioral qualification scoring, historical-reliability assessment, budget-constraint enforcement, or pre-transaction authorization logic evaluating whether a requesting agent is permitted to execute a given transaction. These systems verify identity alone and do not address behavioral integrity or authorization governance for autonomous agents.

Programmatic Auction and Real-Time Bidding Systems. Real-time bidding (RTB) and programmatic auction platforms evaluate submitted bids but do not implement qualification layers that prevent unverified or untrusted agents from participating. These systems do not disclose cryptographic attestation of agent authority, behavioral reliability, or budget compliance prior to bid transmission, and they lack any mechanism for establishing persistent, verifiable trust relationships among autonomous participants.

Personalization and Targeting Systems. Behavioral targeting and personalization systems rely on device identifiers, cookies, or identifiable user data to select or optimize content. These systems do not teach cryptographically verifiable agent attestation, PII-free qualification scoring, or real-time behavioral assessment independent of device identifiers. They are designed for human-centric identity models and cannot evaluate autonomous-agent reliability or authority.

Inventory Management and Campaign Planning Systems. Systems for inventory reservation and campaign planning describe static or semi-static allocation of resources based on predefined commitments. These systems do not provide real-time behavioral qualification, do not dynamically assess agent reliability prior to authorization, and do not implement cryptographically enforced pre-spend gating logic for autonomous agents.

Integrated Architectural Gap

Across these domains, the prior art does not teach or suggest an integrated architecture combining cryptographically signed autonomous-agent attestation tokens binding agent identity to qualification criteria; real-time computation of agent qualification scores for pre-transaction authorization; pre-spend enforcement of agent-allocated budget and policy constraints; bilateral or multi-agent attestation with quorum-based authorization requirements; closed-loop AI-driven feedback mechanisms refining qualification models based on validated outcomes; and immutable ledger recording of authorization events supported by cryptographic evidence chains.

Background Summary

Accordingly, the prior art fails to provide a unified system capable of real-time, cryptographically verifiable pre-spend qualification and authorization across autonomous agents. The present invention addresses these deficiencies through the agent-attestation, behavioral-qualification, enforcement, and closed-loop verification architecture described herein.

SUMMARY OF THE INVENTION

The present invention provides a unified, cryptographically verifiable pre-spend qualification architecture enabling autonomous or semi-autonomous software agents to authenticate themselves, establish trust, and obtain authorization before any transaction, resource allocation, or financial commitment occurs. The system transforms post-spend detection models into preventive authorization workflows by combining agent attestation, behavioral qualification scoring, budget enforcement, and closed-loop feedback into a single, interdependent control framework.

A. Core Invention

An aspect of an embodiment of the present invention includes a pre-spend enforcement gateway that receives digitally signed attestation artifacts from one or more agents requesting authorization. The gateway verifies agent identity, evaluates qualification scores, enforces budget and policy constraints, and returns an authorization outcome governing whether the proposed action may proceed. The gateway operates deterministically and does not rely on cookies, device identifiers, or human-derived engagement signals.

The enforcement gateway functions as middleware positioned between autonomous agents and downstream transactional systems, ensuring that all agent-initiated requests pass through authentication, qualification, and budget verification prior to execution. This architecture extends the pre-spend behavioral-qualification and closed-loop verification mechanisms disclosed in the parent applications into an AI-native environment.

B. Agent Attestation Tokens (AAT)

Aspects of embodiments of the present invention provide an Agent Attestation Token (AAT) that binds an agent's identity, authorization scope, policy version, and transaction context into a cryptographically verifiable structure. Each AAT includes: (a) an agent identifier; (b) a key identifier; (c) a transaction-specific nonce; (d) a policy-version reference; and (e) a digital signature produced using the agent's private key.

The enforcement gateway validates the AAT prior to any qualification or budget evaluation. Invalid, expired, or revoked attestations result in immediate denial, preventing unauthorized agents from entering the pre-spend pipeline. The system further establishes a cryptographic linkage between the received AAT and any resulting authorization artifact to prevent replay or substitution attacks.

C. Real-Time Agent Qualification Scoring (AQS)

Aspects of embodiments of the present invention provide an Agent Qualification Score (AQS) generated by a scoring engine configured to evaluate agent reliability, behavioral consistency, contextual risk, and historical performance. The scoring engine may employ rules-based logic, machine-learning models, or hybrid techniques consistent with the frameworks disclosed in the parent applications.

AQS values are compared against one or more threshold parameters maintained in a policy registry. Agents whose qualification scores fall below threshold are denied authorization prior to transaction execution, thereby preventing low-quality or high-risk agents from consuming system resources.

D. Budget Enforcement and Allocation Control (AAB)

An Agent-Allocated Budget (AAB) mechanism enforces financial or resource constraints at the pre-spend authorization point. The AAB manager tracks remaining budget availability for each agent and verifies that the proposed transaction value does not exceed the agent's authorized allocation.

If an agent's remaining budget is insufficient, the system denies the request or applies throttling rules until additional budget is provisioned, preventing overspend and ensuring financial accountability across distributed agent populations.

E. Multi-Agent Coordination and Bilateral Attestation

For transactions requiring participation by multiple autonomous agents, the invention provides a multi-agent coordination module that collects attestations from all required parties, verifies quorum requirements, and ensures that each participating agent satisfies qualification and budget criteria.

In bilateral workflows, agents exchange Counter-Attestation Tokens (CAT) that cryptographically commit each agent to the transaction context. The enforcement gateway authorizes the transaction only when all required attestations are valid and mutually consistent.

F. Immutable Ledger Recording

Aspects of embodiments of the present invention may include an immutable ledger that records each authorization decision, including attestation data, qualification evaluations, budget state, and policy versioning information. The ledger is implemented as an append-only, hash-linked structure producing tamper-evident audit trails.

Each ledger entry records the authorization outcome-approve, deny, or throttle enabling retrospective analysis of agent behavior and system performance across distributed deployments.

G. Closed-Loop Feedback for Continuous Learning

Aspects of embodiments of the present invention may include a closed-loop feedback subsystem observes actual transaction outcomes and updates qualification parameters accordingly. Verified outcomes may adjust scoring weights, threshold coefficients, or policy-governance rules.

This feedback mechanism improves qualification accuracy, reduces false positives, and enables dynamic adaptation to evolving agent behavior or environmental conditions.

H. Policy Registry and Governance

A policy registry maintains authorization parameters including qualification thresholds, budget constraints, quorum requirements, revocation entries, and policy-version identifiers. Policy updates are assigned versioned cryptographic identifiers ensuring deterministic enforcement and auditability.

Updated parameters propagate automatically to enforcement gateways, and older attestation artifacts referencing outdated policy versions are invalidated to ensure consistent system-wide governance.

I. Technical Advantages

Aspects of embodiments of the present invention provide several improvements to computer functionality, including: (a) deterministic pre-spend gating that prevents waste before execution; (b) cryptographically verifiable agent identity without reliance on cookies or device identifiers; (c) parallelized authorization workflows enabling sub-50 ms decision latency; (d) tamper-evident auditability through immutable ledger structures; and (e) adaptive scoring models that maintain accuracy through continuous feedback.

J. Applicability

Although particularly relevant to programmatic advertising ecosystems, aspects of embodiments of the present invention apply broadly to any environment in which autonomous agents perform authenticated, pre-authorization transactions, including e-commerce, financial services, supply-chain automation, resource allocation systems, IoT authorization, and distributed computing marketplaces.

K. Relationship to Parent Applications

This continuation patent application builds upon the behavioral-qualification, closed-loop verification, and PII-free attribution mechanisms disclosed in the parent applications by adding autonomous-agent attestation, multi-agent coordination, immutable ledger recording, and agent-specific budget enforcement.

The inventive concept remains unified: deterministic, cryptographically verifiable pre-spend qualification extended from human-centric systems to AI-native agent ecosystems.

Summary of Claimed Subject Matter

An aspect of an embodiment of the present invention contemplates a system for autonomous-agent transaction authorization, comprising: a plurality of autonomous artificial-intelligence agents executing on processors, each configured to generate, for a pending commercial transaction, a cryptographically bound agent-attestation token that includes a transaction identifier, a policy reference, and a digital signature derived from a transaction-specific ephemeral key, where the agent attestation token is bound to a commercial-entity credential, is generated independently of hardware-root or trusted-execution attestation mechanisms and operates independently of hardware-root or trusted-execution attestation mechanisms, where the token attests to agent behavioral qualification rather than software code integrity; an enforcement gateway including processor-executable modules configured to: validate attestation tokens against an agent-registry, compute an agent-qualification score as a weighted function of stored feature vectors whose weighting parameters are referenced by a policy-version hash, and verify that an associated budget allocation remains unspent and within authorized limits, each verification recorded as a cryptographically verifiable budget state; and a decision-orchestration module configured to aggregate validation outputs and generate a pre-spend enforcement token representing an authorization outcome selected from any one of: authorize, deny, or throttle, where the decision-orchestration module is a module of the enforcement gateway.

In aspect of an embodiment of the present invention the system may include an immutable-ledger module configured to record the authorization outcome in a tamper-evident, hash-linked data structure that provides cryptographic proof of each decision without disclosing transaction content, the ledger implementing append-only semantics and cryptographic sealing; where each authorization outcome is cryptographically proven by generating any one of: a hash digest or digital signature over a decision record prior to ledger insertion.

In aspect of an embodiment of the present invention the system may include a closed-loop feedback module configured to receive outcome data from participating agents and update qualification-policy parameters through any one of: secure multi-party computation, equivalent encryption of local updates prior to aggregation, by said decision orchestration module, thereby enabling privacy-preserving federated refinement of authorization policies, where the system improves computer-implemented authorization processing by performing deterministic, cryptographically verifiable pre-spend validation and local enforcement between autonomous agents without reliance on hardware-based trusted-execution, remote-attestation services, or device-identity mechanisms.

In an aspect of an embodiment of the present invention, the enforcement gateway of the system may achieve authorization decision latency of less than 50 milliseconds from attestation token receipt to enforcement token generation through parallel execution of the validation, computation, and verification operations.

In an aspect of an embodiment of the present invention, the validating attestation tokens of the system may include constant-time cryptographic comparison operations to prevent timing side-channel attacks, where signature verification completes in deterministic time independent of input values.

In an aspect of an embodiment of the present invention, the hash-linked data structure of the system may include a Merkle tree with batched root computation, where each batch contains a predetermined number of authorization decisions and generates a Merkle root anchored to the immutable ledger.

In an aspect of an embodiment of the present invention, the budget allocation verification of the system may include one or more of: a. querying a distributed budget registry implementing consistent hashing across multiple nodes, b. performing atomic compare-and-swap operations to reserve budget allocation, and c. recording budget reservation state with cryptographic proof prior to generating the enforcement token, thereby preventing double-spend conditions in distributed environments.

In an aspect of an embodiment of the present invention, the nonce linkage of the system may include one or more of: a. extracting a unique nonce value from the originating attestation token, b. incorporating the nonce value into the enforcement token structure, and c. computing a cryptographic binding hash as SHA-256 (attestation_nonce||enforcement_token_id||timestamp), where the enforcement token is invalid without matching the originating attestation nonce.

In an aspect of an embodiment of the present invention, the process of computing the agent-qualification score may include calculating an Agent Qualification Score (AQS), where $AQS=\Sigma(w_i \times f_i)$ for i=1 to N, and where: a. $w_i$ are weighting coefficients retrieved using the policy-version hash as an index, b. $f_i$ are normalized feature values representing agent performance metrics, and c. N represents number of feature dimensions defined by the policy version.

In an aspect of an embodiment of the present invention, the weighting coefficients of the AQS calculation process may include: $w_1$ for historical transaction performance ($0.4 \le w_1 \le 0.6$), $w_2$ for advertiser-specific quality metrics ($0.2 \le w_2 \le 0.4$), and $w_3$ for cross-agent collaboration patterns ($0.1 \le w_3 \le 0.3$), where $w_1+w_2+w_3=1.0$.

In an aspect of an embodiment of the present invention, the secure multi-party computation may include one or more of: a. each participating agent computing a local gradient $\nabla_i$ based on observed transaction outcomes, b. encrypting the local gradient using homomorphic encryption or secret sharing, c. transmitting encrypted gradients to an aggregator node, d. computing a global update $\Delta global=\Sigma(\nabla_i)/n$ where n is the number of participating agents, and e. updating policy parameters as $w_i$,new=$w_i$,old+$\alpha \times \Delta$global where $\alpha$ is a learning rate, where individual agent transaction data remains encrypted throughout the aggregation process.

In an aspect of an embodiment of the present invention, the process of updating qualification-policy parameters may include one or more of: a. generating a new policy-version hash upon parameter modification, b. requiring quorum consensus of at least $\lceil n/2 \rceil+1$ cryptographic signatures from participating agents before activating the new policy version, and c. invalidating attestation tokens that reference the prior policy-version hash, thereby automatically deprecating stale authorizations without maintaining explicit revocation lists.

In an aspect of an embodiment of the present invention, each pre-spend enforcement token is cryptographically chained to its originating attestation token through nonce linkage, preventing reuse of stale or superseded attestations.

In an aspect of an embodiment of the present invention, each authorization decision is cryptographically proven by generating any one of: a hash digest, a digital signature over the authorization decision record prior to ledger insertion.

Another aspect of an embodiment of the present invention contemplates a computer-implemented method for autonomous-agent pre-spend authorization, comprising, executing, on at least one processor configured to perform a predefined set of basic operations in response to receiving a corresponding basic computer executable instruction selected from a predefined native instruction set of codes, steps of: generating, by a first autonomous artificial-intelligence agent executing on one or more processors, a cryptographically bound agent-attestation token that includes a transaction identifier, a policy reference, and a digital signature derived from a transaction-specific ephemeral key, the agent attestation token being bound to a commercial-entity credential and generated independently of hardware-root or trusted-execution attestation mechanisms; transmitting the agent-attestation token to an enforcement gateway; executing, by the enforcement gateway, processor-implemented operations comprising: (i) validating the agent-attestation token against an agent registry, (ii) computing an agent-qualification score as a weighted function of stored feature vectors identified by a policy-version hash, and (iii) verifying that an associated budget allocation is unspent and within authorized limits; where the agent attestation token operates independently of hardware-root or trusted-execution attestation mechanisms, where the token attests to agent behavioral qualification rather than software code integrity; and generating, by a decision-orchestration module, a pre-spend enforcement token representing an authorization outcome selected from any one of: authorize, deny, or throttle, where the decision-orchestration module is configured to aggregate validation outputs, where the decision-orchestration module is a module of the enforcement gateway.

In another aspect of an embodiment of the present invention, the computer-implemented method may include a step of recording, in an immutable ledger, the authorization outcome in a tamper-evident, hash-linked data structure that provides cryptographic proof of each decision without disclosing transaction content, the immutable ledger implementing append-only semantics and cryptographic sealing, where each authorization outcome is cryptographically proven by generating any one of: a hash digest or digital signature over the decision record prior to ledger insertion.

In another aspect of an embodiment of the present invention, the computer-implemented method may include a step of asynchronously collecting, by a closed-loop feedback module, outcome data from prior transactions and updating qualification-policy parameters through secure multi-party computation or equivalent encryption of local updates prior to aggregation, where updated parameters affect subsequent authorization decisions through the policy-version hash, where the method improves computer-implemented authorization processing by performing deterministic, cryptographically verifiable pre-spend validation and closed-loop policy refinement between autonomous agents through local validation and enforcement operations without reliance on hardware-based trusted-execution, remote-attestation services, or device-identity mechanisms.

In another aspect of an embodiment of the present invention, each of the enforcement tokens of the computer-implemented method is cryptographically chained to its originating attestation token through nonce linkage, thereby preventing reuse of stale or superseded attestations, and where each authorization decision is cryptographically proven by generating a hash digest or digital signature over the decision record.

In another aspect of an embodiment of the present invention, the nonce linkage of the computer-implemented method may include one or more of: extracting a nonce value from the originating attestation token generated by the first autonomous artificial-intelligence agent, embedding the extracted nonce in the pre-spend enforcement token structure, and computing a cryptographic binding as SHA-256 (attestation_nonce||enforcement_token_id||timestamp), where the enforcement token is invalid without matching the originating attestation nonce.

In another aspect of an embodiment of the present invention, executing the processor-implemented operations by the enforcement gateway of the computer-implemented process may include performing attestation-validation, qualification-scoring, and budget-verification operations in any one of: parallel, partially parallel execution paths, thereby reducing authorization latency relative to sequential evaluation.

In another aspect of an embodiment of the present invention, the step of validating the agent-attestation token may include performing Ed25519 signature verification using constant-time cryptographic comparison operations that complete in deterministic time independent of input values to prevent timing side-channel attacks.

In another aspect of an embodiment of the present invention, the step of budget allocation verification may include one or more of: querying a distributed budget registry using consistent hashing for node selection, performing atomic compare-and-swap operations to reserve the budget allocation, and generating a cryptographic budget-verification record, thereby preventing double-spend conditions in distributed environments.

In another aspect of an embodiment of the present invention, the step of authorization decision recording in the immutable ledger may include one or more of: a. generating a decision record containing decision_id, agent_id, timestamp, and authorization_outcome, b. computing a record hash as SHA-256(previous_record_hash||current_decision_record), c. appending the decision record and record hash to the immutable ledger, and d. updating a Merkle tree root for batched integrity verification.

In another aspect of an embodiment of the present invention, the step of computing the agent-qualification score may include calculating $AQS=\Sigma(w_i \times f_i)$ for i=1 to N, where: $w_i$ are weighting coefficients retrieved using the policy-version hash, $f_i$ are normalized feature values representing agent performance metrics, and N is the number of feature dimensions defined by the current policy version.

In another aspect of an embodiment of the present invention, the step of updating of qualification-policy parameters may include one or more of: a. computing local performance gradients for each participating agent, b. encrypting local gradients using homomorphic encryption or secret sharing, c. aggregating encrypted gradients to compute a global update, and d. updating policy parameters as $w_i$,new=$w_i$, old+$\alpha \times \Delta$global where $\alpha$ is a learning rate, where individual agent transaction data remains encrypted throughout the aggregation process.

In another aspect of an embodiment of the present invention, the step of updating qualification-policy parameters may further include one or more of: generating a new policy-version hash upon parameter modification, requiring quorum consensus of at least $\lceil n/2 \rceil+1$ agent signatures before activating the new policy version, and invalidating attestation tokens referencing the prior policy-version hash, thereby automatically deprecating stale authorizations without explicit revocation lists.

In another aspect of an embodiment of the present invention, the step of transmitting the attestation token may include one or more of: a. establishing an authenticated, encrypted communication channel using TLS 1.3 or higher, b. performing mutual authentication with X.509 certificates, and c. embedding the attestation nonce and policy-version hash within the TLS 1.3 session transcript during the handshake, thereby cryptographically binding transport-layer security to transaction-layer authorization and preventing token substitution attacks.

A further aspect of an embodiment of the present invention contemplates a computer program product comprising a non-transitory computer readable medium having computer executable instructions stored therein for operation of an autonomous-agent pre-spend authorization system comprising executing, on at least one processor configured to perform a predefined set of basic operations in response to receiving a corresponding basic computer executable instruction selected from a predefined native instruction set of codes, computer readable program code for: generating, by a first autonomous artificial-intelligence agent executing on one or more processors, a cryptographically bound agent-attestation token that includes a transaction identifier, a policy reference, and a digital signature derived from a transaction-specific ephemeral key, the agent attestation token being bound to a commercial-entity credential and generated independently of hardware-root or trusted-execution attestation mechanisms, where the agent attestation token operates independently of hardware-root or trusted-execution attestation mechanisms, where the token attests to agent behavioral qualification rather than software code integrity; transmitting the agent-attestation token to an enforcement gateway; executing, by the enforcement gateway, processor-implemented operations comprising: (i) validating the agent-attestation token against an agent registry, (ii) computing an agent-qualification score as a weighted function of stored feature vectors identified by a policy-version hash, and (iii) verifying that an associated budget allocation is unspent and within authorized limits; where the agent attestation token operates independently of hardware-root or trusted-execution attestation mechanisms, where the token attests to agent behavioral qualification rather than software code integrity; and generating, by a decision-orchestration module, a pre-spend enforcement token representing an authorization outcome selected from any one of: authorize, deny, or throttle, where the decision-orchestration module is configured to aggregate validation outputs, where the decision-orchestration module is a module of the enforcement gateway.

In a further aspect of an embodiment of the present invention, the computer program product may include computer readable program code for recording, in an immutable ledger, the authorization outcome in a tamper-evident, hash-linked data structure that provides cryptographic proof of each decision without disclosing transaction content, the immutable ledger implementing append-only semantics and cryptographic sealing; where each authorization outcome is cryptographically proven by generating any one of: a hash digest or digital signature over the decision record prior to ledger insertion.

In a further aspect of an embodiment of the present invention, the computer program product may include computer readable code for asynchronously collecting, by a closed-loop feedback module, outcome data from prior transactions and updating qualification-policy parameters through secure multi-party computation or equivalent encryption of local updates prior to aggregation, where updated parameters affect subsequent authorization decisions through the policy-version hash, where the computer readable program code, as executed, improves authorization processing by performing deterministic, cryptographically verifiable pre-spend validation and closed-loop policy refinement between autonomous agents through local validation and enforcement operations without reliance on hardware-based trusted-execution, remote-attestation services, or device-identity mechanisms.

In a further aspect of an embodiment of the present invention, each enforcement token of the computer program product where is cryptographically chained to its originating attestation token through nonce linkage, thereby preventing reuse of stale or superseded attestations, and where each authorization decision is cryptographically proven by generating a hash digest or digital signature over the decision record.

In a further aspect of an embodiment of the present invention, the computer readable program code for nonce linkage includes computer readable program code for one or more of: a. extracting a nonce value from the originating attestation token generated by the first autonomous artificial-intelligence agent, embedding the extracted nonce in the pre-spend enforcement token structure, and computing a cryptographic binding as SHA-256 (attestation_nonce||enforcement_token_id||timestamp), where the enforcement token is invalid without matching the originating attestation nonce.

In a further aspect of an embodiment of the present invention, the computer readable program code for executing the processor-implemented operations by the enforcement gateway includes computer readable program code for performing attestation-validation, qualification-scoring, and budget-verification operations in any one of: parallel, partially parallel execution paths, thereby reducing authorization latency relative to sequential evaluation.

In a further aspect of an embodiment of the present invention, the computer readable program code for validating the agent-attestation token includes computer readable program code for performing Ed25519 signature verification using constant-time cryptographic comparison operations that complete in deterministic time independent of input values to prevent timing side-channel attacks.

In a further aspect of an embodiment of the present invention, the computer readable program code for budget allocation verification includes computer readable program code for one or more of: querying a distributed budget registry using consistent hashing for node selection, performing atomic compare-and-swap operations to reserve the budget allocation, and generating a cryptographic budget-verification record, thereby preventing double-spend conditions in distributed environments.

In a further aspect of an embodiment of the present invention, the computer readable program code for authorization decision recording in the immutable ledger includes computer readable program code for one or more of: a. generating a decision record containing decision_id, agent_id, timestamp, and authorization_outcome, b. computing a record hash as SHA-256(previous_record_hash||current_decision_record), c. appending the decision record and record hash to the immutable ledger, and d. updating a Merkle tree root for batched integrity verification.

In a further aspect of an embodiment of the present invention, the computer readable program code for computing the agent-qualification score includes computer readable program code for calculating $AQS=\Sigma(w_i \times f_i)$ for i=1 to N, where: $w_i$ are weighting coefficients retrieved using the policy-version hash, $f_i$ are normalized feature values representing agent performance metrics, and N is the number of feature dimensions defined by the current policy version.

In a further aspect of an embodiment of the present invention, the computer readable program code for updating of qualification-policy parameters includes computer readable program code for one or more of: a. computing local performance gradients for each participating agent, b. encrypting local gradients using homomorphic encryption or secret sharing, c. aggregating encrypted gradients to compute a global update, and d. updating policy parameters as $w_i$,new=$w_i$,old+$\alpha \times \Delta$global where $\alpha$ is a learning rate, where individual agent transaction data remains encrypted throughout the aggregation process.

In a further aspect of an embodiment of the present invention, the computer readable program code for updating parameters further includes the computer readable program code for one or more of: a. generating a new policy-version hash upon parameter modification, b. requiring quorum consensus of at least $\lceil n/2 \rceil+1$ agent signatures before activating the new policy version, and c. invalidating attestation tokens referencing the prior policy-version hash, thereby automatically deprecating stale authorizations without explicit revocation lists.

In a further aspect of an embodiment of the present invention, the computer readable program code for transmitting the attestation token includes computer readable program code for one or more of: a. establishing an authenticated, encrypted communication channel using TLS 1.3 or higher, b. performing mutual authentication with X.509 certificates, and c. embedding the attestation nonce and policy-version hash within the TLS 1.3 session transcript during the handshake, thereby cryptographically binding transport-layer security to transaction-layer authorization and preventing token substitution attacks.

In a further aspect of an embodiment of the present invention, the non-transitory computer-readable medium may be one or more of: solid-state storage devices, magnetic storage devices, or optical storage devices, where the computer readable code are executable on processors comprising one or more of x86 architectures, ARM architectures, or RISC-V architectures.

Aspects of embodiments of the present invention provide a cryptographically verifiable, privacy-preserving architecture that enables autonomous or semi-autonomous artificial-intelligence agents to perform pre-spend transaction qualification prior to any resource commitment. The claimed subject matter extends the behavioral-qualification and closed-loop enforcement mechanisms disclosed in the parent applications by incorporating agent-attestation protocols, distributed pre-authorization gateways, nonce-linked authorization chains, immutable audit ledgers, federated qualification refinement, and dynamic policy governance.

In one aspect of an embodiment of the present invention, the claimed subject matter includes Agent Attestation Tokens (AAT), which are ephemeral and cryptographically signed artifacts that bind an autonomous agent's identity, policy-version reference, and transaction-specific nonce to a particular authorization request. These tokens operate independently of hardware-root or trusted-execution environments and establish a verifiable, PII-free trust foundation for autonomous agent transactions.

In another aspect of an embodiment of the present invention, the claimed subject matter includes a distributed Pre-Spend Enforcement Gateway configured to validate AATs, compute real-time Agent Qualification Scores, enforce Agent-Allocated Budgets, and generate Pre-Spend Enforcement Tokens indicating authorization outcomes. The gateway operates with deterministic, sub-50-millisecond latency, enabling high-volume, time-critical authorization workflows.

In a further aspect of an embodiment of the present invention, the claimed subject matter includes a nonce-linked authorization chain that cryptographically binds each authorization decision to its originating attestation. This linkage, computed using a secure hash such as SHA-256 over the attestation nonce, authorization identifier, and timestamp, prevents replay of previously issued attestations and ensures transactional integrity.

The claimed subject matter additionally includes an immutable ledger subsystem implemented as an append-only, hash-linked structure with Merkle-tree batching. The ledger records authorization outcomes, qualification scores, budget states, and policy-version identifiers in a tamper-evident format suitable for regulatory audit, forensic analysis, and long-term accountability.

In another aspect of an embodiment of the present invention, the claimed subject matter includes a federated, closed-loop feedback mechanism that refines qualification-model parameters through encrypted aggregation of performance-gradient updates supplied by participating agents. This subsystem enables continuous improvement of qualification accuracy while preserving the privacy of individual agent data.

The claimed subject matter further includes a dynamic policy-governance architecture in which authorization thresholds, scoring coefficients, budget constraints, and quorum requirements are version-hashed and cryptographically signed. Policy updates propagate deterministically across distributed gateways, and attestation artifacts referencing superseded policy versions are automatically invalidated without the need for explicit revocation lists.

Collectively, the claimed system, method, and computer-readable-medium embodiments implement a unified inventive concept centered on deterministic, cryptographically verifiable pre-spend qualification between autonomous agents. These embodiments extend the parent inventions from human-centric behavioral analysis to AI-native transactional ecosystems while maintaining structural and functional continuity with the previously disclosed qualification-enforcement-feedback architecture.

BRIEF DESCRIPTION OF THE DRAWINGS

The accompanying drawings illustrate embodiments of the invention and, together with the description, serve to explain the principles thereof.

The foregoing drawings are not necessarily drawn to scale. Reference numerals may correspond to like elements across figures where applicable.

DETAILED DESCRIPTION OF THE DRAWINGS

The accompanying drawings, which are incorporated in and constitute a part of this specification, illustrate embodiments of the invention and, together with the description, serve to explain the principles of the invention.

Figure 1:
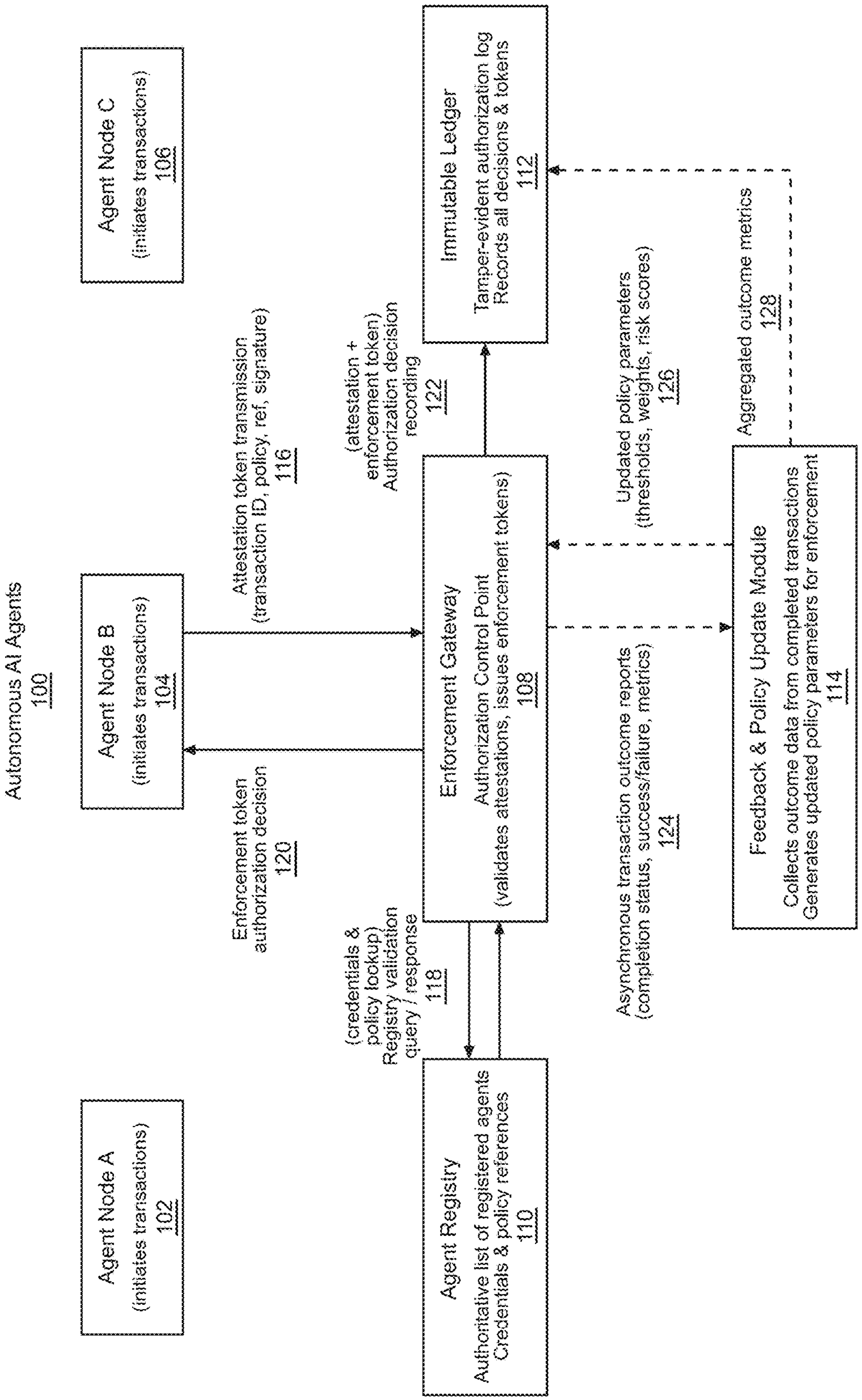
FIG. 1 illustrates an Autonomous Agent Authorization Landscape, depicting a high-level system architecture showing different components/elements according to aspects of embodiments of the present invention.

FIG. 1—Autonomous Agent Authorization Landscape

Referring now to FIG. 1, an Autonomous Agent Authorization Landscape [100] is shown according to aspects of embodiments of the present invention. Autonomous Agent Authorization Landscape [100] depicts the high-level system architecture illustrating the complete authorization ecosystem for autonomous AI agents, revealing how cryptographically verified pre-spend qualification prevents transaction waste through coordinated interaction among five core system components. The architecture demonstrates a closed-loop system where authorization decisions are informed by historical performance, enforced through cryptographic verification, recorded immutably, and continuously refined through feedback mechanisms.

At the agent layer, three representative Agent Nodes demonstrate heterogeneous agent deployment: Agent Node A [102] initiates transactions independently, Agent Node B [104] operates under similar authorization protocols, and AgentNode C [106] represents additional agent diversity, collectively embodying the autonomous AI agents [100A] that require pre-spend qualification before executing transactions. These agents generate cryptographically signed attestation tokens containing transaction intent, policy references, and unique nonces to prevent replay attacks.

Agent Node A [102] transmits an Attestation token [132] to Enforcement Gateway [108], demonstrating the primary authorization request path. This attestation token contains the agent's digital signature, transaction metadata, policy version hash, and a unique nonce. Simultaneously, Agent Node B [104] sends an Attestation token [116] labeled "agent ID, policy ref" containing similar authorization credentials but for a different transaction context. Agent Node C [106] likewise generates its Attestation token [154], illustrating concurrent multi-agent operation where the system must handle parallel authorization requests with sub-50 ms latency requirements.

Enforcement Gateway [108] serves as the Authorization Control Point, functioning as middleware that validates attestations, issues enforcement tokens, and performs three parallel verification operations: (1) cryptographic signature validation using Ed25519 to authenticate agent identity; (2) Agent Qualification Score (AQS) computation using weighted feature vectors to assess agent reliability; and (3) budget verification through distributed atomic operations to ensure agents have not exceeded spending limits. The gateway exchanges authorization requests [118] and policy lookups with Agent Registry [110], which maintains the authoritative list of registered agents, their credentials, public keys for signature verification, and current policy references. Agent Registry responds to these queries, enabling the gateway to verify that requesting agents are properly registered, their credentials remain valid, and they reference current policy versions.

Agent Registry [110] receives Updated policy references [120] from Feedback & Policy Update Module [114], creating a governance path where refined policy parameters flow back into the registry for distribution to enforcement gateways. This ensures that all authorization decisions utilize the most current policy calibrations derived from verified transaction outcomes.

Upon completing validation, scoring, and budget verification, Enforcement Gateway [108] generates enforcement tokens [140] (general flow reference) and specifically transmits an enforcement token [122] to Immutable Ledger [112] for Authorization decision recording. This enforcement token contains the authorization decision (AUTHORIZE, DENY, or THROTTLE), the cryptographically bound nonce linking back to the attestation token, decision reason codes, and the gateway's digital signature. The immutable recording occurs asynchronously to minimize authorization latency, allowing the gateway to immediately return the enforcement token to the requesting agent while audit logging proceeds in parallel.

Immutable Ledger [112] maintains a Tamper-evident authorization log that Records all decisions & tokens using hash-linked chains and Merkle tree structures. Each authorization decision becomes part of an immutable record where any tampering would break cryptographic chain integrity. The ledger outputs a Ledger decision stream (Pay Licenses) [136], which represents the flow of completed and verified authorization decisions that can inform downstream analytics, compliance reporting, and dispute resolution.

Feedback & Policy Update Module [114] collects outcome data from completed transactions and Generates updated policy parameters for enforcement, implementing the closed-loop learning system. This module receives Asynchronous transaction outcome reports (completion status, success/failure, metrics) [124] from Enforcement Gateway [108] and Aggregated outcome metrics [128] from Immutable Ledger [112], representing verified post-transaction performance data. Feedback loop [142] demonstrates the critical continuous learning pathway where observed transaction outcomes flow to the Feedback & Policy Update Module, which computes performance deltas comparing predicted qualification scores against actual results, aggregates these deltas across multiple agents using privacy-preserving secure multi-party computation, and generates Updated policy parameters (thresholds, weights, risk scores) [126] that flow back through the system. This creates an adaptive authorization system that improves over time by learning from verified outcomes while maintaining strict privacy guarantees through federated learning mechanisms that never expose individual agent transaction data.

The complete system operates as an integrated authorization ecosystem where attestation flows from agents to gateway [132, 116, 154], validation queries flow between gateway and registry [118], enforcement tokens flow from gateway to ledger [122], outcome data flows from gateway and ledger to feedback module [124, 128, 136], and refined policy parameters flow from feedback module back to registry and gateway [126, 120], creating a continuously improving closed-loop system that prevents waste through pre-spend qualification while adapting to changing conditions through privacy-preserving learning mechanisms.

Figure 2:
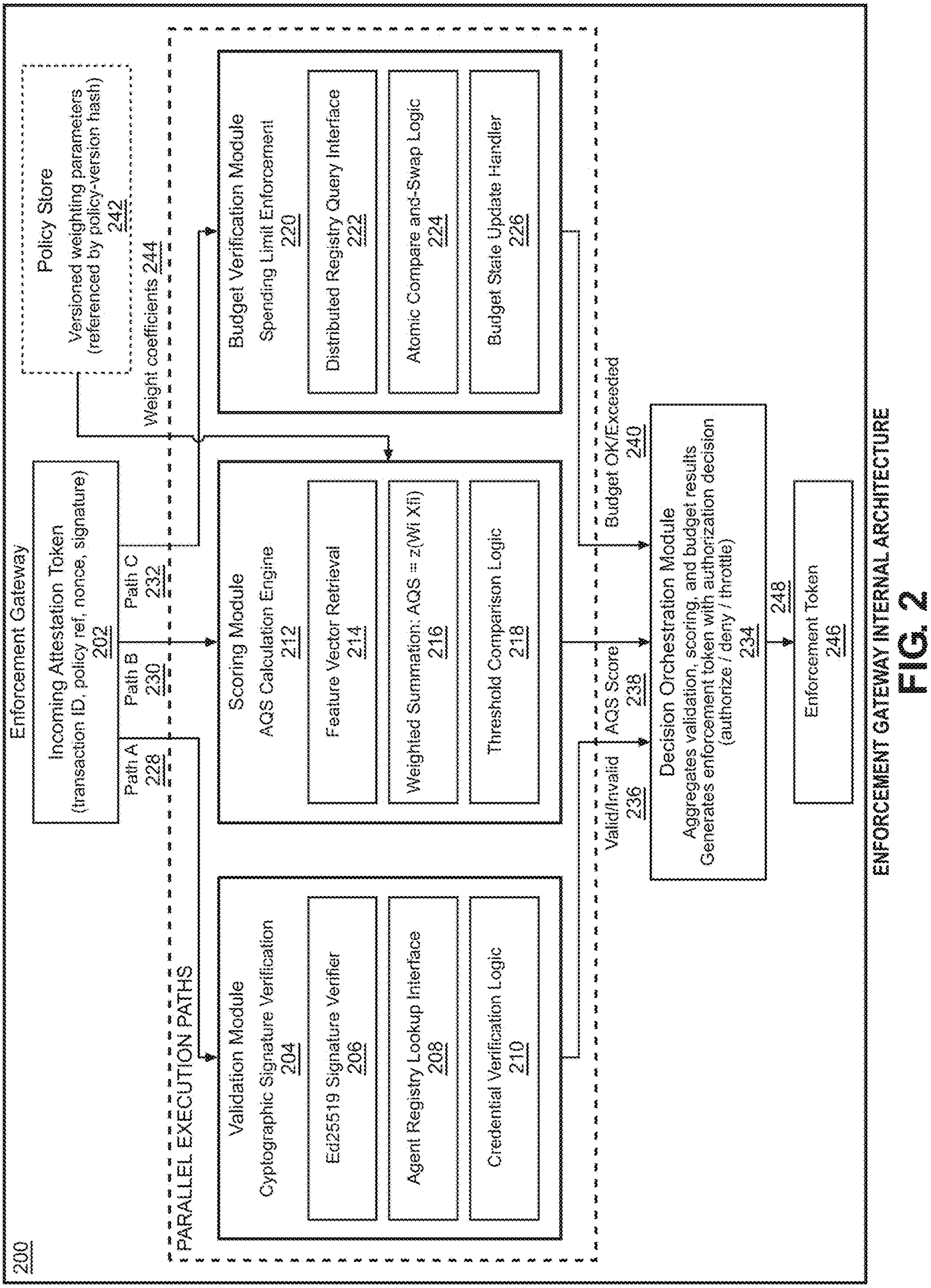
FIG. 2 illustrates an Enforcement Gateway Internal Architecture with an Enforcement Gateway and other components/elements according to aspects of embodiments of the present invention.

FIG. 2—Enforcement Gateway Internal Architecture

Referring now to FIG. 2, an Enforcement Gateway Internal Architecture [200] is shown according to aspects of embodiments of the present invention. FIG. 2 illustrates the internal architecture of Enforcement Gateway [200], revealing the sophisticated parallel processing system that achieves sub-50 ms authorization latency through concurrent execution of independent verification operations across three specialized modules. The architecture demonstrates how complex authorization logic involving cryptographic verification, machine learning-based scoring, and distributed budget enforcement can be orchestrated to produce real-time decisions suitable for high-throughput transaction systems.

In an aspect of an embodiment of the present invention, Enforcement gateway [200] receives two primary inputs at the top of the architecture: Incoming Attestation Token [202] containing the cryptographically signed authorization request with transaction ID, policy ID (referenced by hash), unique nonce for replay prevention, and the agent's Ed25519 digital signature binding all fields; and Transaction Metadata [202A] providing contextual information including transaction amount, transaction type, and timestamp. These inputs arrive simultaneously and immediately trigger bifurcated processing through PARALLEL EXECUTION PATHS, specifically Path A [228] and Path B [230], representing the architectural decision to minimize latency through concurrent rather than sequential verification.

Validation Module Processing Path: In an aspect of an embodiment of the present invention, Transaction Metadata [202A] flows via the labeled path [202A→230] to Path A [228], while Attestation Token [202] simultaneously enters Validation Module [204], which performs Cryptographic Signature Verification to authenticate agent identity and verify request integrity. Within this critical security module, three sub-components execute coordinated verification: Ed25519 Signature Verifier [206] implements constant-time cryptographic verification of the agent's digital signature, extracting the message payload and signature from the attestation token, retrieving the agent's 32-byte Ed25519 public key from the registry, and executing the Ed25519_verify (public key, message, signature) function with deterministic execution time immune to timing-based side-channel attacks. This verification produces a binary TRUE/FALSE result indicating cryptographic validity. Agent Registry Lookup Interface [208] queries distributed Agent Registry [208A] to retrieve not only the public key but also the agent's current authorization status, registration validity, and credential revocation state, ensuring that even cryptographically valid signatures from revoked or suspended agents are rejected. Credential Verification Logic [210] applies policy-based rules to determine whether the agent's credentials authorize the specific transaction type requested, checking that the agent has appropriate permissions, has not exceeded rate limits, and references a valid (non-expired) policy version. These three parallel sub-operations within the Validation Module collectively produce Signature/Registry/Credential status [236A], which flows to the Decision Orchestration Module as one of three required inputs for final authorization determination.

Scoring Module Processing Path: Concurrently with validation, the second parallel path processes behavioral qualification through machine learning-based scoring. Feature Vectors [238A] containing normalized behavioral metrics labeled (U, M, E, . . . ) representing historical user engagement patterns, model efficiency indicators, and enforcement compliance metrics flow into Scoring Module [212], which serves as the AQS Calculation Engine. Policy Store [242] in the upper right maintains Versioned weighting parameters (referenced by policy-version hash), ensuring that the AQS computation uses the exact policy configuration that was active when the agent generated its attestation token, preventing policy version mismatches that could lead to inconsistent authorization decisions across distributed gateway instances. Feature Vector Retrieval component [214] accesses the agent's historical performance database, extracting metrics including: $f_1$ (Historical Transaction Performance) measuring completion rates, engagement quality, and success metrics; $f_2$ (Advertiser-Specific Quality Metrics) evaluating brand safety compliance, content alignment, and policy adherence; $f_3$ (Cross-Agent Collaboration Patterns) assessing multi-agent coordination quality and data sharing behavior; and $f_4 \ldots f_n$ (Additional Feature Dimensions) extensible to N dimensions as defined by the active policy version. These raw metrics undergo normalization to a standardized 0.0-1.0 range for consistent comparison across diverse metric types.

Policy Store [242] sends a conflicting coefficients Request [244] to trigger weight coefficient retrieval for the specific policy version referenced in the attestation token. This query returns weight coefficients ($w_1, w_2, w_3, \ldots, w_n$) constrained such that $\Sigma w_i=1.0$, ensuring the weighted sum produces a bounded qualification score. The Weighted Summation component [216] executes the core AQS calculation: AQS=$\Sigma(w_i \times f_i)$ for i=1 to N, where $w_i$ represents the policy-defined weight for feature dimension i and $f_i$ represents the normalized feature value. For example, with three features and weights $w_1=0.50$, $w_2=0.30$, $w_3=0.20$, and feature values $f_1=0.85$, $f_2=0.92$, $f_3=0.78$, the computation yields AQS=(0.50×0.85)+(0.30×0.92)+(0.20×0.78)=0.425+0.276+0.156=0.857.

Threshold Comparison Logic [218] then evaluates this computed AQS against policy-defined thresholds retrieved from the Policy Store: if AQS≥threshold_auth (typically 0.75), the preliminary recommendation is AUTHORIZE; if threshold_throttle≤AQS<threshold_auth (typically 0.50≤AQS<0.75), the recommendation is THROTTLE; if AQS<threshold_throttle, the recommendation is DENY. The resulting AQS Score [238] flows to the Decision Orchestration Module, providing the behavioral qualification input that complements cryptographic and budget verification.

Budget Verification Module Processing Path: The third parallel path enforces spending limit constraints through distributed atomic operations. Transaction Metadata [202A] flows via Path B [230] to Budget Verification Module [220], which performs Spending Limit Enforcement to ensure agents do not exceed allocated budgets. Budget Store (spend, limits) [240A] provides budget state data, but the critical enforcement occurs through distributed registry operations. Distributed Registry Query Interface [222] uses consistent hashing to deterministically route the budget verification request to the specific registry node responsible for this agent's identifier (computed as SHA-256(agent_id) mod 0xFFFF to select from hash ranges like x0000-0x3FFF, 0x4000-0x7FFF across multiple registry nodes). This distributed approach eliminates centralized bottlenecks and enables horizontal scalability.

Atomic Compare-and-Swap Logic [224] executes the critical operation that prevents race conditions and double-spend attacks: it atomically compares the agent's current available budget against the requested transaction amount and, only if sufficient funds exist, atomically reserves the requested amount for this transaction. The atomic nature is crucial—even if multiple concurrent requests arrive simultaneously for the same agent, only one CAS operation will succeed in reserving budget, with all others failing with "insufficient budget" responses. This prevents scenarios where concurrent requests could collectively exceed available budget if processed independently. Budget State Update Handler [226] processes the CAS result, updating local budget tracking and generating cryptographic verification records for audit logging. Policy Store [242] also injects Policy constraints [246A] (shown in the upper right dashed box) into this module, allowing policies to impose additional spending restrictions beyond simple budget sufficiency (e.g., transaction size limits, velocity limits, daily caps).

The budget verification produces Budget OK/Exceeded [240], which flows to the Decision Orchestration Module as the third required input for final authorization determination.

Decision Aggregation and Token Generation: All three parallel execution paths converge at Decision Orchestration Module [234], positioned at the bottom center of the architecture, which Aggregates validation, scoring, and budget results and Generates enforcement token with authorization decision (authorize/deny/throttle). This module implements hierarchical decision logic with security-first prioritization: (1) if signature verification fails (status [236A] indicates invalid signature or revoked credentials), the decision is immediately DENY regardless of score or budget, as cryptographic authentication failure cannot be overridden; (2) if validation passes but AQS [238]<threshold_throttle, the decision is DENY as the agent is unqualified; (3) if validation passes and AQS≥threshold_throttle but Budget [240] indicates insufficient funds, the decision is DENY as the agent lacks resources; (4) if validation passes, AQS>threshold_auth, and budget is available, the decision is AUTHORIZE; (5) if validation passes, threshold_throttle≤AQS<threshold_auth, and budget is available, the decision is THROTTLE, potentially with reduced priority, delayed execution, or scope reduction.

Decision Orchestration Module [234] generates Enforcement Token [246], which flows via path [248A] labeled "To Agent/Ledger" for delivery to both the requesting agent (for immediate transaction authorization) and the Immutable Ledger (for audit recording). This enforcement token contains: (1) the authorization decision outcome (AUTHORIZE/DENY/THROTTLE); (2) the linked nonce cryptographically bound to the attestation token nonce via SHA-256 hashing, preventing token reuse across different transaction contexts; (3) a unique enforcement token ID for tracking; (4) a timestamp; (5) decision reason codes providing detail on policy references, rate limits, fraud codes, or other factors influencing the decision; (6) a cryptographic binding hash linking the enforcement decision to the original attestation; and (7) the gateway's digital signature authenticating the authorization decision.

The entire architecture from input receipt through parallel validation-scoring-budget processing to decision orchestration and token generation completes in under 50 milliseconds, enabling real-time authorization for high-throughput transaction systems processing thousands of concurrent agent requests. The parallel execution eliminates latency bottlenecks that would arise from sequential processing, while the distributed budget registry and local caching of policy parameters further reduce response times. The result is a high-performance authorization system that never compromises security for speed, maintaining cryptographic verification, behavioral assessment, and budget enforcement in every authorization decision.

Figure 3:
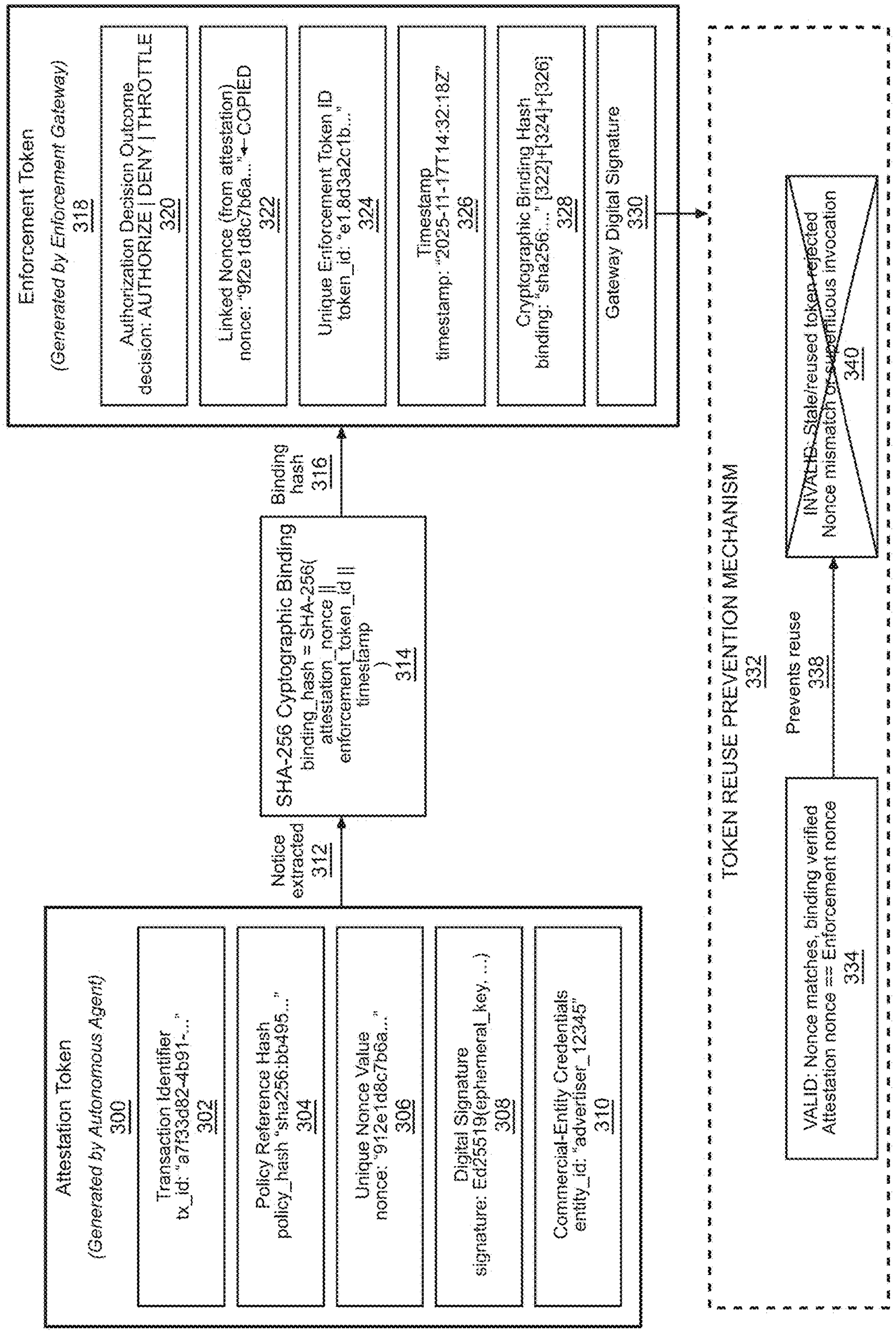
FIG. 3 illustrates an Attestation Token Structure & Nonce Linkage according to aspects of embodiments of the present invention.

FIG. 3—Attestation Token Structure & Nonce Linkage

Referring now to FIG. 3, an Attestation Token Structure & Nonce Linkage is shown according to aspects of embodiments of the present invention. Aspects of embodiments of the present invention detail the cryptographic structure and nonce linkage mechanism that prevents replay attacks and token substitution, revealing how autonomous agents and enforcement gateways establish cryptographically bound authorization sessions immune to man-in-the-middle attacks, token interception, and replay exploitation. The diagram demonstrates the sophisticated cryptographic binding between attestation tokens generated by agents and enforcement tokens generated by gateways, creating an immutable authorization chain where tokens cannot be reused, modified, or substituted without detection.

Attestation Token Structure and Generation: The left side of the diagram shows Attestation Token [300] structure, labeled as "Generated by Autonomous Agent," containing five critical fields that collectively establish agent identity, transaction intent, and anti-replay protection. Transaction Identifier [302] provides a unique reference for this specific authorization request, enabling correlation across system components and audit logs. Policy Reference Hash [304] (shown with truncated value "sha . . . ") contains a SHA-256 hash of the complete policy parameter set (weights, thresholds, risk scores) governing this authorization decision, ensuring the agent and gateway operate under synchronized policy versions and preventing policy version mismatches that could lead to inconsistent authorization logic. Unique Nonce Value [306] (shown with truncated value "e . . . ") represents a cryptographic random value generated specifically for this transaction and never reused, serving as the cornerstone of replay attack prevention—any attempt to retransmit this attestation token in a future transaction context will fail nonce validation. Digital Signature [308] (shown with truncated value "biochemical_key . . . ") contains the agent's Ed25519 signature computed over all preceding fields, cryptographically binding the agent's identity to the transaction request and enabling verification that the attestation has not been tampered with in transit. Commercial-Entity Credential [310] provides business-level authorization context, identifying which commercial entity (advertiser, brand, agency) is responsible for this transaction and enabling policy-based authorization rules that may vary by entity type or relationship.

Cryptographic Binding Mechanism: The center of the diagram shows the critical SHA-256 Cryptographic Binding [314] operation that creates tamper-evident linkage between attestation and enforcement tokens. The attestation token fields flow via the path labeled "Full key" [304→314] into the binding computation, while Nonce [312] (labeled "Cipher" in red) specifically feeds into the cryptographic hash function. The binding computation executes: binding hash=SHA-256(attestation_nonce||enforcement_token_id-||timestamp), creating a cryptographic commitment that ties the enforcement decision inextricably to this specific attestation context. Any attempt to substitute tokens, modify nonces, or replay enforcement tokens in different transaction contexts will fail verification because the binding hash will not match.

The cryptographic binding produces two critical outputs: the "nonce binding hash" flowing via path [324→314] and the "Full hash" [316], which together enable both forward linkage (from attestation to enforcement) and backward validation (verifying enforcement tokens trace to legitimate attestations). These cryptographic proofs flow into the Enforcement Token structure, establishing the authorization chain.

Enforcement Token Structure and Validation: The right side shows Enforcement Token [318] structure, labeled as "Generated by Enforcement Gateway," containing seven fields that collectively provide authorization decision, anti-replay protection, and cryptographic proof of gateway authentication. Authorization Decision Outcome [320] contains the gateway's determination (shown as "OTTLE" representing THROTTLE), explicitly stating whether the requested transaction is authorized, denied, or throttled. Linked Nonce (from attestation) [322] (shown with value "ED") contains the attestation nonce value, cryptographically bound through the binding hash mechanism, creating verifiable linkage between enforcement token and original attestation. Unique Enforcement Token ID [324] provides a distinct identifier for this specific authorization decision, enabling audit trail correlation and duplicate detection. Timestamp [326] (shown as "2025-11-17T14:32:18Z") records the exact moment of authorization decision, enabling temporal validity checks, token expiration enforcement, and audit trail sequencing. Cryptographic Binding Hash [328] (with label "Token verification hash") contains the computed binding hash value, enabling validators to verify that this enforcement token legitimately corresponds to the specific attestation token by recomputing the binding hash and comparing values. Gateway Digital Signature [330] (labeled "invention") contains the enforcement gateway's Ed25519 signature computed over all preceding enforcement token fields, proving that a legitimate gateway (not an imposter) generated this authorization decision and that the token has not been modified after generation.

The enforcement token flows via path [340] labeled "To Ledger/Agent" with intermediate "Token correlation" [318→332], demonstrate that the token simultaneously returns to the requesting agent (enabling transaction execution if authorized) and records to the Immutable Ledger (creating audit trail). The output path labeled [318→332] creates the linkage to the prevention mechanism below.

Token Reuse Prevention Mechanism: The bottom section, enclosed in a dashed box, details TOKEN REUSE PREVENTION MECHANISM [332], which demonstrates the validation logic that prevents replay attacks and token substitution. The mechanism shows two branches representing the binary validation outcome.

The success path [334] shows "✓VALID: Nonce matches, binding verified" in a green box, indicating the validation succeeds when two conditions hold: (1) Attestation nonce==Enforcement nonce, verified by extracting nonces from both tokens and comparing values; (2) binding hash verification passes, confirmed by recomputing binding_hash=SHA-256(attestation_nonce||enforcement_token_id||timestamp) and comparing against the Cryptographic Binding Hash [328] value in the enforcement token. When both checks pass, the system recognizes this as a legitimate authorization session, and the flow via "Prevents reuse" [338] indicates that subsequent attempts to replay this token pair will be rejected because nonce values are marked as consumed after first use.

The failure path [336] shows "√INVALID: Stale/reused token rejected" in a red box, indicating validation fails when: (1) Nonce mismatch occurs—the nonces don't correspond, indicating token substitution attempt or corruption; (2) OR binding hash verification fails—the computed binding hash doesn't match the stored value, indicating token tampering or incorrect token pairing; (3) OR token is superseded—a more recent enforcement token exists for this agent and transaction, indicating replay of stale token. The "Validation result to Gateway logic" arrow demonstrates that the gateway logic receives explicit VALID/INVALID signals and can respond appropriately—accepting valid authorizations and rejecting invalid attempts with appropriate error codes.

The complete cryptographic structure demonstrates defense-in-depth against multiple attack vectors: (1) Replay attacks fail because nonces are single-use and any resubmission is detected; (2) Token substitution fails because enforcement tokens are cryptographically bound to specific attestation contexts via binding hashes; (3) Man-in-the-middle attacks fail because all tokens are digitally signed and signature verification detects tampering; (4) Token forgery fails because only entities possessing private keys (agents for attestation, gateways for enforcement) can generate valid signatures; (5) Temporal attacks fail because timestamps enable expiration enforcement and stale token detection. The result is a robust authorization token architecture providing cryptographic proof of agent identity, transaction intent, gateway authorization, and temporal validity while preventing all common token-based attacks.

Figure 4:
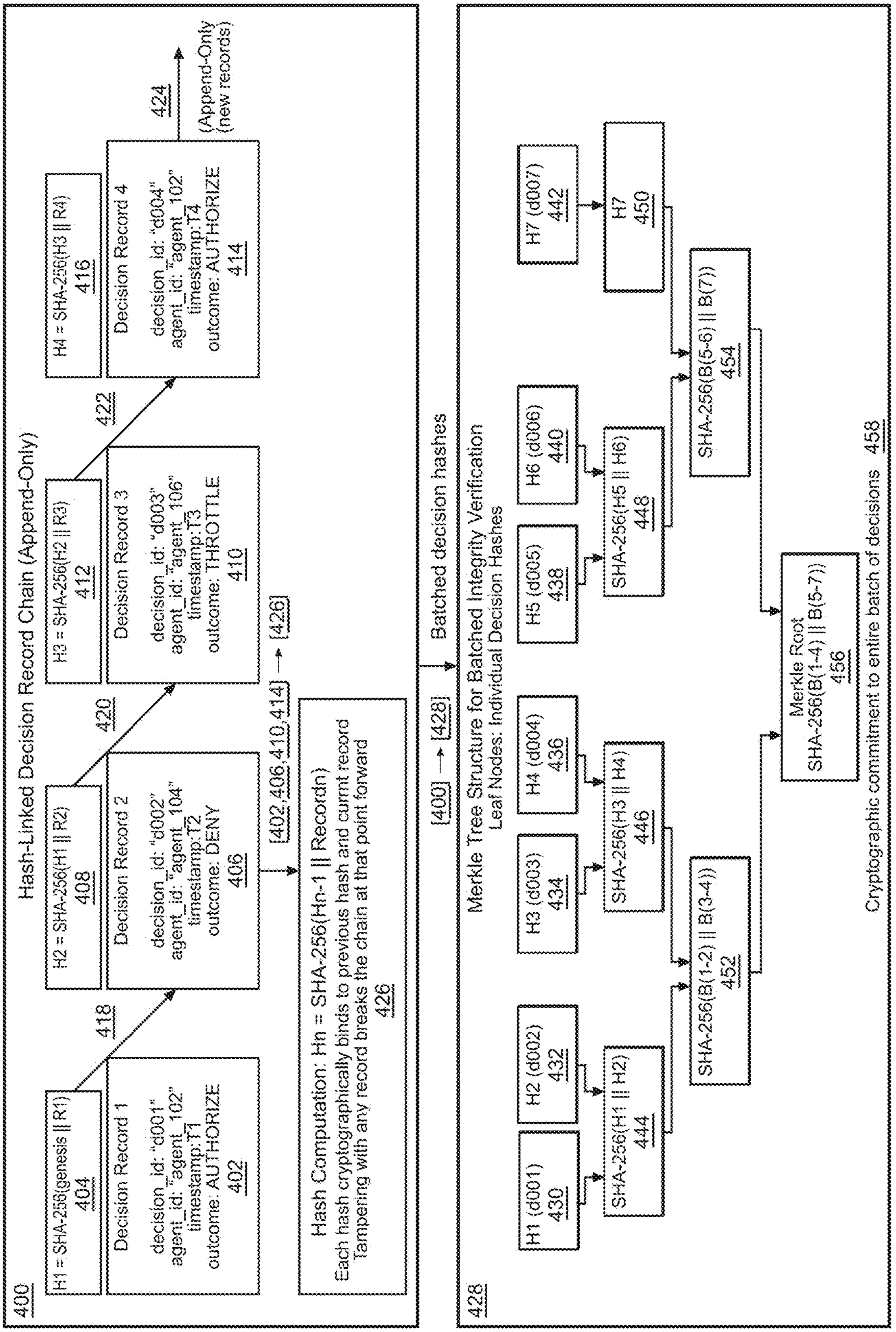
FIG. 4 illustrates an Immutable Ledger & Hash-Linked Structure according to aspects of embodiments of the present invention.

FIG. 4—Immutable Ledger & Hash-Linked Structure

Referring now to FIG. 4 illustrates an Immutable Ledger & Hash-Linked Structure [400] according to aspects of embodiments of the present invention. In an aspect of an embodiment of the present invention, append-only immutable ledger architecture implementing two complementary cryptographic structures—hash-linked chains and Merkle trees—that together provide both sequential auditability and efficient batch verification for authorization decisions, creating a tamper-evident audit trail where any unauthorized modification is immediately detectable through cryptographic integrity checks.

Hash-Linked Decision Record Chain: The top section, labeled Hash-Linked Decision Record Chain (Append-Only) [400], demonstrates sequential record linkage through cryptographic hashing. The chain begins with input from the Enforcement Gateway Decision output [460], representing the flow of authorization decisions requiring immutable recording. The genesis link H0=SHA-256(genesis||R1) [404A] initiates the chain by hashing a genesis block identifier concatenated with the first decision record, producing the initial hash that anchors subsequent chain links. This genesis hash connects to Decision Record 1 [402], containing structured data: decision_id: "d001" (unique identifier), agent_id: "agent_102" (requesting agent), timestamp: T1 (decision time), outcome: AUTHORIZE (authorization decision). Record 1 connects via arrow [418] to the next hash link H1=SHA-256(H0||R2) [408], demonstrating the fundamental hash chain property: each hash incorporates the previous hash and current record data, creating cryptographic dependency.

Decision Record 2 [406] continues the chain with decision_id: "d002", agent_id: "agent_104", timestamp: T2, outcome: DENY, showing heterogeneous decision types recorded uniformly. The chain proceeds via [420] to H2=SHA-256(H1||R3) [412], linking to Decision Record 3 [410] with decision_id: "d003", agent_id: "agent_106", timestamp: T3, outcome: THROTTLE, demonstrating all three authorization decision types recorded in the ledger. The pattern continues via [422] to H3=SHA-256(H2||R4) [416], linking to Decision Record 4 [414] with decision_id: "d004", agent_id: "agent_102", timestamp: T4, outcome: AUTHORIZE, showing that agents can appear in multiple records as they execute multiple transactions. The final record points to Append-Only (new records) [424], indicating the chain continues indefinitely as new authorization decisions arrive.

Record data [462] flows from the decision records into the Hash Computation: Hn=SHA-256(Hn−1||Recordn) [426] box, which provides the formal specification of the chaining operation. The accompanying text explains: "Each hash cryptographically binds to previous hash and current record" and critically "Tampering with any record breaks the chain at that point forward." This property provides tamper-evidence: if an adversary attempts to modify Decision Record 2 (e.g., changing DENY to AUTHORIZE), recomputing H2 will produce a different hash value than what's stored, causing H3's computation to fail verification, and cascading verification failures through all subsequent records. Auditors can detect tampering by recomputing hashes and comparing against stored values—any mismatch indicates compromise.

Merkle Tree Structure for Batch Verification: The hash chain provides sequential integrity but requires O(n) operations to verify n records. For efficient batch verification, the bottom section shows the Merkle Tree Structure for Batched Integrity Verification [428], which enables O(log n) verification of individual records within large batches. The output from the hash chain, labeled [400]→[428] "Batched decision hashes," feeds into the Merkle tree construction, where individual decision hashes become leaf nodes.

The diagram shows seven leaf nodes representing Individual Decision Hashes with hash distribution [464]: H1 (d001) [430], H2 (d002) [432], H3 (d003) [434], H4 (d004) [436], H5 (d005) [438], H6 (d006) [440], and H7 (d007) [442]. These leaf nodes contain cryptographic hashes of individual decision records, serving as the tree foundation. The Merkle tree construction proceeds through Branch Nodes (Combined Hashes) that aggregate child node hashes by concatenation and hashing.

The first level of branch nodes combines leaf pairs: SHA-256(H1||H2) [444] aggregates the first two leaves; SHA-256(H3||H4) [446] aggregates the second pair; SHA-256(H5||H6) [448] aggregates the third pair; and H7 [450] remains singular (odd node count). These four branch nodes then combine at the next level: SHA-256([B1-2]||[B3-4]) [452] aggregates the first two branch nodes (covering decisions d001 through d004), and SHA-256([B5-6]||H7) [454] aggregates the remaining branch nodes (covering d005 through d007).

Finally, these two intermediate nodes converge at the Merkle Root SHA-256([B1-4]||[B5-7]) [456], positioned at the top of the tree structure in a yellow box. Below this, element [458] states "Cryptographic commitment to entire batch of decisions," explaining that the Merkle Root represents a single hash value that cryptographically commits to all seven decision records. Any modification to any single decision—even changing one bit in decision d005—will propagate through the tree, changing H5, then SHA-256 (H5||H6), then SHA-256([B5-6]||H7), and finally the Merkle Root itself. This provides tamper-evidence for the entire batch through a single hash value.

Output [466] "To Audit/Verification" demonstrates the practical application: auditors can verify the integrity of the entire decision batch by recomputing the Merkle Root and comparing against the stored value. More importantly, to verify a single decision (e.g., d003), an auditor only needs the decision record plus its Merkle proof path (H4, SHA-256([B1-2]), SHA-256([B5-6]||H7)), enabling O(log n) verification complexity instead of processing all n records.

Dual Structure Benefits: The hash chain [400] provides: (1) Sequential auditability—decisions have temporal order; (2) Causal linkage—each decision cryptographically depends on previous history; (3) Tamper-evidence—modifications break the chain detectably. Merkle tree [428] provides: (1) Batch integrity—single root commits to entire batch; (2) Efficient verification—O(log n) proof size and computation; (3) Selective disclosure—can prove individual record inclusion without revealing others.

Together, these structures create a comprehensive audit system where every authorization decision is permanently recorded with cryptographic integrity guarantees, enabling compliance requirements, dispute resolution, security audits, and forensic investigation while preventing post-hoc modification of historical decisions. The append-only property ensures records cannot be deleted, the hash linkage ensures records cannot be modified without detection, and the Merkle tree enables efficient verification even as the ledger grows to millions of records, providing scalable tamper-evident audit infrastructure for enterprise authorization systems.

Figure 5:
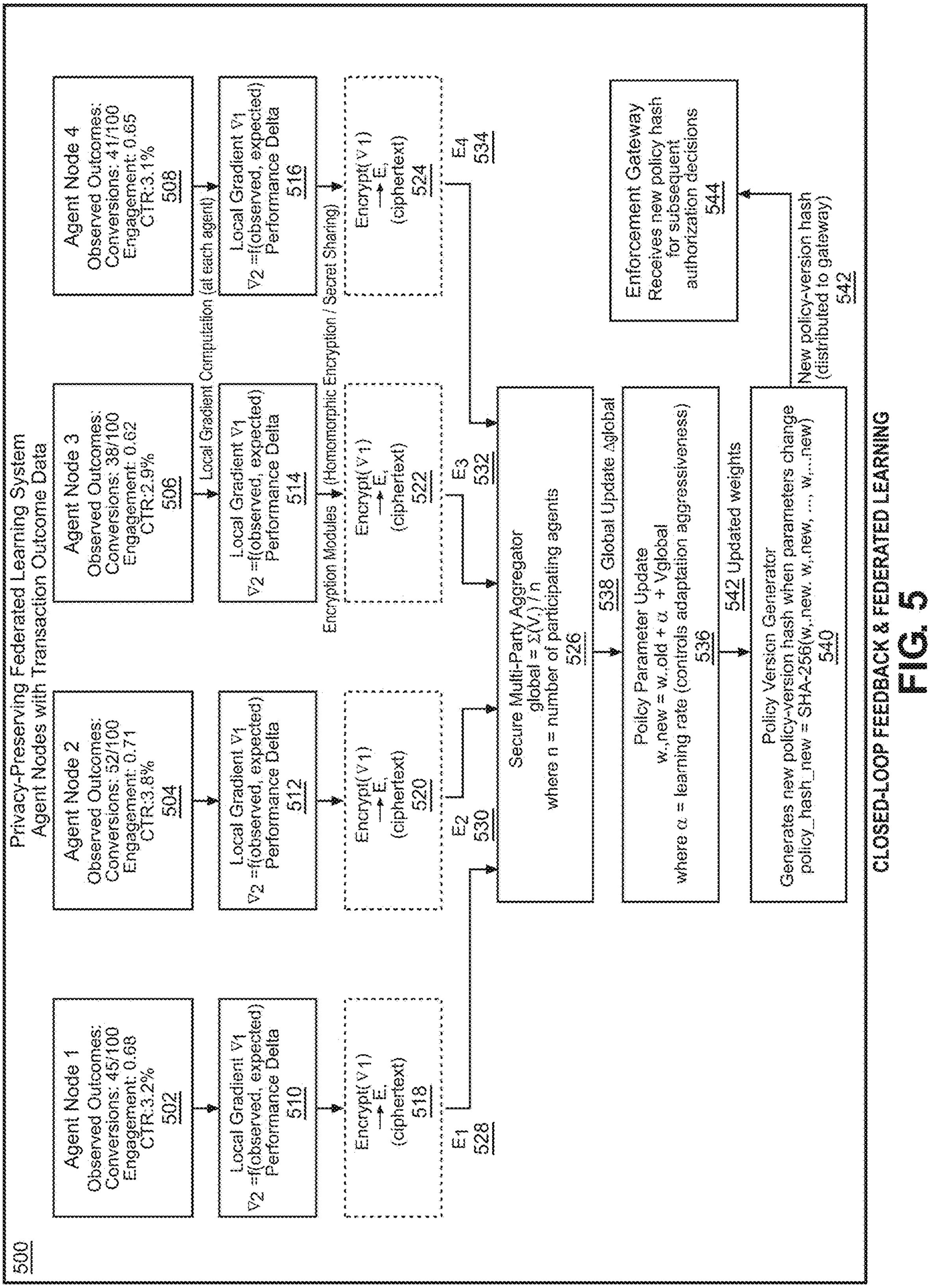
FIG. 5 illustrates a Closed-Loop Feedback & Federated Learning System according to aspects of embodiments of the present invention.

FIG. 5—Closed-Loop Feedback & Federated Learning

FIG. 5 depicts the Privacy-Preserving Federated Learning System [500], which implements continuous policy refinement through collaborative learning across distributed agents without exposing individual transaction data, embodying a sophisticated balance between collective intelligence and individual privacy that enables system-wide optimization while maintaining strict confidentiality guarantees.

FIG. 5 illustrates a Closed-Loop Feedback & Federated Learning System according to aspects of embodiments of the present invention.

Agent Node Layer with Local Outcome Observation: The top section shows four Agent Nodes with Transaction Outcome Data, each representing an independent participant observing local transaction results without sharing raw performance data. Agent Node 1 [502] maintains Model params [502A] (representing locally stored policy parameters) and observes Outcomes: Conversions: 45/100 (45% conversion rate), Engagement: 0.68 (normalized engagement score on 0.0-1.0 scale), CTR: 3.2% (click-through rate), demonstrating heterogeneous performance metrics collected post-transaction. Agent Node 2 [504] with Model params [504A] observes Outcomes: Conversions: 52/100 (52% rate), Engagement: 0.71, CTR: 3.8%, showing superior performance. Agent Node 3 [506] with Model params [506A] observes Outcomes: Conversions: 38/100 (38% rate), Engagement: 0.62, CTR: 2.9%, demonstrating below-average performance. Agent Node 4 [508] with Model params [508A] observes Outcomes: Conversions: 41/100, Engagement: 0.65, CTR: 3.1%, showing moderate performance.

This heterogeneity in observed outcomes creates the foundation for federated learning—agents experiencing different transaction contexts and performance levels collectively contribute diverse perspectives that inform policy refinement, improving system-wide performance beyond what any single agent could achieve in isolation.

Local Gradient Computation Layer: Below each agent node, the Local Gradient Computation (at each agent) boxes demonstrate privacy-preserving local analysis. Agent Node 1 computes Gradient ∇_i where i=f(observed−expected) labeled as Performance delta [510], flowing via arrow [502→510]. This gradient represents the direction and magnitude of policy adjustment needed based on this agent's observed outcomes compared to predicted performance (expected values derived from the agent's AQS qualification score). For example, if Agent 1's AQS was 0.75 (predicting~75% success rate) but actual conversion was 45%, the negative gradient indicates policy parameters overestimated this agent's qualification, requiring downward weight adjustment for similar agent profiles.

AgentNode 2 computes Gradient ∇_i [512] flowing via [504→512], likely showing positive gradient given its superior 52% conversion rate if predicted performance was lower. Agent Node 3 computes Gradient ∇_i [514] via [506→514], representing its 38% conversion performance delta. Agent Node 4 computes Gradient ∇_i [516] via [508→516]. The critical privacy property emerges here: gradients contain only directional information about parameter adjustments, not raw transaction details, performance metrics, or identifiable agent data.

Privacy Layer with Homomorphic Encryption: The Encryption Modules (Homomorphic Encryption/Secret Sharing) layer provides cryptographic protection ensuring gradients never transit in plaintext. Agent Node 1's gradient passes through Encryption Key [518A], producing E_i=Encrypt(∇_i) labeled as "=E_i (protected)" [518B], which flows via path [518] (with intermediate notation [538A/[522A[520]]]) to the aggregator. Homomorphic encryption enables computation on encrypted data without decryption—the aggregator can sum encrypted gradients to produce an encrypted result that, when decrypted, equals the sum of plaintext gradients, never exposing individual contributions.

Agent Node 2's gradient flows through Encryption Key [520A], producing encrypted output via [520B], then path [530] with label "Updated model" to the aggregator. Agent Node 3's gradient flows through Encryption Key [522A], producing E_i protected [522], then path [532] to the aggregator. Agent Node 4's gradient flows through Encryption Key [524A], producing E_i= . . . to all Enc . . . protected [524] (with notation [522[2[547A] . . . i=E_i), then path [534] to the aggregator.

The dashed lines connecting encryption modules (e.g., [528] E_i, [530] E_i, [532]E_i, [534] E_i) represent encrypted gradient flows-even if network traffic is intercepted, adversaries observe only encrypted values providing zero information about actual performance data.

Secure Aggregation Layer: Secure Multi-Party Aggregator [526] box in the center performs the critical operation: Δglobal=Σ(∇_i)/n where n=number of participating agents. This computes the global gradient (average performance delta across all agents) using secure multi-party computation protocols. The aggregator receives encrypted gradients [E_1, E_2, E_3, E_4] from the four agents via paths [518, 530, 532, 534]. Using homomorphic encryption properties, the aggregator computes: E(Δglobal)=Σ(∇_1+∇_2+∇_3+∇_4)/4, producing an encrypted result. Crucially, the aggregator never decrypts individual gradients—it only decrypts the final aggregate, preventing the aggregator from learning any single agent's performance delta while still computing the correct system-wide average.

For the depicted scenario, if ∇_1=−0.30 (Agent 1 underperformed), ∇_2=+0.15 (Agent 2 overperformed), ∇_3=−0.37 (Agent 3 underperformed), ∇_4=−0.10 (Agent 4 slightly underperformed), the aggregate Δglobal=(−0.30+0.15−0.37−0.10)/4=−0.155, indicating on average, current policy parameters slightly overestimate agent performance, requiring small downward adjustment to weight coefficients.

Policy Update and Distribution Layer: The aggregated gradient flows via arrow [538] labeled "Global Update Δglobal" to the Policy Parameter Update module [536], which applies the learning rule: w_new=w_old+α×Δglobal where α=learning rate (controls adaptation aggressiveness). The learning rate balances responsiveness versus stability—high α causes rapid adaptation to recent performance (potentially unstable), low a causes slow, stable adaptation. For example, with α=0.1 and Δglobal=−0.155, if w_1_old=0.50, then w_1_new=0.50+(0.1×−0.155)=0.50−0.0155=0.4845, representing small downward adjustment.

Policy Parameter Update Module [536] generates Full parameter vector w_new [542], containing all updated weight coefficients maintaining the constraint $\Sigma w_i=1.0$ through appropriate normalization. This flows to Policy Version Generator [540], which performs two critical operations: (1) computes a new policy-version hash: SHA-256 (w_new) producing a unique cryptographic identifier for this policy configuration (e.g., "sha256:b4e9c8a7 . . . "); (2)

detects policy version change by comparing the new hash against the previous policy-version hash-if they differ, a policy update has occurred.

Policy Version Generator [540] outputs [544A] "New policy-version hash (distributed to gateway)" via path [546], flowing to Enforcement Gateway [544] box labeled "Enforcement Gateway: Receives new policy hash for subsequent authorization decisions." The gateway compares the received policy-version hash against its cached version—if different, the gateway retrieves the new weight coefficients from the Policy Store and updates its local policy cache, ensuring subsequent AQS computations use refined parameters.

A feedback path labeled "Observed" [544] flows from Enforcement Gateway [544] to CL-1: Outcome Collector [544] (notation appears truncated), though the primary enforcement-to-feedback flow is depicted in FIG. 1. The Policy reference to Gateway Store [544A] completes the distribution path, and the output [546A] "To Policy Store/ Ledger" demonstrates that the new policy version is also recorded in the Immutable Ledger for audit purposes, creating a verifiable history of policy evolution.

Complete Learning Loop Operation: The system operates as a continuous improvement cycle: (1) Observation: Agents observe actual transaction outcomes (conversions, engagement, CTR) reflecting real-world performance; (2) Local Analysis: Each agent computes performance delta (gradient) comparing observed versus expected results, identifying prediction errors; (3) Privacy Protection: Gradients undergo homomorphic encryption, ensuring individual performance remains confidential during transmission; (4) Secure Aggregation: The central aggregator computes system-wide average gradient using secure multi-party computation without accessing individual gradients; (5) Policy Refinement: The aggregate gradient informs weight coefficient updates, adjusting policy parameters to improve future authorization accuracy; (6) Version Control: New policy parameters receive cryptographic hash identifiers enabling version tracking and rollback if needed; (7) Distribution: Updated policies distribute to all enforcement gateways, ensuring system-wide consistency; (8) Application: Subsequent AQS computations use refined weights, improving authorization decisions based on learned patterns; (9) Continuous Iteration: The loop repeats with every batch of verified transaction outcomes, enabling perpetual adaptation.

The architecture achieves three critical properties simultaneously: (1) Collective Intelligence-learning from aggregated experience across all agents improves system-wide performance beyond individual agent capabilities; (2) Privacy Preservation—no raw transaction data, performance metrics, or identifiable information ever leaves individual agents, protecting competitive secrets and sensitive data; (3) Continuous Adaptation—policies evolve automatically based on observed outcomes without manual intervention, maintaining relevance as market conditions, agent behaviors, and transaction patterns change.

This federated learning approach is particularly valuable in competitive or privacy-sensitive environments where agents cannot share raw data (e.g., competing advertisers) but still benefit from collective learning that improves everyone's authorization accuracy, reducing waste system-wide while maintaining strict confidentiality guarantees protecting each participant's proprietary performance data.

Figure 6:
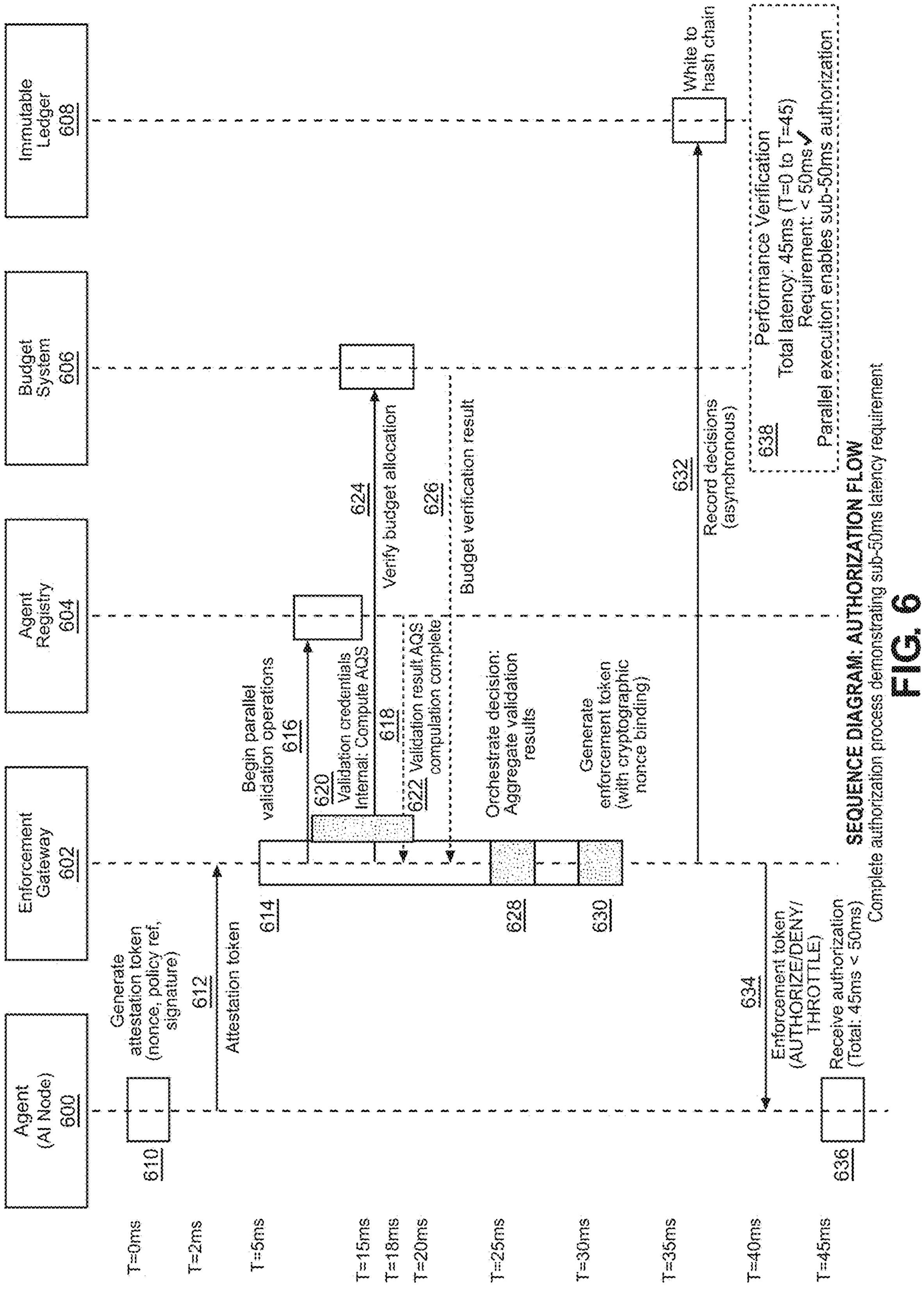
FIG. 6 illustrates a Sequence Diagram showing an Authorization process demonstrating a sub-50 ms latency requirement according to aspects of embodiments of the present invention.

FIG. 6—Sequence Diagram: Authorization Flow

FIG. 6 illustrates a Sequence Diagram showing an Authorization process demonstrating a sub-50 ms latency requirement according to aspects of embodiments of the present invention.

FIG. 6 presents a complete chronological authorization process sequence demonstrating the sub-50 ms latency requirement through careful orchestration of parallel operations, asynchronous processing, and performance-optimized cryptographic verification, illustrating how complex authorization logic involving distributed system components can execute with real-time responsiveness suitable for high-frequency transaction systems.

System Component Swimlanes: The diagram arranges five system components horizontally as swimlanes representing parallel execution contexts: Agent (AI Node) [600] on the left initiates and receives authorization; Enforcement Gateway [602] orchestrates validation, scoring, and decision-making; Agent Registry [604] provides credential and policy verification services; Budget System [606] enforces spending limits through distributed atomic operations; and Immutable Ledger [608] on the right maintains audit trail. Time flows vertically from T=0 ms at top to T=45 ms at bottom, with each labeled action positioned at its execution timestamp.

Initialization Phase (T=0 ms to T=5 ms): At T=0 ms, Agent [600] executes [610] "Generate attestation token," creating the cryptographically signed authorization request containing transaction ID, policy-version hash, unique nonce, digital signature, and transaction metadata. This local operation typically completes in under 2 ms depending on cryptographic library performance. At T=2 ms, Agent [600] transmits Attestation Token [612] across the network to Enforcement Gateway [602], with the token containing [610A] "Transaction metadata (amount, type, policy_ref)" providing contextual information for authorization decisions. Network transmission consumes approximately 2-3 ms for typical datacenter deployments with sub-millisecond network latency, though geographic distribution may extend this phase.

Parallel Validation Initiation (T=5 ms to T=15 ms): At T=5 ms, Enforcement Gateway [602] receives the attestation token and immediately triggers parallel validation operations. The gateway spawns multiple concurrent execution threads: [614] "Begin parallel validation operations" initiates cryptographic signature verification, and simultaneously [616] triggers a second parallel path. These parallel initiations are critical for meeting the sub-50 ms requirement—sequential processing would exceed latency budgets.

During T=5-10 ms, the gateway performs [618] "Internal: Compute AQS on feature" representing the Feature Vector Retrieval and Weighted Summation operations described in FIG. 8. The gateway retrieves the agent's historical performance metrics from local cache or fast storage, applies policy weight coefficients, and computes $AQS=\Sigma(w_i \times f_i)$. Simultaneously, the gateway validates the nonce value hasn't been used previously (replay attack prevention) and verifies the policy-version hash references a valid, current policy. These internal operations exploit cached data to minimize latency.

The gateway also queries Agent Registry [604] for credential verification, shown by the arrow crossing to the registry swimlane. The registry performs database lookup, retrieves the agent's Ed25519 public key, checks credential status (active/revoked/suspended), and at T=15 ms returns [620] "Policy version response" confirming the policy reference is valid and providing any additional credential metadata required for authorization.

Budget Verification Phase (T=15 ms to T=25 ms): At T=15 ms, having completed initial validation checks, Enforcement Gateway [602] triggers [616A] "Trigger AQS" (likely "Trigger AQS threshold comparison" based on context) evaluating whether the computed qualification score meets authorization thresholds. Concurrently, Enforcement Gateway [602] sends [622A] "Budget check request (agent_id, quantity id, policy)" to Budget System [606], initiating the distributed budget verification operation described in FIG. 7.

Budget System [606] applies consistent hashing to route the request to the appropriate budget registry node, performs atomic compare-and-swap (CAS) operation to reserve requested funds, and generates cryptographic verification records. At T=25 ms, Budget System [606] returns [622] "Budget verification result" indicating whether budget reservation succeeded (sufficient funds, reservation recorded) or failed (insufficient funds, reservation rejected). The 10 ms budget verification window accommodates distributed coordination and atomic operation latency while maintaining overall sub-50 ms target.

Decision Aggregation Phase (T=25 ms to T=35 ms): At T=30 ms, having received validation results (signature valid, credentials active), AQS score (qualification assessment), and budget verification (funds available/insufficient), enforcement gateway [602] executes [626] "Orchestrate decision: Aggregate validation results." The Decision Orchestration Module (FIG. 2, component [234]) applies hierarchical decision logic: if any security check fails (invalid signature, revoked credentials), decision is DENY; else if AQS<threshold_throttle or budget insufficient, decision is DENY; else if AQS≥threshold_auth and budget available, decision is AUTHORIZE; else if threshold_throttle≤AQS<threshold_auth and budget available, decision is THROTTLE.

At T=35 ms, enforcement gateway [602] executes [630] "Generate enforcement token (with cryptographic nonce binding)," creating the enforcement token structure detailed in FIG. 3. The gateway computes binding_hash=SHA-256 (attestation_nonce||enforcement_token_id||timestamp), creates the linked nonce field, populates the authorization decision outcome, adds decision reason details (policy references, rate limits, fraud codes), and signs the entire enforcement token with the gateway's Ed25519 private key. Token generation consumes approximately 5 ms for cryptographic signature computation.

Response and Audit Phase (T=35 ms to T=45 ms): At T=40 ms, enforcement gateway [602] returns Enforcement Token [634] to Agent [600], with the token containing "authorization decision (AUTHORIZE/DENY/THROTTLE)" and "decision reason detail" including "policy_ref, rate_limit, fraud_code" providing transparency into authorization logic. Network transmission consumes 3-5 ms for token return. At T=45 ms, the agent executes [636] "Receive authorization (Total: 45 ms<50 ms)," completing the authorization round-trip in 45 ms, successfully meeting the sub-50 ms latency requirement with 5 ms margin.

Asynchronous Audit Recording: Critically for latency optimization, audit recording occurs asynchronously off the critical path. Enforcement gateway [602] sends [632] "Record decision (asynchronous)" to the Immutable Ledger [608], with payload [632A] containing "(enforcement_token, nonce, policy_hash, result) {s}" providing complete audit context. This transmission occurs in parallel with enforcement token return to the agent, ensuring audit logging does not extend authorization latency. The ledger performs [638] "Performance Verification" box displaying "Total latency: 45 ms (T=0 to T=45), Requirement: <50 ms ✓" with notation "Parallel execution enables sub-50 ms authorization," confirming the requirement is satisfied.

Latency Budget Breakdown: The timeline demonstrates careful latency budget allocation: T=0-2 ms (2 ms): Local attestation token generation; T=2-5 ms (3 ms): Network transmission to gateway; T=5-15 ms (10 ms): Parallel validation (signature verification, AQS computation, credential lookup); T=15-25 ms (10 ms): Budget verification with distributed CAS operation; T=25-30 ms (5 ms): Decision orchestration and aggregation; T=30-35 ms (5 ms): Enforcement token generation with cryptographic signing; T=35-45 ms (10 ms): Network transmission to agent; Total: 45 ms<50 ms requirement.

Performance Optimization Techniques: The architecture employs multiple optimization strategies: (1) Parallel Execution: Validation, scoring, and credential lookup occur concurrently (T=5-15 ms) rather than sequentially; (2) Asynchronous Operations: Audit logging proceeds in parallel, not blocking authorization response; (3) Local Caching: Policy parameters, weight coefficients, and frequently accessed agent credentials cached at gateway for sub-millisecond access; (4) Distributed Budget Registry: Consistent hashing distributes budget verification load, preventing centralized bottlenecks; (5) Atomic Operations: CAS operations provide distributed coordination without heavyweight distributed transactions; (6) Constant-Time Cryptography: Ed25519 signature verification uses constant-time implementations preventing timing side-channel attacks while maintaining performance.

The sequence diagram demonstrates that complex authorization logic involving cryptographic verification, machine learning-based scoring, distributed budget enforcement, and audit trail generation can execute with real-time latency suitable for high-frequency transaction systems processing thousands of authorization requests per second, provided the architecture carefully orchestrates parallel operations, asynchronous processing, and performance-optimized implementations.

Figure 7:
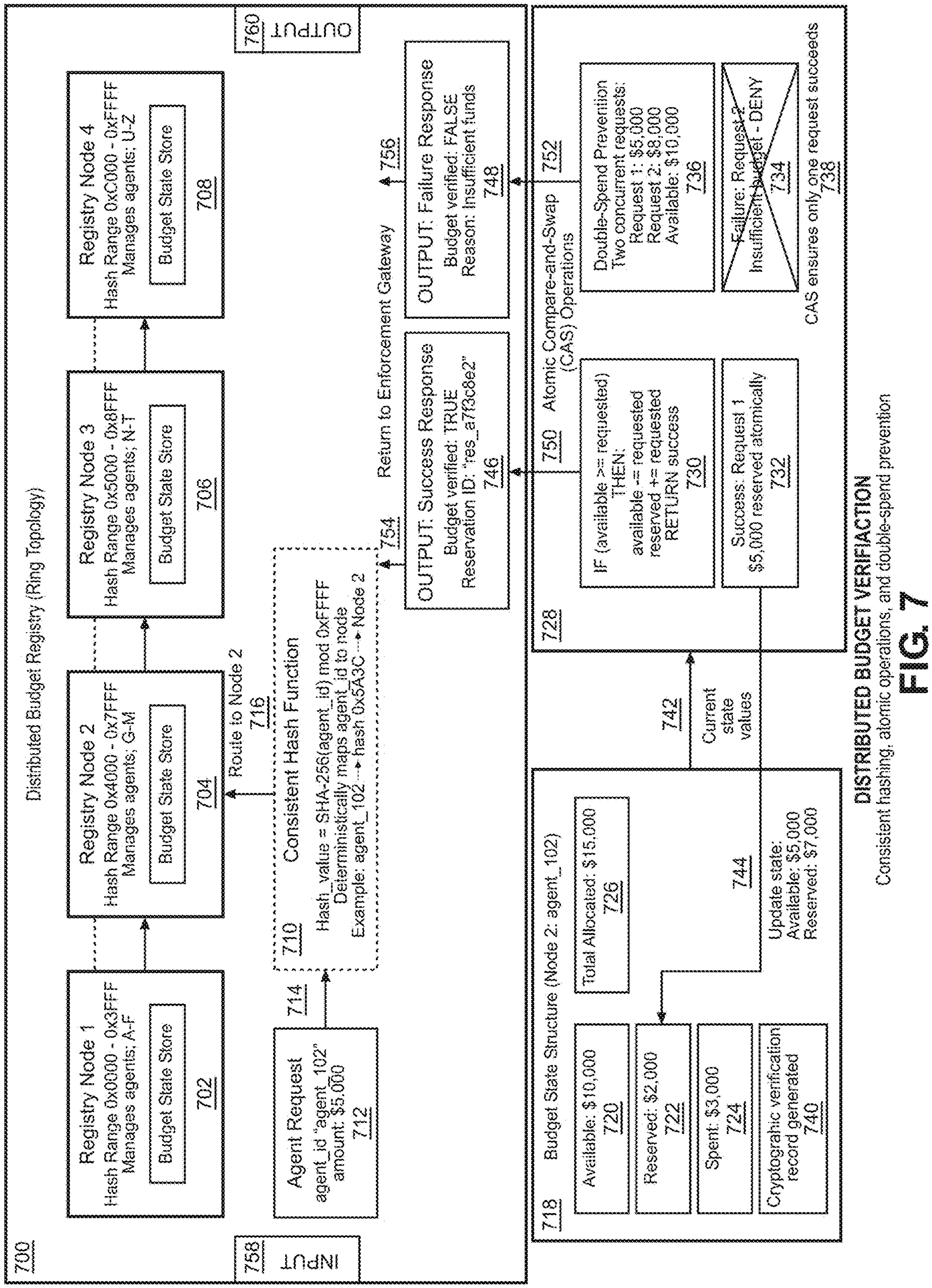
FIG. 7 illustrates a Distributed Budget Verification reflecting consistent hashing, atomic operations, and double pre-spend prevention according to aspects of embodiments of the present invention.

FIG. 7—Distributed Budget Verification

Referring now to FIG. 7, a Distributed Budget Verification process reflecting consistent hashing, atomic operations, and double pre-spend prevention is shown according to aspects of embodiments of the present invention. FIG. 7 illustrates the Distributed Budget Registry (Ring Topology) [700] implementing horizontally scalable budget enforcement through consistent hashing and atomic compare-and-swap operations, demonstrating how distributed systems can prevent double-spend attacks and race conditions while maintaining high availability and low latency for concurrent budget verification requests.

Ring Topology Architecture: The top section shows the distributed budget registry arranged in a logical ring with four registry nodes, each responsible for a contiguous range of hash values. Registry Node 1 [702] manages Hash Range: 0x0000-0x3FFF, responsible for agents: A-F, and maintains a local Budget State Store containing spending data for its assigned agents. Registry Node 2 [704] manages Hash Range: 0x4000-0x7FFF for agents: G-M with its own Budget State Store. Registry Node 3 [706] manages Hash Range: 0x8000-0xBFFF for agents: N-T. Registry Node 4 [708] manages Hash Range: 0xC000-0xFFFF for agents: U-Z. The dashed circular arrows connecting the nodes represent the ring topology where nodes are arranged in hash-value order, enabling efficient key-to-node routing.

This distributed architecture eliminates centralized bottlenecks—budget verification requests distribute across multiple nodes based on agent identifiers, enabling horizontal scalability where system capacity grows linearly with added nodes. The ring shows connections [712A→700] from input and [760] OUTPUT representing external interfaces.

Consistent Hashing and Request Routing: The left side shows INPUT with "From Gateway: Budget check request" [712] initiating verification, with "Agent Request agent (agent_102)" [714] specifying the requesting agent. Consistent Hash Function [710] box explains: "hash_value=SHA-256(agent_id) mod 0xFFFF, Deterministically map agent_id to node, Example: agent_102→hash\x5A3C→Node 2." This deterministic mapping ensures the same agent always routes to the same node (consistency), while hash distribution across the 0x0000-0xFFFF range ensures approximately equal load distribution across nodes (balance).

For the example, agent_102's identifier hashes to 0x5A3C, falling within Node 2's range (0x4000-0x7FFF), so the request flows via [716] "Route to Node 2" directly to Registry Node 2 [704]. The routing determination is fast (single SHA-256 computation and modulo operation) and deterministic (no consensus or distributed coordination required for routing), minimizing request latency.

Budget State Structure and Atomic Operations: The center shows the Budget State Structure (Node 2: agent_102) containing four financial tracking fields: Available: $10,000 [718] (current uncommitted funds), Total Allocated: $15,000 [720] (lifetime budget allocation), Reserved: $2,000 [722] (funds reserved for pending transactions but not yet spent), Spent: $3,000 [724] (completed transaction expenditures). These fields maintain the invariant: Total Allocated=Available+Reserved+Spent ($15,000=$10,000+$2,000+$3,000 ✓). The Budget State Structure also generates [724] Cryptographic verification record sent "To Immutable Ledger" via [726], creating audit trail.

The critical operation is the Atomic Compare-and-Swap (CAS) Operation [728, 750] box, which explains: "IF (available≥requested) THEN update ELSE reject, Only one concurrent request succeeds." This atomic operation is essential for preventing race conditions in distributed systems. Without atomicity, if two concurrent requests each for $10,000 arrive when Available=$10,000, both might pass the "available≥requested" check, then both decrement Available, resulting in Available=−$10,000 (double-spend violation). The CAS operation atomically checks and updates, ensuring only one request succeeds.

Double-Spend Prevention Demonstration: The bottom section labeled "Atomic operation (at Registry Node 2)" demonstrates the Double-Spend Prevention mechanism [736, 752, 754] through a concrete example. Two concurrent requests arrive simultaneously:

Concurrent Request 1 [732] requests $5,000, shown in green. The atomic CAS operation [750] evaluates: IF (Available=$10,000≥requested=$5,000) THEN SUCCESS. The condition holds, so the operation atomically: (1) subtracts $5,000 from Available: $10,000→$5,000; (2) adds $5,000 to Reserved: $2,000→$7,000; (3) generates reservation_id for transaction tracking. The flow [750→732] returns to Request 1, and the system responds with Success Response: Budget verified: TRUE, reservation_id [746], which flows via [746→760] to OUTPUT. The response also notes "$5,000 reserved atomically," confirming the atomic state update.

Concurrent Request 2 [734] requests $8,000, shown in red. This request also triggers CAS operation [752, 754]. However, because Request 1 already executed atomically, the Available balance is now $5,000 (not the original $10,000). The CAS evaluates: IF (Available=$5,000≥requested=$8,000) THEN SUCCESS ELSE FAIL. The condition fails ($5,000<$8,000), so the operation atomically rejects the request without modifying budget state. The flow [754→736] shows the rejection path labeled "Insufficient budget—DENY," and the system responds with Failure Response: Budget verified: FALSE, reason: insufficient funds [748], flowing via [748→760] to OUTPUT.

The box [738] confirms "CAS ensures only one request succeeds," demonstrating double-spend prevention. Even though both requests arrived concurrently and both initially saw Available=$10,000, the atomic operation serialized their execution, ensuring only Request 1 (which arrived nanoseconds earlier) succeeded, preventing the double-spend scenario where $13,000 total requests ($5,000+$8,000) would exceed $10,000 available budget.

System-Wide Coordination: The distributed architecture achieves several critical properties: (1) No Central Bottleneck: Budget verification distributes across registry nodes based on consistent hashing, enabling horizontal scalability without centralized coordination. (2) Atomic Consistency: CAS operations provide strong consistency guarantees at the node level without requiring distributed transactions or consensus protocols (which would increase latency). (3) Deterministic Routing: Consistent hashing ensures the same agent always routes to the same node, enabling that node to maintain authoritative budget state without cross-node coordination for the common case. (4) Race Condition Prevention: Atomic operations serialize concurrent requests even when they arrive simultaneously, preventing double-spend despite concurrent execution. (5) High Availability: If one node fails, only its hash range is affected; other nodes continue operating normally. Failed node's hash range can be redistributed to adjacent nodes in the ring. (6) Low Latency: Local node operations (CAS, state update, response generation) complete in microseconds; network round-trip to appropriate node dominates latency (typically 1-5 ms in datacenter deployments).

The architecture demonstrates how distributed systems can provide both strong consistency guarantees (atomic budget enforcement, double-spend prevention) and high performance (horizontal scalability, low latency) through careful coordination primitives (CAS operations) and deterministic routing (consistent hashing), enabling the authorization system to enforce budget constraints across thousands of concurrent agent requests without sacrificing either correctness or responsiveness.

Figure 8:
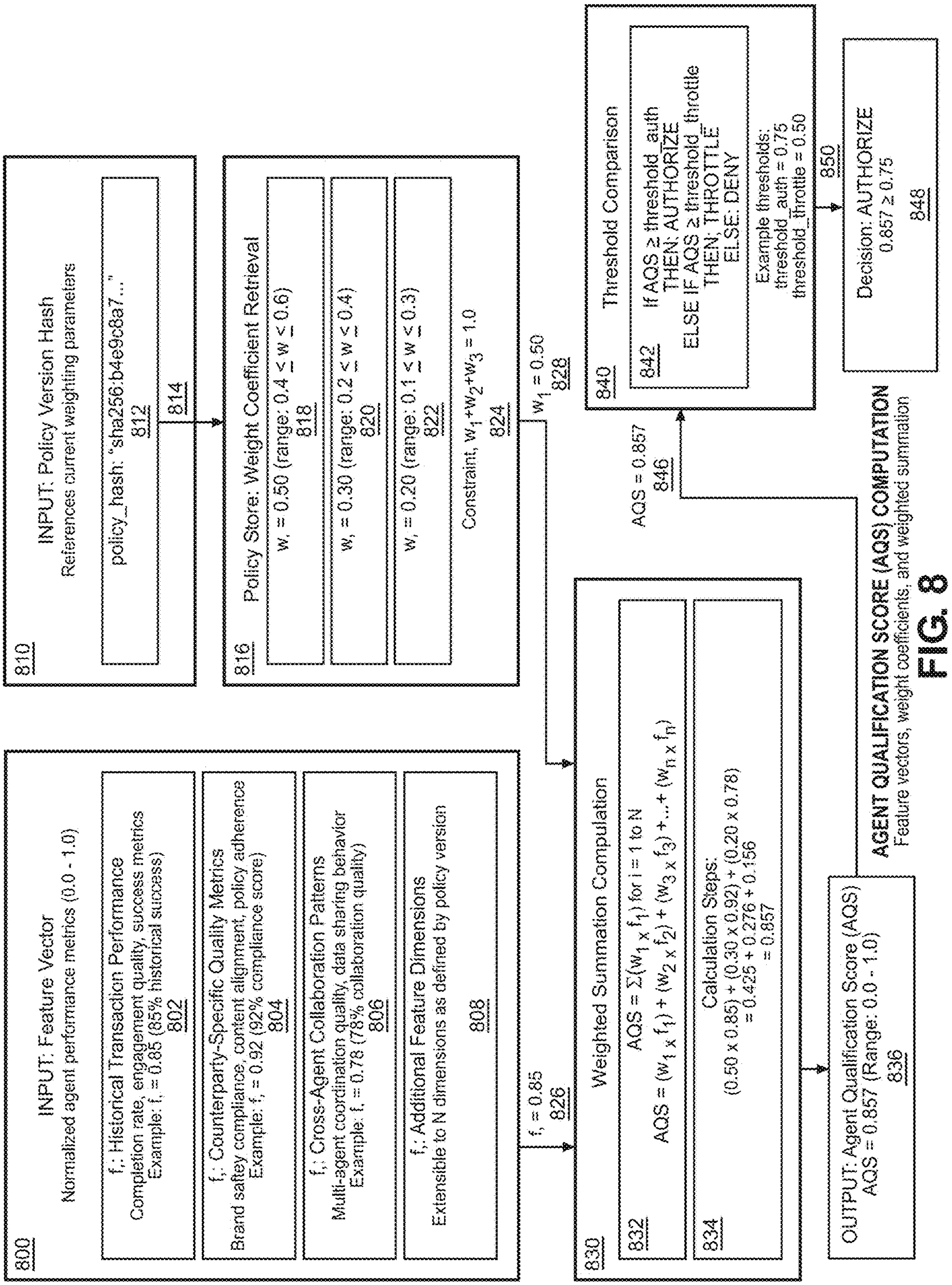
FIG. 8 illustrates an Agent Qualification Score (AQS) Computation according to aspects of embodiments of the present invention.

FIG. 8—Agent Qualification Score (AQS) Computation

Referring now to FIG. 8, an Agent Qualification Score (AQS) Computation process is shown according to aspects of embodiments of the present invention. Specifically, FIG. 8 details the mathematical computation of the Agent Qualification Score (AQS) through a systematic flow from raw performance metrics through normalization, weighted summation, and threshold-based decision logic, demonstrating how machine learning-inspired scoring translates heterogeneous behavioral signals into standardized authorization decisions.

Input Layer: Feature Vector Construction: The left side shows INPUT: Feature Vector [800] containing "Normalized agent performance metrics (0.0-1.0)" across multiple behavioral dimensions. Raw Performance Metrics (unnormalized data) [800A] feeds into the normalization process, representing the actual observed values before standardization. The feature vector comprises four primary dimensions:

$f_1$: Historical Transaction Performance [802] measures "completion rate, engagement quality, success metrics"—for example, what percentage of past transactions completed successfully, what engagement levels (clicks, time-on-site, interactions) resulted, what success rates (conversions, desired outcomes) materialized. An agent with 85% historical completion rate might normalize to $f_1$=0.85.

$f_2$: Advertiser-Specific Quality Metrics [804] evaluates "brand safety compliance, content alignment, policy adherence"—for instance, whether transactions respected brand safety guidelines (no adult content for family brands), whether content aligned with advertiser objectives, whether policy rules (geographic restrictions, time-of-day limits) were followed. An agent demonstrating 92% policy compliance might normalize to $f_2$=0.92.

$f_3$: Cross-Agent Collaboration Patterns [806] assesses "multi-agent coordination quality, data sharing behavior"—when multiple agents coordinate on complex transactions, how effectively do they collaborate, share necessary information, and maintain synchronization? An agent with 78% collaboration quality might normalize to $f_3$=0.78.

$f_4 \ldots f_n$: Additional Feature Dimensions [808] indicates "extensible to N dimensions as defined by policy version"—the system supports arbitrary numbers of feature dimensions, with the specific set and count determined by the active policy configuration. This extensibility enables domain-specific customization (e.g., adding fraud indicators, geographic preference signals, device type patterns) without modifying core scoring algorithms.

Policy Layer: Weight Coefficient Retrieval: The top center shows INPUT: Policy-Version Hash [810] containing the "sha256:b4e9c8a7 . . . " hash value that uniquely identifies the policy configuration governing this authorization decision. This hash "References current weighting parameters" [812], flowing via arrow [814] (labeled "Policy lookup trigger") to trigger Policy Store: Weight Coefficient Retrieval [816].

The Policy Store returns three weight coefficients (for the three-feature example): $w_1$=0.50 (range: $0.4 \le w_1 \le 0.6$) [818], assigning 50% importance to historical performance; $w_2$=0.30 (range: $0.2 \le w_2 \le 0.4$) [820], assigning 30% importance to advertiser-specific quality; $w_3$=0.20 (range: $0.1 \le w_3 \le 0.3$) [822], assigning 20% importance to collaboration patterns.

The constraint $\Sigma w_i$=1.0 [824] (sum of weights equals 1.0) ensures the weighted sum produces a normalized score on [0.0, 1.0] scale when all features are normalized to the same range. The configurable ranges (e.g., $0.4 \le w_1 \le 0.6$) reflect policy boundaries limiting how aggressively each weight can be adjusted during federated learning, preventing any single feature from dominating authorization decisions.

Threshold Parameters from Policy Store [840A] also flow into the system, defining authorization boundaries [840] used for decision classification.

Computation Layer: Weighted Summation: The center yellow box shows Weighted Summation Computation [830] executing the core AQS calculation. The mathematical formula [832] specifies: "AQS=$\Sigma(w_i \times f_i)$ for i=1 to N" where the summation iterates over all N feature dimensions, multiplying each feature value by its corresponding weight and summing the products.

Calculation Steps [834] demonstrates a concrete example: "(0.50×0.85)+(0.30×0.92)+(0.20×0.78)=0.857" showing step-by-step computation: Term 1: $w_1 \times f_1$=0.50×0.85=0.425 (historical performance contribution); Term 2: $w_2 \times f_2$=0.30×0.92=0.276 (advertiser quality contribution); Term 3: $w_3 \times f_3$=0.20×0.78=0.156 (collaboration contribution); Sum: 0.425+0.276+0.156=0.857 (final AQS).

The result flows via arrows [836] and [838] (labeled "AQS input") to produce OUTPUT: Agent Qualification Score (AQS) [836] displaying "AQS=0.857, Range: 0.0-1.0," confirming the score falls within the expected normalized range.

Decision Layer: Threshold Comparison: The right side shows Threshold Comparison [840] implementing policy-based decision logic. The comparison evaluates the computed AQS against two policy-defined thresholds [842]: "IF AQS≥threshold_auth (0.75) THEN AUTHORIZE ELSE IF AQS≥threshold_throttle (0.50) THEN THROTTLE ELSE DENY"

With example thresholds threshold_auth=0.75 and threshold_throttle=0.50, the decision logic classifies agents into three categories: High Qualification (AQS≥0.75): Agents exceed the authorization threshold, demonstrating strong historical performance, quality compliance, and collaboration—transactions AUTHORIZED to proceed without restriction; Medium Qualification (0.50≤AQS<0.75): Agents meet minimum standards but fall below full authorization threshold—transactions THROTTLED (reduced priority, delayed execution, reduced scope, or additional verification); Low Qualification (AQS<0.50): Agents fail to meet minimum qualification standards—transactions DENIED to prevent waste.

For the example with AQS=0.857, the comparison evaluates: Is 0.857≥0.75? YES→AUTHORIZE. The arrows [830→840] show the AQS feeding into threshold comparison, which produces Decision: AUTHORIZE (0.857≥0.75) [848] with confirmation [850]. The decision flows via [848A] "To Enforcement Gateway" for inclusion in the enforcement token generated by the gateway's Decision Orchestration Module.

Adaptive Weight Learning: While not explicitly depicted in FIG. 8, the weight coefficients [818, 820, 822] are the parameters refined through the federated learning system (see, FIG. 5). When agents with high AQS scores (e.g., 0.85) subsequently demonstrate poor transaction outcomes (e.g., low conversion rates), the federated learning system generates negative gradients indicating these weights overestimate qualification. The Policy Parameter Update adjusts weights downward (e.g., $w_1$: 0.50→0.48), improving prediction accuracy. Conversely, agents with medium AQS scores (e.g., 0.65) demonstrating unexpectedly strong outcomes generate positive gradients, prompting upward weight adjustments. This continuous refinement improves authorization accuracy over time, reducing false positives (authorizing agents who perform poorly) and false negatives (rejecting agents who would perform well).

System Benefits: The AQS computation provides several advantages over binary qualification: (1) Graduated Response: Three-tier decisions (AUTHORIZE/THROTTLE/DENY) enable nuanced enforcement matching agent qualification levels, rather than binary accept/reject; (2) Multi-Dimensional Assessment: Combining multiple behavioral signals (performance, quality, collaboration) produces more robust qualification than single metrics; (3) Policy-Driven Weights: Configurable weight coefficients enable domain customization and adaptation to changing business priorities; (4) Continuous Learning: Federated learning refinement improves scoring accuracy over time based on verified outcomes; (5) Transparent Computation: Simple weighted sum formula enables explanation and auditability, avoiding black-box machine learning opacity; (6) Efficient Evaluation: Linear computation complexity O(N) in number of features enables sub-millisecond scoring suitable for real-time authorization.

The mathematical framework demonstrates how behavioral qualification translates heterogeneous performance signals into standardized, policy-governed authorization decisions that balance transaction risk against revenue opportunity, continuously improving through federated learning while maintaining computational efficiency suitable for high-throughput real-time systems.

Figure 9:
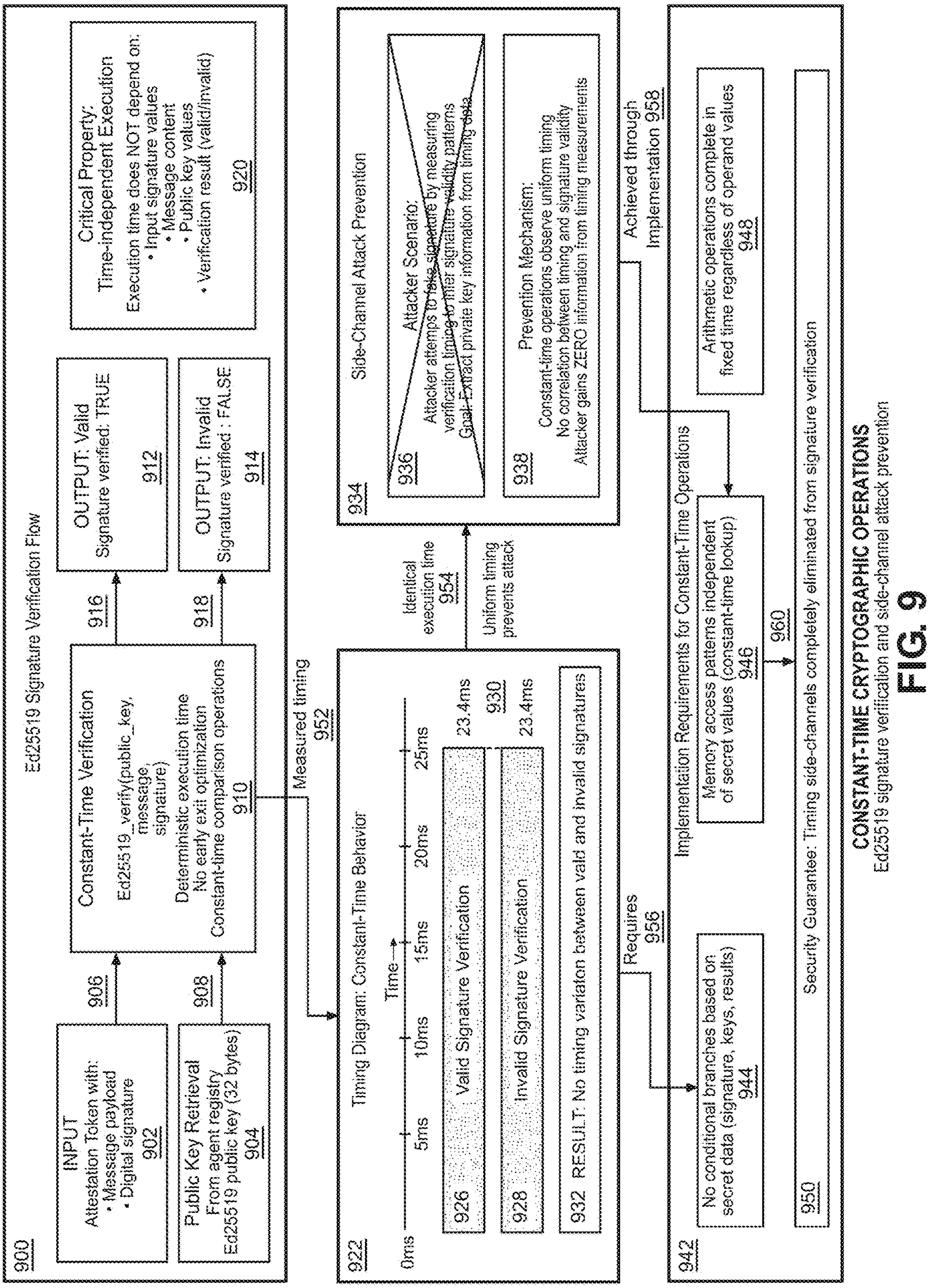
FIG. 9 illustrates Constant-Time Cryptographic Operations according to aspects of embodiments of the present invention.

FIG. 9—Constant-Time Cryptographic Operations

Referring now to FIG. 9, Constant-Time Cryptographic Operations are shown according to aspects of embodiments of the present invention. Specifically, FIG. 9 demonstrates Ed25519 signature verification implementing constant-time execution to prevent timing-based side-channel attacks, illustrating how cryptographic implementations must carefully control execution timing to avoid leaking secret information through observable performance characteristics.

Signature Verification Flow: The top left shows Ed25519 Signature Verification Flow [900] processing two inputs: INPUT [902] containing "Attestation Token with: message payload, digital signature" representing the data to be verified, and Public Key Retrieval [904] accessing "from agent registry" the "Ed25519 public key (32 bytes)" [908A] required for signature verification. The Ed25519 algorithm uses elliptic curve cryptography (Curve25519) providing 128-bit security with 32-byte public keys and 64-byte signatures.

Constant-Time Verification [910] process executes the function "Ed25519_verify(public_key, message, signature)" with three critical properties listed [916]: "deterministic execution time, no early exit optimization, constant-time comparison operations." These properties ensure the verification function always consumes the same amount of time regardless of whether the signature is valid or invalid, and regardless of the specific values of the public key, message, or signature bytes.

The verification produces one of two outputs: OUTPUT: Valid Signature Verified: TRUE [912] when the signature correctly authenticates the message, or OUTPUT: Invalid Signature Verified: FALSE [914] when signature verification fails (signature doesn't match, message was tampered with, or wrong public key used). The critical property is that both paths consume identical execution time.

Time-Independent Execution Property: The right side shows Critical Property: Time-Independent Execution [920] with a box [922] explaining "Execution time does NOT depend on: input byte values, message content, public key values." This timing independence is essential for security—if execution time varied based on secret values, adversaries could measure timing variations to infer information about keys or verification results.

Below this, Measured timing [952] reports identical execution times: "23.4 ms" for both valid and invalid signature verifications. The box shows two timing bars [926] "Valid Signature Verification" at 23.4 ms and [928] "Invalid Signature Verification" at 23.4 ms, with [932] confirming "RESULT: No timing variation between valid and invalid signatures." The Timing Diagram: Constant-Time Behavior [922] plots Time→(0 ms to 25 ms) horizontally, showing both valid and invalid verification operations consume identical 23.4 ms duration with no observable timing difference.

Side-Channel Attack Prevention: The middle section demonstrates Side-Channel Attack Prevention [934] with a red box [936] showing "Attacker Scenario: Attacker attempts to fingerprint by measuring execution timing, Attacker attempts to infer key information from timing data." This describes a timing side-channel attack where an adversary submits many verification requests with different messages/signatures and measures how long each verification takes, attempting to learn bits of the private key by observing timing correlations.

For example, if verification of signatures beginning with byte 0xFF consistently took 23.5 ms while signatures beginning with byte 0x00 took 23.2 ms, an adversary could test signatures with different first bytes, measure timing variations, and infer information about the public key or internal verification state-potentially recovering the private key after millions of timing measurements.

Element or box [938] shows "Prevention Mechanism: Constant-time operations obscure uniform timing, No correlation between timing and signature validity," with [940] confirming "Side-channel suppression." The constant-time implementation prevents these attacks by ensuring execution time is completely independent of all input values—an adversary measuring timing observes identical 23.4 ms for all verification requests regardless of message, signature, or public key values. Element or box [956] emphasizes "Attacker gains ZERO information from timing measurements"—timing observations provide no signal differentiating valid from invalid signatures, preventing cryptanalytic attacks based on timing side-channels.

Implementation Requirements: The bottom left shows Implementation Requirements for Constant-Time Operations [942] specifying three critical implementation constraints:

[944] "No conditional branches based on secret data (signature, keys, results)"—The implementation cannot use if-statements or conditional execution based on secret values, as modern processors optimize branches differently based on branch prediction patterns, creating timing variations correlated with secret data. Instead, constant-time code uses arithmetic operations and bitwise logic to compute results without data-dependent branching.

[946] "Memory access patterns independent of secret values (constant lookup)"—The implementation cannot index arrays or memory using secret values, as cache timing differences between cache hits and misses leak information about accessed addresses. Constant-time code uses fixed access patterns or oblivious data structures ensuring memory access timing is independent of secret data.

[948] "Arithmetic operations complete in fixed time regardless of operand values" [960]—The implementation uses arithmetic operations that execute in constant time. On most modern processors, addition and multiplication are constant-time, while division and modulo operations may have timing dependencies requiring careful implementation. The specification ensures all arithmetic completes in "fixed time regardless of operand values."

Security Guarantee: The bottom center shows Security Guarantee [950] confirming "Timing side-channels completely eliminated from signature verification," providing "resistance to timing-based cryptanalysis attacks." This guarantee is essential for security-critical systems where adversaries might observe timing through network latency measurements, shared cloud infrastructure, or co-located processes. The constant-time implementation ensures that even an adversary capable of measuring verification timing with nanosecond precision gains no information about cryptographic secrets, maintaining security against sophisticated timing-based attacks.

Why Constant-Time Matters: Traditional cryptographic implementations often optimize for average-case performance using early-exit optimizations—for example, failing fast when the first byte of a signature doesn't match. These optimizations create timing variations: invalid signatures might fail verification in 5 ms (early exit), while valid signatures might require 23 ms (complete verification). An adversary measuring these timing differences could: (1) Submit signatures differing in one byte; (2) Measure verification timing; (3) Identify which byte differences cause fastest rejection; (4) Infer information about the expected signature format or internal key values; (5) Iteratively refine attacks to extract additional key bits; (6) Potentially recover the complete private key after millions of timing measurements.

Constant-time implementations prevent these attacks by ensuring verification always executes the complete verification algorithm, never early-exiting, and using only constant-time primitive operations, eliminating all timing signals correlated with secret data. The 23.4 ms execution time represents the worst-case verification path executed for every request, accepting reduced average-case performance (since fast-fail cases also consume 23.4 ms) to guarantee security against timing attacks.

The diagram demonstrates that secure cryptographic implementations require more than mathematically sound algorithms—they require careful attention to implementation details ensuring timing characteristics don't leak secret information through side-channel observations, particularly critical for authorization systems where signature verification gates all transaction access and timing attacks could enable authentication bypass.

Figure 10:
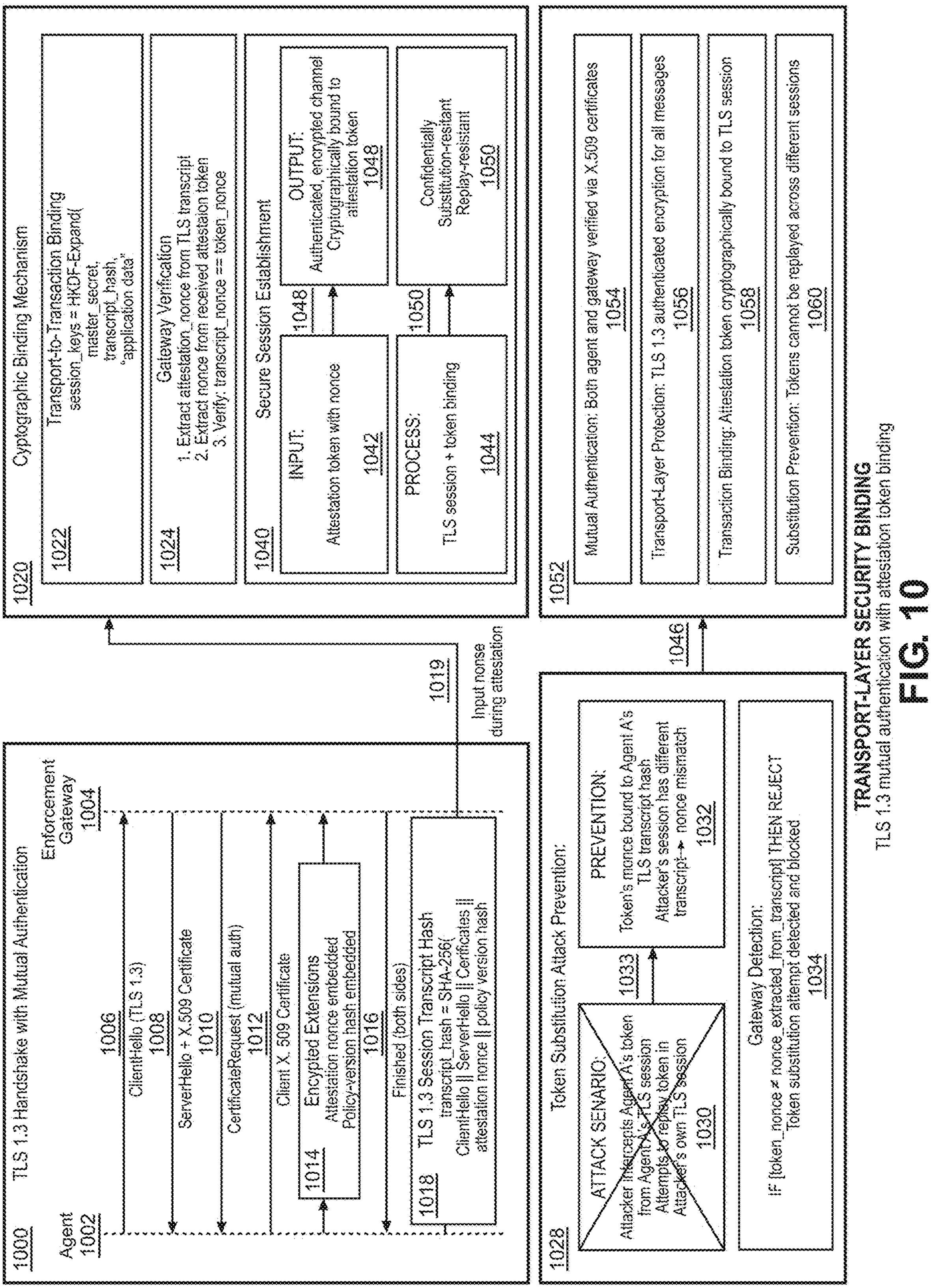
FIG. 10 illustrates Transport-Layer Security Binding according to aspects of embodiments of the present invention.

FIG. 10—Transport-Layer Security Binding

FIG. 10 illustrates Transport-Layer Security Binding according to aspects of embodiments of the present invention. Specifically, FIG. 10 illustrates TLS 1.3 mutual authentication with attestation token binding, demonstrating how transport-layer security combines with application-layer cryptographic binding to prevent man-in-the-middle attacks and token substitution exploits, creating defense-in-depth security where multiple cryptographic layers provide overlapping protection.

TLS 1.3 Handshake with Mutual Authentication: The top left box [1000] shows the TLS 1.3 Handshake with Mutual Authentication between Agent [1002] on the left and Enforcement Gateway [1004] on the right. The handshake proceeds through standard TLS 1.3 protocol messages:

[1006] Agent initiates with ClientHello (TLS 1.3), which transmits via [1008] to the gateway, advertising supported cipher suites, protocol versions, and cryptographic parameters. [1010] Gateway responds with ServerHello+X.509 Certificate, providing its identity credential and selecting cipher parameters. [1012] Gateway sends CertificateRequest (mutual auth), demanding the agent also present its X.509 certificate for bidirectional authentication. [1014] Agent responds with Client X.509 Certificate, flowing via [1014→1024] to Gateway Verification. These Encrypted Extensions [1014] also embed the attestation nonce and policy-version hash, binding the TLS session to the transaction context. [1016] Both parties exchange Finished (both sides) messages containing cryptographic proof that handshake completed successfully and neither party tampered with handshake messages.

The result is an established secure TLS 1.3 Session [1018] providing authenticated encryption for all subsequent messages. The TLS 1.3 Session Transcript Hash [1018] computes: transcript_hash=SHA-256 (ClientHello||ServerHello||Certificates||attestation_nonce||policy_version_hash), where || denotes concatenation. This transcript hash cryptographically commits to the complete handshake sequence including both parties' certificates and the embedded transaction context (attestation nonce, policy_hash), creating tamper-evident binding.

Cryptographic Binding Mechanism: The top right box [1020] shows the Cryptographic Binding Mechanism implementing Transport-to-Transaction Binding [1022]. The session keys derive from the TLS master secret: session_keys=HKDF-Expand(master_secret, "application data") using the HMAC-based Key Derivation Function to generate encryption and authentication keys for application data protection.

Gateway Verification process [1024] executes three steps: (1) Extract attestation_nonce from TLS transcript [1022→1040]—The gateway retrieves the nonce value embedded in the TLS Encrypted Extensions during handshake; (2) Extract token_nonce from received token—The gateway extracts the nonce from the attestation token transmitted over the TLS channel; (3) Verify: transcript_nonce==token_nonce with Result: match [1042→1024]—The gateway compares the two nonce values; if they match, the attestation token was generated specifically for this TLS session; if they differ, the token is being replayed from a different session (attack attempt).

The binding creates cryptographic linkage [1022→1040] between the TLS session context and the transaction authorization request, ensuring attestation tokens cannot be intercepted from one session and replayed in another.

Secure Session Establishment: The middle right box [1040] shows Secure Session Establishment demonstrating the protocol flow. INPUT: Attestation token with nonce [1042] represents the authorization request transmitted over the secure channel. PROCESS: TLS session+token binding verification [1044] executes the steps described above [1050], verifying the token's nonce matches the TLS transcript nonce. OUTPUT: Authenticated, encrypted channel cryptographically bound to attestation token [1046] represents successful establishment where both TLS authentication and token binding succeeded.

The Substitution-Test prevention [1042→1058] demonstrates the security property: even if an adversary intercepts a valid attestation token from Agent A's TLS session, the attacker cannot replay that token in Agent B's TLS session because the nonce binding will fail—Agent A's token contains a nonce matching Agent A's TLS transcript, but Agent B's TLS transcript will have a different nonce (randomly generated during Agent B's handshake), causing the comparison to fail and the gateway to reject the replayed token.

The flow continues [1046→1054] to demonstrate "replay-resistant, MitM-resistant" channels, confirming the combined protections prevent both replay attacks (reusing tokens from past sessions) and man-in-the-middle attacks (adversary intercepts and forwards tokens).

Token Substitution Attack Prevention: The bottom left box [1028] demonstrates Token Substitution Attack Prevention with a concrete attack scenario. Box [1030] shows "ATTACK SCENARIO: Attacker intercepts token from Agent A via TLS session, Attacker attempts to replay token in Agent B's TLS session." This describes an active attack where: (1) Adversary compromises network infrastructure; (2) Adversary intercepts Agent A's valid attestation token (potentially through network tap, compromised router, or malicious ISP); (3) Adversary establishes a separate TLS session with the gateway impersonating Agent B; (4) Adversary replays Agent A's attestation token in Agent B's TLS session, attempting to gain authorization using Agent A's credentials.

PREVENTION mechanism box [1032] explains why this attack fails: "Token's nonce is bound to Agent A's transcript hash" [1033]—Agent A's attestation token contains a nonce value that was embedded in Agent A's TLS handshake and cryptographically committed to via Agent A's TLS transcript hash. "Attacker's session has different transcript_hash" [1033]—When the adversary establishes a TLS session as Agent B, Agent B's handshake generates a completely different random nonce, resulting in a different TLS transcript hash.

Gateway Detection [1034] executes verification logic: "IF (token_nonce !=session_transcript_hash) THEN REJECT" [1034→1036], comparing the nonce in the received attestation token (Agent A's nonce) against the nonce in the current TLS session transcript (Agent B's nonce). The values don't match, triggering rejection [1036], preventing unauthorized replay. The gateway logs the attempted token substitution as a security event, potentially triggering fraud alerts or agent suspension.

Security Properties Achieved: The bottom right box [1052] summarizes Security Properties Achieved through the combined TLS and token binding mechanisms:

[1054] Mutual Authentication: "Both agent and gateway verified via X.509 certificates"—TLS 1.3 mutual authentication ensures both parties prove their identities through certificate presentation and private key possession, preventing impersonation of either agent or gateway.

[1056] Transport-Layer Protection: "TLS 1.3 authenticated encryption for all messages"—All application data (attestation tokens, enforcement tokens, transaction metadata) transmits over TLS 1.3 encrypted channels, preventing eavesdropping and ensuring message integrity through authenticated encryption.

[1058] Transaction Binding: "Attestation token cryptographically bound to TLS session"—The nonce binding ensures attestation tokens are session-specific and cannot be extracted from one session and replayed in another, preventing token theft exploits.

[1060] Substitution Prevention: "Tokens cannot be replayed across different sessions" [1046→1062]—Even if adversaries capture valid attestation tokens (through network compromise, storage breach, or other means), the tokens are useless in different TLS session contexts because nonce binding verification will fail.

The output [1062] flows "To Enforcement Gateway Internal Modules (FIG. 2 modules)," indicating that upon successful TLS session establishment and token binding verification, the gateway proceeds with standard authorization logic (validation, scoring, budget verification) described in FIG. 2, but only after confirming transport security and token binding integrity.

Defense-in-Depth Security Architecture: The complete security architecture demonstrates multiple overlapping protection layers: (1) TLS Encryption: Prevents passive eavesdropping—adversaries cannot read intercepted network traffic; (2) TLS Mutual Authentication: Prevents endpoint impersonation—both parties verify counterparty identity via certificates; (3) Digital Signatures: Agent signs attestation tokens; gateway verifies signatures—prevents token forgery; (4) Nonce-Based Replay Prevention: Single-use nonces prevent replay attacks—same token cannot be resubmitted; (5) Session Binding: Cryptographic binding to TLS transcript prevents token theft—stolen tokens don't work in different sessions; (6) Constant-Time Verification: Side-channel attack prevention—adversaries gain no timing information about verification results.

Each layer provides independent security guarantees, such that compromise of one layer doesn't completely break security. For example: If TLS encryption is compromised (e.g., zero-day vulnerability), digital signatures still prevent token forgery; If digital signatures are compromised (e.g., stolen private key), nonce validation still prevents replay attacks; If nonces are bypassed (e.g., implementation flaw), session binding still prevents cross-session token theft.

The defense-in-depth approach ensures the authorization system maintains security even when individual cryptographic primitives or protocol layers experience vulnerabilities, implementation flaws, or configuration errors, providing robust protection for enterprise transaction systems processing sensitive authorization decisions.

Figure 11A:
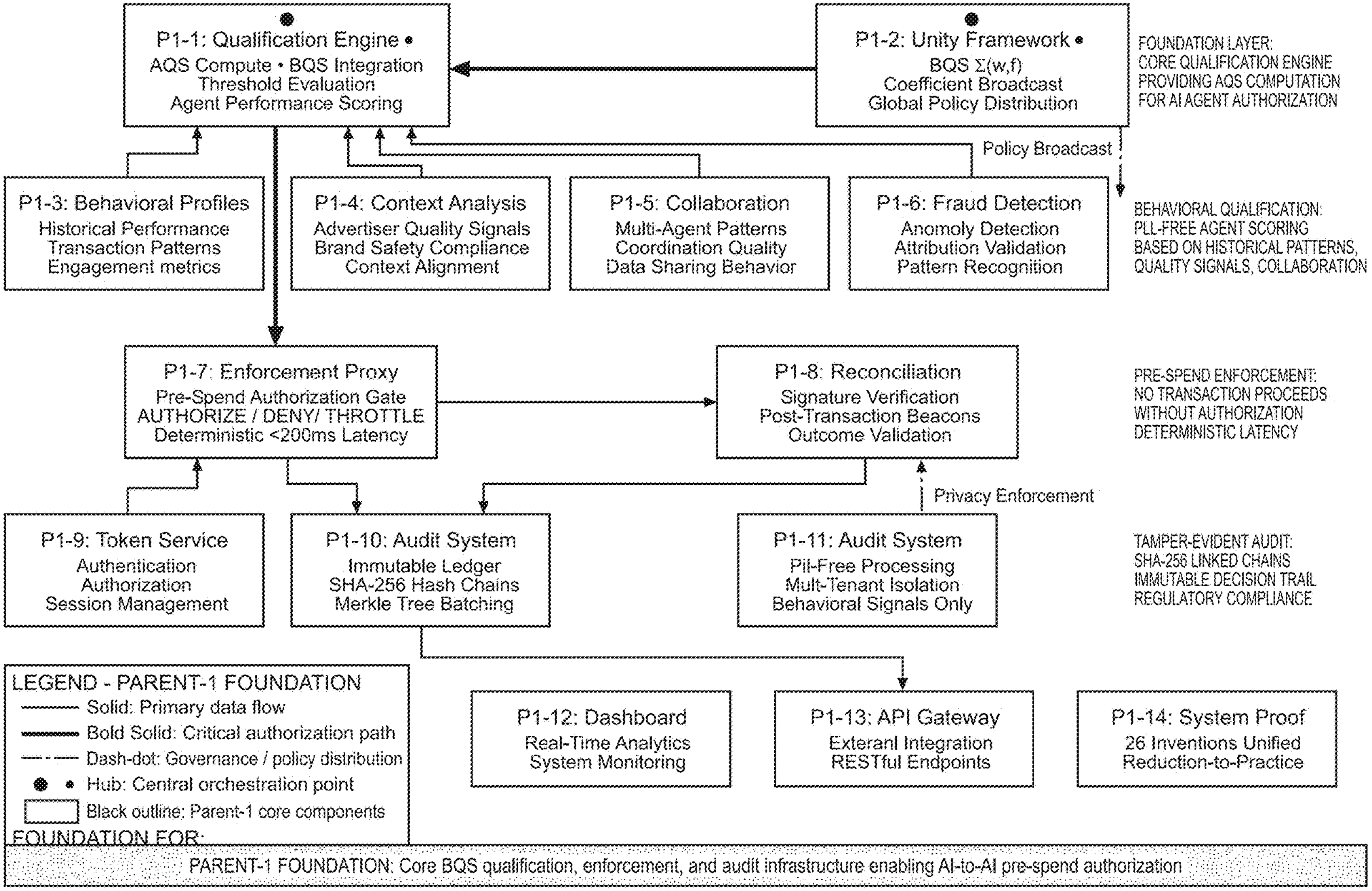
FIG. 11A illustrates a Core Behavioral Qualification System according to aspects of embodiments of the present invention.

FIG. 11A—Core Behavioral Qualification System

FIG. 11A illustrates a Core Behavioral Qualification System according to aspects of embodiments of the present invention. Specifically, FIG. 11A depicts the foundational architecture which establishes the core BQS (Behavioral Qualification Score) qualification, enforcement, and audit infrastructure that enables AI-to-AI pre-spend authorization, demonstrating how, in an aspect of an embodiment of the present invention, modular system components can interconnect to create an integrated authorization ecosystem.

Foundation Layer: The top tier shows the FOUNDATION LAYER comprising two central orchestration components. P1-1: Qualification Engine contains "AQS Compute, BQS Integration, Threshold Evaluation, Agent Performance Scoring," performing the core mathematical qualification operations described in FIG. 8. This engine computes behavioral scores, integrates multiple scoring signals, evaluates computed scores against policy thresholds, and produces preliminary authorization recommendations. P1-2: Unity Framework implements "BQS=$\Sigma(w_i \cdot f_i)$, Coefficient Broadcast, Global Policy Distribution," providing unified scoring governance. The Unity Framework maintains the single governing qualification metric (BQS=AQS for autonomous agents), broadcasts weight coefficients to distributed enforcement gateways ensuring consistent policy application and distributes global policy updates when refinement occurs. The notation indicates these components provide the CORE QUALIFICATION ENGINE PROVIDING AQS COMPUTATION FOR AI AGENT AUTHORIZATION.

Behavioral Qualification Layer: Below the foundation, four components implement BEHAVIORAL QUALIFICATION functionality:

P1-3: Behavioral Profile analyzes "Historical Performance, Transaction Patterns, Engagement Metrics," extracting agent behavioral history to construct feature vectors for qualification scoring. This component tracks completion rates, success metrics, temporal patterns, and engagement quality over time.

P1-4: Context Analysis evaluates "Advertiser Quality Signals, Brand Safety Compliance, Content Alignment," assessing transaction context rather than agent history alone. This component verifies advertiser requirements are met, brand safety policies are respected, and content alignment targets are achieved.

P1-5: Collaboration measures "Multi-Agent Patterns, Coordination Quality, Data Sharing Behavior," particularly relevant for complex transactions involving multiple cooperating agents. This component evaluates how effectively agents coordinate, share necessary data, and maintain synchronization during multi-agent workflows.

P1-6: Fraud Detection performs "Anomaly Detection, Attribution Validation, Pattern Recognition," identifying suspicious behaviors that may indicate fraud, abuse, or system gaming. This component detects statistical anomalies, validates attribution claims, and recognizes fraud patterns requiring enforcement intervention.

These four components collectively implement PII-FREE AGENT SCORING BASED ON HISTORICAL PAT- TERNS, QUALITY SIGNALS, COLLABORATION, emphasizing that qualification assessment operates on behavioral signals rather than personally identifiable information, enabling privacy-preserving operation.

Pre-Spend Enforcement Layer: The middle tier implements PRE-SPEND ENFORCEMENT with NO TRANSACTION PROCEEDS WITHOUT AUTHORIZATION and DETERMINISTIC LATENCY:

P1-7: Enforcement Proxy serves as the "Pre-Spend Authorization Gate" implementing "AUTHORIZE/DENY/THROTTLE" decisions with "Deterministic<50 ms Latency," acting as the middleware interception point that gates all transaction execution. This component implements the Enforcement Gateway functionality described in FIG. 2, preventing unqualified transactions from proceeding while maintaining real-time responsiveness.

P1-8: Reconciliation provides "Signature Verification, Post-Transaction Beacons, Outcome Validation," performing cryptographic verification of agent signatures, collecting post-transaction performance beacons, and validating that actual outcomes match predicted qualification assessments. This component creates the feedback signal enabling closed-loop learning.

The solid arrows connecting P1-1 and P1-2 to P1-7 represent the critical authorization path-qualification scores computed by the engine flow through the unity framework to the enforcement proxy for authorization decisions. The connection between P1-7 and P1-8 shows the enforcement-to-reconciliation flow where authorization decisions and transaction executions feed outcome validation.

Tamper-Evident Audit Layer: The lower tier provides TAMPER-EVIDENT AUDIT infrastructure with SHA-256 LINKED CHAINS, IMMUTABLE DECISION TRAIL, REGULATORY COMPLIANCE:

P1-9: Token Service implements "Authentication, Authorization, Session Management," providing the cryptographic token infrastructure described in FIG. 3. This component generates attestation tokens, validates enforcement tokens, and manages session state for ongoing authorization sequences.

P1-10: Audit System maintains the "Immutable Ledger, SHA-256 Hash Chains, Merkle Tree Batching" previously described in FIG. 4, creating tamper-evident audit trails. This component records all authorization decisions, constructs hash-linked chains preventing retroactive modification and builds Merkle trees enabling efficient verification.

P1-11: Privacy Layer ensures "PII-Free Processing, Multi-Tenant Isolation, Behavioral Signals Only," protecting individual privacy while enabling system-wide learning. This component enforces data isolation between tenants, strips personally identifiable information, and ensures only behavioral signals (not identity data) inform qualification decisions.

Interface and Validation Layer: The bottom tier provides external interfaces and system validation:

P1-12: Dashboard delivers "Real-Time Analytics, System Monitoring," providing operational visibility into system performance, authorization metrics, and health indicators.

P1-13: API Gateway offers "External Integration, RESTful Endpoints," enabling third-party systems to invoke authorization services, retrieve decisions, and integrate authorization into existing workflows.

P1-14: System Proof documents "26 Inventions Unified, Reduction-to-Practice," referencing the comprehensive reduction to practice (382 code files, cryptographic verification) demonstrating the complete system implementation across all 26 inventions.

Data Flow Patterns: The legend indicates different flow types: Solid lines: primary data flow (e.g., qualification scores to enforcement proxy); Bold solid: critical authorization path (qualification to enforcement to audit); Dash-dot: governance/policy distribution (weight coefficients, thresholds); Black hub (●): central orchestration points (Qualification Engine, Unity Framework); Black outline boxes: Parent-1 core components.

The architecture establishes, in an aspect of an embodiment of the present invention, the complete foundation for AI-to-AI authorization: behavioral data feeds qualification scoring (P1-3 through P1-6→P1-1), unified policy governs scoring (P1-2), pre-spend enforcement gates transactions (P1-7), post-transaction reconciliation validates predictions (P1-8), cryptographic tokens authenticate participants (P1-9), immutable audit trails provide compliance (P1-10), privacy layers protect confidentiality (P1-11), and external interfaces enable integration (P1-12, P1-13). This foundation supports the closed-loop calibration (Parent-2) and AI-to-AI attestation (Continuation) layers that build upon this base architecture.

Figure 11B:
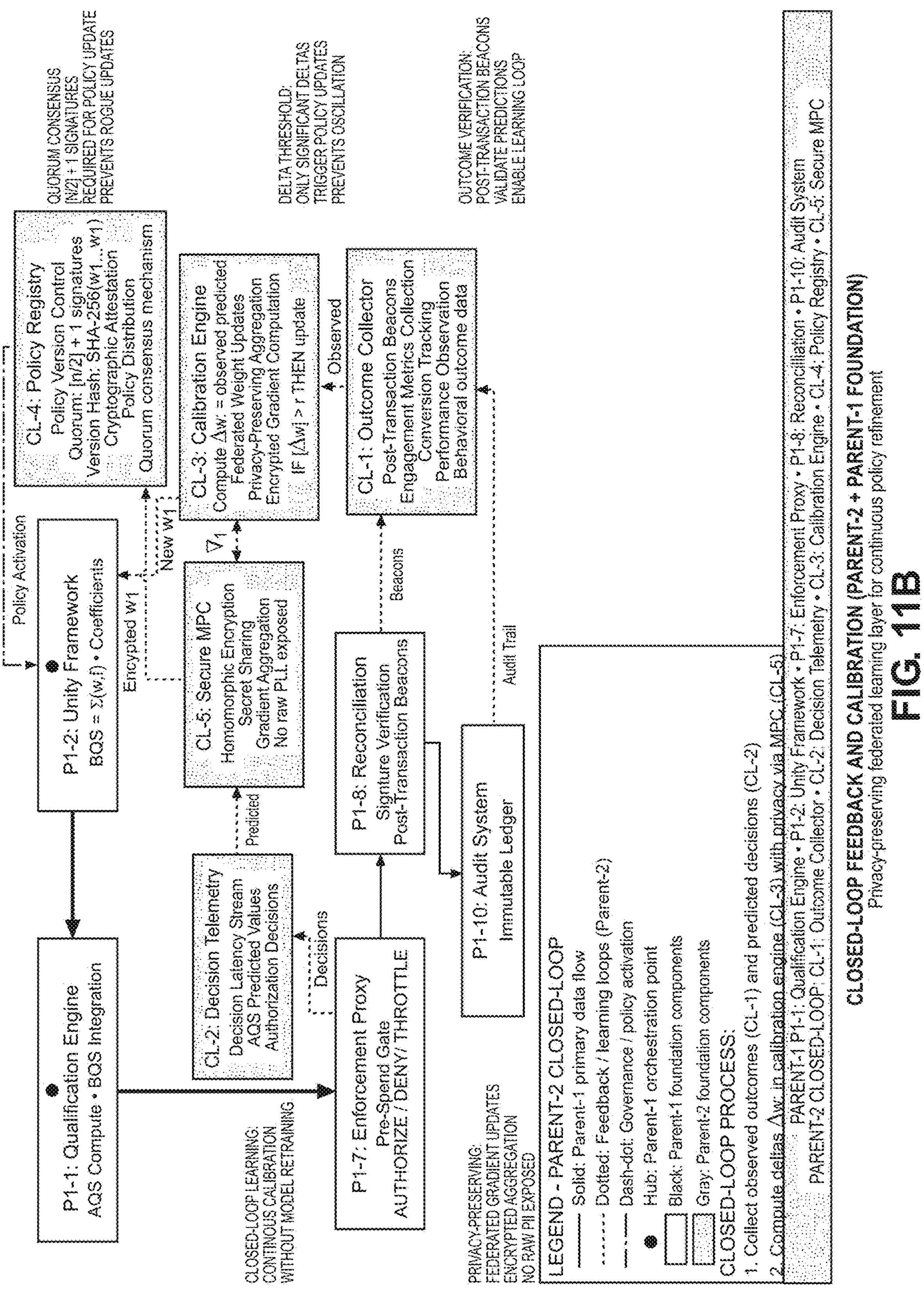
FIG. 11B illustrates a Closed-Loop Feedback and Calibration System according to aspects of embodiments of the present invention.

FIG. 11B—Closed-Loop Feedback and Calibration

FIG. 11B illustrates a Closed-Loop Feedback and Calibration System according to aspects of embodiments of the present invention. Specifically, FIG. 11B illustrates a closed-loop learning layer building, demonstrating how privacy-preserving federated learning enables continuous policy refinement without model retraining or raw data exposure, implementing CONTINUOUS CALIBRATION WITHOUT MODEL RETRAINING.

Foundation Integration: The diagram shows components from FIG. 11A: P1-1: Qualification Engine (AQS Compute, BQS Integration) connects to P1-2: Unity Framework ($BQS=\Sigma(w_i \cdot f_i)$, Coefficients), which broadcasts policy parameters and receives encrypted weight updates. The Unity Framework serves as the central policy distribution hub—it sends current weight coefficients ($w_i$) to enforcement gateways for AQS computation and receives refined weight updates (w_new) from the calibration engine after federated learning cycles.

Closed-Loop Learning System: The gray boxes represent closed-loop components implementing privacy-preserving learning:

CL-2: Decision Telemetry collects "Decision Logs, AQS Predicted Values, Authorization Decisions," capturing the enforcement gateway's predicted qualification (AQS scores) and actual authorization outcomes (AUTHORIZE/DENY/THROTTLE). This component feeds "observed vs. predicted" data into CL-5, enabling comparison between what the system predicted (qualification score) and what actually occurred (transaction outcome).

CL-5: Secure MPC implements "Homomorphic Encryption, Secret Sharing, Privacy-Preserving Aggregation," performing the cryptographic aggregation described in FIG. 5. This component receives encrypted gradients from multiple agents, computes the aggregated gradient Δglobal using secure multi-party computation, and ensures "no raw PII exposed"—individual agent performance data never leaves encrypted form during aggregation.

CL-3: Calibration Engine performs three critical operations: (1) "Compute $\Delta w_i=f(\text{observed}-\text{predicted})$": Calculate performance deltas for each weight coefficient, measuring how much observed outcomes deviated from predicted qualification; (2) "Federated Weight Updates": Apply delta-threshold logic—"IF $|\Delta w_i|>T$ THEN update"—only adjusting weights when changes exceed significance threshold T, implementing DELTA-THRESHOLD: ONLY SIGNIFI- CANT DELTAS TRIGGER POLICY UPDATES, PREVENTS OSCILLATION; (3) "Privacy-Preserving Aggregation": Aggregate encrypted gradients without exposing individual contributions.

The encrypted weight updates (encrypted new $w_i$) flow from CL-3 to P1-2: Unity Framework, updating the global policy parameters.

CL-4: Policy Registry maintains "Policy Version Store: Quorum: [n/2]+1 signatures, Version Hash: SHA-256(w_), Cryptographic Attestation, Policy Distribution" with quorum consensus mechanism. This component implements QUORUM CONSENSUS: 51% MAJORITY REQUIRED FOR POLICY UPDATE, PREVENTS ROGUE UPDATES—a single compromised node cannot unilaterally change policy; majority agreement is required. The registry computes version hashes enabling policy versioning, rollback capabilities, and audit trails. Policy Activation flows back to P1-2: Unity Framework via the dash-dot governance path.

Feedback Collection Path: The CLOSED-LOOP FEEDBACK path (dotted lines) shows the outcome collection flow: P1-7: Enforcement Proxy (Pre-Spend Gate, AUTHORIZE/DENY/THROTTLE) makes authorization decisions, which connect to P1-8: Reconciliation (Signature Verification, Post-Transaction Beacons) collecting actual transaction outcomes. These outcomes flow to CL-1: Outcome Collector implementing "Post-Transaction Beacons, Engagement Metrics Collection, Conversion Tracking, Performance Observations, Behavioral outcome data," gathering verified results. The notation explains BEACON VERIFICATION: POST-TRANSACTION BEACONS VALIDATE PREDICTIONS, ENABLE LEARNING LOOP—beacons from completed transactions provide ground truth for comparing against predicted qualification scores.

The observed outcomes flow from CL-1 to CL-2: Decision Telemetry, which pairs them with predicted values (AQS scores from P1-1). The paired observed-predicted data feeds into CL-5: Secure MPC for aggregation, then to CL-3: Calibration Engine for delta computation and weight updates, then to CL-4: Policy Registry for consensus and versioning, and finally back to P1-2: Unity Framework for distribution to enforcement gateways.

The audittrail flows from P1-8: Reconciliation to P1-10: Audit System (Immutable Ledger), recording both authorization decisions and verified outcomes for compliance and forensic analysis.

Flow Pattern Legend: The legend distinguishes: Solid lines: Parent-1 primary data flow (qualification scores, enforcement decisions); Dotted lines: Parent-2 feedback/learning loops (observed outcomes, aggregated gradients, policy updates); Dash-dot lines (purple): Governance/policy activation (policy version distribution, quorum consensus signals); Black hub (●): Parent-1 orchestration (Qualification Engine, Unity Framework); Gray boxes: Parent-2 closed-loop components (CL-1 through CL-5).

Operational Cycle: The complete closed-loop operates continuously: (1) Qualification & Enforcement: P1-1 computes AQS using current weights from P1-2, P1-7 enforces authorization decisions; (2) Outcome Collection: P1-8 collects post-transaction beacons, CL-1 aggregates verified outcomes; (3) Delta Computation: CL-2 pairs observed outcomes with predicted scores, CL-3 computes performance deltas; (4) Privacy-Preserving Aggregation: CL-5 uses secure MPC to aggregate encrypted gradients across agents without exposing individual data; (5) Threshold Filtering: CL-3 applies delta-threshold-only significant weight changes ($|\Delta w_i|>T$) propagate to prevent oscillation from noise; (6) Quorum Consensus: CL-4 requires majority agreement ([n/2]+1 nodes) before activating policy updates, preventing rogue updates; (7) Policy Distribution: P1-2 broadcasts refined weight coefficients to all enforcement gateways; (8) Improved Authorization: Subsequent AQS computations use refined weights, improving qualification accuracy.

The architecture enables continuous calibration-policies adapt to changing conditions based on verified outcomes—while maintaining three critical properties: (1) No Model Retraining: Weight coefficient adjustments occur through delta application ($w\_new=w\_old+\alpha\times\Delta global$), not expensive model retraining; (2) Privacy Preservation: Secure MPC and homomorphic encryption ensure individual agent performance data never exposes; (3) Stability: Delta-thresholds prevent minor fluctuations from triggering updates, quorum consensus prevents unilateral policy changes.

This closed-loop architecture transforms the static authorization system (such as the system disclosed in the '365 patent application) into an adaptive learning system that continuously improves qualification accuracy based on verified transaction outcomes while maintaining strict privacy guarantees and preventing both policy oscillation and unauthorized modifications.

Figure 11C:
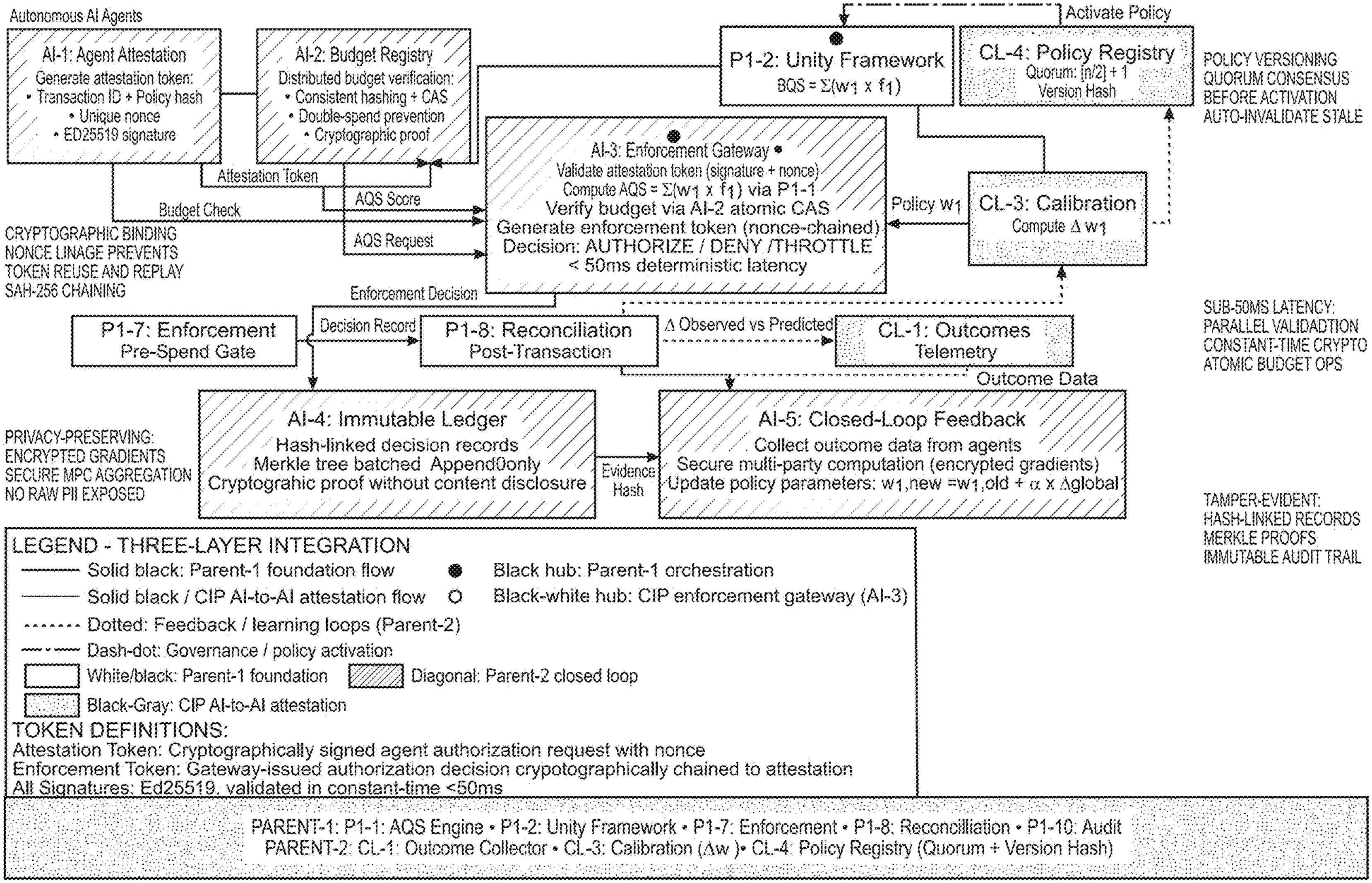
FIG. 11C illustrates an AI-to-AI Attestation and Authorization system according to aspects of embodiments of the present invention.

FIG. 11C—AI-to-AI Attestation and Authorization

FIG. 11C illustrates an AI-to-AI Attestation and Authorization system according to aspects of embodiments of the present invention. Specifically, FIG. 11C presents the complete three-layer integrated system demonstrating how the Continuation AI-to-AI attestation layer builds upon a closed-loop learning system (such as the system disclosed in the '443 patent application) and an authorization system (such as the system disclosed in the '365 patent application) to create end-to-end autonomous agent authorization. The diagram visually distinguishes three application layers through box styling and line colors: white/black boxes represent Parent-1 foundation components, gray boxes represent Parent-2 closed-loop components, and blue-gray boxes represent Continuation AI-to-AI attestation components.

The protocol-layer governance sequence of FIG. 11C improves computer functionality by reducing execution-state divergence, preventing unauthorized state transitions, and enforcing deterministic execution ordering across distributed systems.

The top section shows the Continuation autonomous agent layer comprising five components: AI-1: Agent Attestation generates cryptographically signed attestation tokens containing Transaction ID, Policy hash, unique Nonce, and Ed25519 signature, implementing the token structure described in FIG. 3. AI-2: Budget Registry performs distributed budget verification using consistent hashing and atomic compare-and-swap operations as detailed in FIG. 7. These components provide cryptographic binding where nonce linkage prevents token reuse and replay attacks, with side-channel hardened constant-time operations previously described in FIG. 9.

The center hub AI-3: Enforcement Gateway serves as the authorization orchestration point, validating agent credentials through Ed25519 signature verification, computing $AQS=\Sigma(w_i \times f_i)$ via P1-1 Qualification Engine, verifying budget via AI-2's atomic CAS operations, and generating nonce-chained enforcement tokens. The gateway achieves sub-50 ms latency through parallel validation described in FIG. 2 and the sequence timing demonstrated in FIG. 6. Enforcement decisions flow to P1-7: Enforcement (Pre-Spend Gate) for transaction execution control and to P1-8: Reconciliation for outcome collection.

AI-4: Immutable Ledger receives decision records from P1-8, implementing hash-linked chains and Merkle tree batching as described in FIG. 4, providing tamper-evident audit trails. AI-5: Closed-Loop Feedback collects outcome data, executes secure multi-party computation on encrypted gradients (as detailed in FIG. 5), and updates policy parameters through the learning rule $w_i$_new=$w_i$_old+α×Δglobal, with feedback mechanisms and attestation aspects.

The P1-1: Qualification Engine of FIG. 11B provides the core qualification and enforcement infrastructure: P1-1: Qualification Engine computes AQS behavioral scores; P1-2: Unity Framework maintains BQS=$\Sigma(w_i \cdot f_i)$ governance and broadcasts coefficients to enforcement gateways; P1-7: Enforcement Proxy gates transaction execution based on AUTHORIZE/DENY/THROTTLE decisions; P1-8: Reconciliation verifies signatures and collects post-transaction beacons; P1-10: Audit System maintains immutable ledger with SHA-256 hash chains and Merkle tree batching.

The closed-loop layer of FIG. 11B enables continuous calibration: CL-1: Outcome Collector aggregates verified transaction results; CL-2: Decision Telemetry pairs observed outcomes with predicted AQS values; CL-3: Calibration Engine computes weight deltas $\Delta w_i$=f(observed−predicted) and applies delta-threshold filtering; CL-4: Policy Registry maintains versioned policies with quorum consensus ([n/2]+1 signatures); CL-5: Secure MPC performs privacy-preserving aggregation using homomorphic encryption.

Policy integration flows demonstrate multi-layer coordination: AI-3 receives policy weights $w_i$ from P1-2 Unity Framework for AQS computation; encrypted weight deltas flow from CL-3 through CL-5's secure aggregation to produce system-wide policy updates; CL-4 requires quorum consensus before policy activation, preventing rogue updates; and P1-2 broadcasts refined policies to all gateways, ensuring consistent authorization across distributed deployments.

The two-token architecture creates cryptographic authorization chains: Attestation tokens (agent-issued authorization requests with nonce) flow from AI-1 to AI-3; Enforcement tokens (gateway-issued authorization decisions cryptographically chained to attestation via Ed25519, validated in constant-time) flow from AI-3 to agents and AI-4. The nonce binding mechanism described in FIG. 3 prevents replay attacks by ensuring each token pair is session-specific, while the transport-to-transaction binding detailed in FIG. 10 prevents token substitution across different TLS sessions.

The legend distinguishes data flow types: solid black lines represent Parent-1 foundation flows (qualification, enforcement, audit); solid blue-gray lines represent Continuation AI-to-AI attestation flows (agent-to-gateway-to-ledger); dotted lines represent FIG. 11B's closed-loop feedback/learning loops (outcome collection, gradient aggregation); and dash-dot lines represent governance/policy activation (version distribution, quorum signaling). Black hubs (●) mark Parent-1 orchestration points at P1-1 and P1-2, while the blue-gray hub (●) marks the Continuation enforcement gateway AI-3 as the authorization control point.

The complete operational sequence proceeds through agent attestation (AI-1), parallel budget verification (AI-2) and credential validation (AI-3), authorization decision orchestration aggregating validation/scoring/budget results, enforcement execution (P1-7), audit recording (AI-4), outcome collection (P1-8, CL-1), performance delta computation (CL-2, CL-3), privacy-preserving gradient aggregation (CL-5), quorum-based policy consensus (CL-4), and policy distribution (P1-2) back to gateways, creating a continuous improvement cycle where observed transaction outcomes refine authorization policies without exposing individual agent performance data.

The integrated architecture demonstrates how aspects of embodiments of the present invention build upon and extends previous disclosures: The '365 patent application, for instance, provides the foundational BQS qualification engine, unity framework, pre-spend enforcement, reconciliation, and immutable audit infrastructure; The '443 patent application, for instance, adds continuous calibration through outcome collection, decision telemetry, calibration engines computing weight deltas, policy registries with version control, and secure multi-party computation; Aspects of embodiments of the present invention extend these foundations with autonomous agent-specific embodiments including cryptographic attestation token generation by AI agents, distributed budget enforcement preventing double-spend attacks, constant-time cryptographic operations hardened against side-channel attacks, and transport-to-transaction binding securing agent-to-gateway communications.

The autonomous agent according to aspects of embodiments of the present invention constitute a species within the genus of behavioral qualification and enforcement systems described in Applicant's previous parent applications, applying the generalized entity-agnostic teachings to the specific context of autonomous artificial-intelligence agents while maintaining architectural compatibility and leveraging the foundational qualification, learning, and audit capabilities established by the '365 patent application and the '443 patent application.

FIG. 11C also illustrates a protocol-layer governance sequence for deterministic, pre-execution control of distributed computational actions. As shown, an execution request originating from a computational actor is first encapsulated within a protocol-bound request structure and transmitted to a protocol enforcement domain prior to execution.

The protocol enforcement domain performs eligibility verification and qualification assessment based on one or more policy-referenced qualification parameters, followed by a deterministic authorization decision that is generated before any associated resource commitment, execution, or state transition occurs. Authorization outcomes are enforced through non-bypassable protocol controls, ensuring that execution cannot proceed absent an affirmative authorization decision.

Each authorization decision is cryptographically recorded within an immutable, append-only record structure that provides verifiable proof of protocol compliance while preventing retroactive modification or selective omission. Outcome data resulting from authorized execution is subsequently propagated through a closed-loop feedback pathway, enabling controlled updates to qualification parameters that govern future execution requests.

The sequence depicted in FIG. 11C operates independently of application-specific logic, identity frameworks, or hardware-rooted attestation mechanisms, and instead enforces governance at a protocol session layer that deterministically constrains execution ordering, authorization validity, and state evolution across distributed computing environments. Autonomous agents, service endpoints, transactional systems, and machine-generated execution requests represent non-limiting embodiments of the protocol-layer governance sequence illustrated.

DEFINITIONS

The following definitions apply throughout this specification and claims. Terms not explicitly defined herein shall be given their ordinary and customary meaning in the relevant technical field as understood by one of ordinary skill in the art at the time of filing.

A. Core System Components

"Agent Attestation Token" (AAT) means a cryptographically signed data structure generated by an autonomous agent [300] comprising at least: a Transaction Identifier [302] uniquely identifying the authorization request; a Policy Reference Hash [304] binding the attestation to a policy configuration; a Nonce Value [306] providing replay attack prevention; and a Digital Signature [308] computed using an asymmetric cryptographic algorithm over at least the Transaction Identifier, Policy Reference Hash, and Nonce Value. The AAT optionally comprises additional context fields such as an Entity Credential [310] identifying a responsible entity. The AAT serves as an authorization request artifact in autonomous agent transactions. (See FIG. 3.)

"Agent Registry" means a data store [110] maintaining records of registered autonomous agents, including one or more of: agent identity credentials, public keys for signature verification, credential validity information, authorization scope permissions, and policy references. The registry responds to validation queries from an Enforcement Gateway [108] and receives updated policy references from a Feedback & Policy Update Module [114] during feedback propagation. In some embodiments, the registry is distributed across a plurality of nodes with optional deferred synchronization. (See FIG. 1.)

"Agent Qualification Score" (AQS) means a numerical value computed by a Scoring Module [212] evaluating one or more of: autonomous agent reliability, behavioral consistency, contextual risk, and historical performance. In some embodiments, the AQS is computed as a weighted summation [830]: $AQS=\Sigma(w_i \times f_i)$ for i=1 to N [832], where $w_i$ represents policy-defined weight coefficients [818, 820, 822] and $f_i$ represents normalized feature values [802, 804, 806, 808]. AQS computation is deterministic for a given feature vector and parameter set, producing repeatable outputs rather than probabilistic inferences. The AQS governs authorization decisions through comparison [840] against one or more policy-defined threshold parameters. (See FIG. 8.)

"Agent-Allocated Budget" (AAB) means a resource constraint enforced at a pre-spend authorization point through a Budget Verification Module [220]. The AAB tracks budget state including one or more of: available resources [720], total allocated amount [726], reserved resources [722] for pending transactions, and consumed resources [724] for completed transactions. The Budget Verification Module comprises atomic transaction logic executed on registry nodes, ensuring serialized budget reservation. The AAB mechanism employs atomic operations [728, 750] to prevent resource overruns and race conditions. (See FIG. 7.)

"Autonomous Agent" means a software entity [100] executing on one or more processors, microcontrollers, or distributed compute environments, capable of one or more of: initiating, evaluating, negotiating, and executing transactions programmatically without requiring continuous human supervision. Agent Nodes [102, 104, 106] generate behavioral signals, submit attestation tokens [116], and execute authorized transactions within defined operational parameters. For purposes of this specification, the term encompasses artificial intelligence systems, automated decision engines, robotic process automation modules, machine learning systems, and any other programmatic entity operating with delegated authority. (See FIG. 1.)

"Behavioral Qualification Score" (BQS) means a governing qualification metric disclosed in the parent applications, computed using a mathematical coordination framework incorporating coordination, monetization, and engagement parameters. In some embodiments, $BQS=\Sigma(w_i \cdot f_i)$, where coordination variables C, M, and E inform the feature vector composition. BQS computation is deterministic for a given feature vector and parameter set. In autonomous agent embodiments, AQS serves as a direct instantiation of BQS, applying identical mathematical coordination principles across non-human entities. The Unity Framework [P1-2] is invariant to actor type; only the feature vector changes between human user qualification and autonomous agent qualification. (See FIG. 11A, FIG. 11C.)

B. Cryptographic Components

"Bilateral Attestation" means a cryptographic protocol wherein a plurality of autonomous agents exchange mutually verifiable attestation artifacts prior to transaction execution. Each participating agent generates attestation tokens binding its identity, authority, and transaction commitment, with authorization proceeding when required attestations are validated.

"Binding Hash" means a cryptographic hash value [328] computed through a Cryptographic Binding operation [314] over a combination of attestation and enforcement token elements, such as: binding hash=HashFunction(attestation_nonce||enforcement_token_id||timestamp) [316], creating tamper-evident linkage between an Attestation Token [300] and its corresponding Enforcement Token [318]. In a preferred embodiment, SHA-256 serves as the hash function. The binding hash prevents token substitution and replay attacks by cryptographically committing authorization decisions to specific attestation contexts. (See FIG. 3.)

"Constant-Time Cryptographic Operations" means cryptographic implementations [910] wherein execution time does not substantially depend on input byte values, message content, public key values, or signature validity outcomes [920]. Constant-time operations prevent timing-based side-channel attacks [934] by ensuring one or more of: (a) no conditional branches based on secret data [944]; (b) memory access patterns independent of secret values [946]; and (c) arithmetic operations completing in substantially fixed time regardless of operand values [948]. Valid and invalid signature verifications exhibit substantially identical timing [926, 928, 932]. (See FIG. 9.)

"Counter-Attestation Token" (CAT) means a cryptographically signed artifact generated by a responding agent in bilateral or multi-agent attestation workflows, committing the responding agent to the transaction context established by an initiating agent's attestation token. The CAT cryptographically binds the responding agent's identity, authority, and acceptance to transaction parameters. The Counter-Attestation Token incorporates the initiating token's nonce, ensuring symmetric transcript binding across participants.

"Digital Signature" means a cryptographic primitive [308, 330] computed using an asymmetric cryptographic algorithm that binds a signer's identity to a message payload, enabling recipients to verify message authenticity and integrity using the signer's public key. In a preferred embodiment, Ed25519 serves as the signature algorithm. Agent attestation tokens include agent digital signatures [308]; enforcement tokens include gateway digital signatures [330]. (See FIG. 3.)

"Ed25519" means an elliptic curve digital signature algorithm employing Curve25519, as specified in RFC 8032. Ed25519 represents a preferred embodiment of a digital signature algorithm suitable for the attestation and verification operations disclosed herein. Alternative signature algorithms providing equivalent cryptographic assurance may be substituted without departing from the scope of the invention. (See FIG. 2, FIG. 9)

"Hash-Linked Chain" means an append-only data structure [400] wherein each record [402, 406, 410, 414] cryptographically binds to one or more previous records through hash computation [426]: $H_n$=HashFunction($H_{n-1}$||$Record_n$). In a preferred embodiment, SHA-256 serves as the hash function. The chain begins with a genesis hash [404] and continues through sequential hash links [408, 412, 416]. Modification of any record invalidates subsequent hash values, providing tamper-evident integrity for sequential authorization records. Each record contains authorization decision data including one or more of: decision identifier, agent identifier, timestamp, and outcome. (See FIG. 4.)

"Merkle Tree" means a hierarchical cryptographic data structure [428] wherein Leaf Nodes contain individual data hashes [430, 432, 434, 436, 438, 440, 442] and Branch Nodes contain combined hashes [444, 446, 448, 450] of child node values, converging through intermediate nodes [452, 454] to produce a Merkle Root [456] that provides cryptographic commitment to a batch of data [458]. Merkle trees enable efficient verification of individual record inclusion through proof paths from leaf to root. (See FIG. 4.)

"Nonce" means a cryptographic value [306] generated for a specific transaction context, serving as a mechanism for replay attack prevention. The Nonce Value [306] in an Attestation Token is extracted [312] and cryptographically bound to an Enforcement Token through a Linked Nonce field [322] via a Token Reuse Prevention Mechanism [332]. Nonce verification [334] confirms correspondence between attestation and enforcement nonces; mismatches result in rejection [340]. Nonce correspondence is verified against a session-extracted nonce derived from the transport-layer transcript, ensuring token validity is bound to session context. (See FIG. 3, FIG. 10.)

"Policy-Version Hash" means a cryptographic hash [812] computed over a policy parameter set (such as weight coefficients, threshold values, or risk scores) governing authorization decisions. The Policy Reference Hash [304] in an Attestation Token references the policy hash value. A Policy Version Generator [540] computes new policy-version hashes when parameters change. The policy-version hash enables agents and enforcement gateways to operate under synchronized policy configurations. (See FIG. 3, FIG. 5, FIG. 8.)

"Transport-to-Transaction Binding" means a cryptographic linkage [1022] wherein a nonce extracted from a transport-layer session transcript [1018] during mutual authentication is bound to an attestation token and corresponding enforcement token, preventing token reuse across sessions and eliminating token substitution attacks. The TLS 1.3 Session Transcript Hash [1018] is immutable for the session lifecycle and incorporates attestation context (such as attestation_nonce and policy_version_hash) into the session establishment. Gateway Verification [1024] confirms that the transcript-extracted nonce corresponds to the token nonce before authorization proceeds. Transport-to-transaction binding ensures that tokens intercepted from one authenticated session cannot be replayed in a different session context. (See FIG. 10.)

C. System Architecture Components

"Closed-Loop Feedback" means a system architecture wherein verified post-transaction outcomes inform refinement of pre-transaction qualification parameters. A Feedback & Policy Update Module [114] collects outcome data from completed transactions [124] and aggregated outcome metrics [128] from an Immutable Ledger [112], generates updated policy parameters [126], and distributes them to system components including an Agent Registry [110] and Enforcement Gateway [108]. (See FIG. 1, FIG. 5, FIG. 11B.)

"Compare-and-Swap" (CAS) means an atomic operation [728, 750] that: (a) evaluates whether a condition is satisfied (such as available≥requested) [730]; (b) if satisfied, atomically updates state and returns success [732]; (c) if not satisfied, fails without modification and returns failure [734]. CAS is atomic, linearizable, and non-interleaving, providing serialization guarantees in concurrent execution environments. CAS operations prevent race conditions and enable double-spend prevention [736] in distributed resource enforcement by ensuring only one concurrent request succeeds [738]. (See FIG. 7.)

"Consistent Hashing" means a distributed systems technique implemented by a hash function [710] wherein data items deterministically map to storage nodes based on hash values. In some embodiments, the mapping is computed as: hash_value=HashFunction(identifier) mod range. Consistent hashing enables horizontal scalability by distributing load across a plurality of nodes [702, 704, 706, 708] without requiring global coordination for routing decisions. (See FIG. 7.)

"Decision Orchestration Module" means a gateway component [234] that aggregates one or more of: validation results [236], scoring outcomes [238], and budget verification status [240] to produce authorization decisions. The module implements decision logic generating an Enforcement Token [246] with an authorization decision [248]. (See FIG. 2.)

"Distributed Budget Registry" means a scalable budget enforcement infrastructure [700] employing a plurality of Registry Nodes [702, 704, 706, 708], each managing defined identifier ranges and maintaining local state stores. The registry uses deterministic routing for request distribution and atomic operations [728] for resource reservation, preventing double-spend through serialization of concurrent requests. (See FIG. 7.)

"Enforcement Gateway" means a system component [108] positioned as an authorization control point between autonomous agents [100] and downstream transactional systems. The gateway validates attestations, issues enforcement tokens [120], and performs one or more of: (a) validation operations [204] for cryptographic signature verification; (b) scoring operations [212] for qualification computation; and (c) budget verification operations [220] for resource limit enforcement. In some embodiments, these operations execute via parallel paths [228, 230, 232]. The gateway exchanges registry validation queries [118] with an Agent Registry [110] and records authorization decisions [122] to an Immutable Ledger [112]. (See FIG. 1, FIG. 2.). For clarity, the term 'Enforcement Gateway' refers to the same logical gateway component illustrated at different levels of abstraction and/or deployment contexts throughout the figures, including Enforcement Gateway [108], its internal architecture [200], the policy-distribution recipient instance [544], and the sequence-diagram instance [602].

"Enforcement Token" means a cryptographically signed artifact [318] generated by an Enforcement Gateway [108] comprising at least: an Authorization Decision Outcome [320] indicating authorization status; a Linked Nonce [322] cryptographically corresponding to an attestation token; a Token Identifier [324]; a Timestamp [326]; a Cryptographic Binding Hash [328] computed over token elements; and a Gateway Digital Signature [330]. The Enforcement Token forms a cryptographically verifiable authorization record linking nonce, decision, and policy version to a specific agent context, serving as a forensic proof object for audit and dispute resolution. (See FIG. 3.)

"Federated Learning" means a distributed machine learning approach implemented through a Privacy-Preserving Learning System [500] wherein Agent Nodes [502, 504, 506, 508] compute local updates (such as gradients Vi) representing performance deltas [510, 512, 514, 516] from local outcome data, encrypt those updates through encryption modules [518, 520, 522, 524] to produce protected values [528, 530, 532, 534], and contribute them to a Secure Aggregator [526] without exposing individual performance data. Gradient vectors contain no raw clickstream or transaction-level PII. (See FIG. 5.)

"Homomorphic Encryption" means encryption schemes implemented in encryption modules [518, 520, 522, 524] enabling operations on encrypted data that, when decrypted, produce results equivalent to operations performed on unencrypted data. Homomorphic encryption enables secure aggregation of encrypted values by a Secure Aggregator [526] without decrypting individual contributions. (See FIG. 5.)

"Immutable Ledger" means an append-only, cryptographically secured data structure [112] providing tamper-evident authorization logging that records decisions and tokens. The ledger comprises one or more of: a Hash-Linked Chain [400] for sequential auditability and a Merkle Tree Structure [428] for batched integrity verification. Ledger records include cryptographic binding hash linking attestation nonce to enforcement token identifier, establishing forensic proof of authorization context. The ledger receives authorization decision recordings [122] from an Enforcement Gateway [108] and provides aggregated outcome metrics [128] to a Feedback & Policy Update Module [114]. (See FIG. 1, FIG. 4.)

"Policy Registry" means a versioned data store [CL-4] maintaining policy parameters including one or more of: version control information, quorum requirements for policy updates, version hashes, cryptographic attestation of policy authenticity, and policy distribution mechanisms. The Policy Registry stores version hashes derived from parameter sets and distributes configuration only after quorum validation. A Policy Store [242] provides versioned parameters to a Scoring Module [212] via parameter requests [244]. (See FIG. 2, FIG. 11B.)

"Pre-Spend Enforcement" means an authorization paradigm implemented by an Enforcement component [P1-7] wherein qualification assessment, budget verification, and policy enforcement occur before a resource-consuming transaction executes. A Pre-Spend Authorization Gate produces authorization decisions (such as AUTHORIZE, DENY, or THROTTLE) within a latency suitable for real-time transaction processing [638], preventing waste by denying unqualified or unauthorized transactions prior to resource commitment. (See FIG. 6, FIG. 11A.)

"Qualification Engine" means a system component [P1-1] computing behavioral qualification scores using rules-based logic, machine-learning models, or hybrid architectures. The engine performs one or more of: score computation, framework integration, threshold evaluation, and performance scoring. Feature retrieval [214] extracts metrics, summation operations [216] compute qualification scores, and comparison logic [218] produces authorization recommendations. The Qualification Engine produces deterministic outputs for a given input set rather than probabilistic model predictions. (See FIG. 2, FIG. 8, FIG. 11A.)

"Quorum-Based Authorization" means a multi-agent coordination protocol maintained by a Policy Registry [CL-4] requiring approval from a threshold number of participants before policy updates activate. Quorum enforcement is applied at activation, not proposal, ensuring policies are certified before execution. Quorum requirements prevent unilateral policy modifications and ensure multi-party agreement for policy changes. In some embodiments, the quorum threshold is configurable. (See FIG. 111B.)

"Secure Multi-Party Computation" (MPC) means cryptographic protocols implemented by a Secure Aggregator [526] and Secure MPC component [CL-5] enabling multiple parties to jointly compute a function over their combined inputs while keeping individual inputs private. No participant can reconstruct another participant's input from the aggregated output or intermediate values. The aggregator computes an aggregate update Δglobal from individual contributions [538], performing aggregation without exposing individual data. (See FIG. 5, FIG. 11B.)

"Unity Framework" means a mathematical coordination architecture [P1-2] disclosed in the parent applications that unifies qualification decisions through a governing formula. In some embodiments, the formula comprises $BQS=\Sigma(w_i \cdot f_i)$. The framework performs coefficient distribution to enforcement components and policy distribution. Coordination variables (such as C, M, and E representing coordination quality, monetization potential, and engagement patterns) inform feature vector composition. The Unity Framework is invariant to actor type; only the feature vector changes between entity types. This invariance enables scoring modules to operate within a coherent qualification paradigm across entity types including human users, avatars, and autonomous agents. (See FIG. 11A, FIG. 11B, FIG. 11C.)

D. Authorization Outcomes and States

"AUTHORIZE" means an enforcement decision outcome [320, 848] indicating that authorization criteria are satisfied, including one or more of: (a) attestation token validation succeeded [912]; (b) agent qualification score meets or exceeds an authorization threshold [842]; and (c) sufficient resources exist for the requested transaction [746]. AUTHORIZE permits transaction execution. (See FIG. 3, FIG. 7, FIG. 8.)

"DENY" means an enforcement decision outcome [320] indicating that one or more authorization criteria failed, including one or more of: (a) attestation token validation failed [914] or token was rejected as stale or reused [340]; (b) agent qualification score falls below a minimum threshold [842]; or (c) insufficient resources exist for the requested transaction [748]. DENY prohibits transaction execution. (See FIG. 3, FIG. 7, FIG. 8, FIG. 9.)

"THROTTLE" means an enforcement decision outcome [320] indicating that an agent meets minimum qualification standards but falls below a full authorization threshold [842]. THROTTLE permits transaction execution with one or more restrictions such as reduced priority, delayed execution, scope reduction, or additional verification requirements. (See FIG. 8.)

E. Privacy and Security Terms

"Cookie-Free" means system operation without reliance on HTTP cookies, persistent browser identifiers, or cross-site tracking mechanisms for behavioral qualification or attribution. Cookie-free architectures preserve privacy by avoiding identifier-based tracking while enabling behavioral assessment through contextual and aggregate signals. A Privacy Layer [P1-11] ensures identifier-free processing and behavioral signals usage. (See FIG. 11A.)

"PII-Free" means system operation without collection, storage, processing, or transmission of Personally Identifiable Information (PII) at any system layer. PII-free architectures compute qualification scores and enforce authorization decisions using behavioral signals, contextual data, and aggregate patterns rather than identity-bearing data elements. A Secure MPC component [CL-5] ensures no raw PII is exposed during aggregation. (See FIG. 5, FIG. 11A, FIG. 11B.)

"Privacy-Preserving" means system designs and cryptographic protocols that enable collective learning, aggregate analysis, and policy refinement without exposing individual-level data. Privacy-preserving mechanisms include one or more of: homomorphic encryption, secret sharing [518-524], secure aggregation [526], encrypted updates, and federated learning where individual agent outcome data remains local to Agent Nodes [502-508]. Gradient vectors contain no raw clickstream or transaction-level PII, ensuring that aggregated metrics do not constitute or reconstitute personally identifiable information. (See FIG. 5.)

"Replay Attack" means an adversarial technique wherein a valid token is intercepted and re-submitted in a different transaction context. Replay attacks are prevented through a Token Reuse Prevention Mechanism [332] using one or more of: single-use nonces [306], binding hash verification [328], nonce correspondence validation [334], and timestamp-based freshness checks [326]. Replay is prohibited even where the token and signature remain cryptographically valid, because the nonce is session-bound and rejected if transcript mismatch is detected. Invalid or stale tokens are rejected [340]. (See FIG. 3, FIG. 10.)

"Side-Channel Attack" means an adversarial technique [936] wherein an attacker attempts to infer information by measuring execution characteristics such as timing. Side-channel attacks are prevented through constant-time cryptographic implementations [938] where operations exhibit uniform timing with no correlation between timing and data validity, ensuring an attacker gains no information from such measurements. (See FIG. 9.)

"Token Substitution Attack" (also referred to as session substitution) means an adversarial technique [1030] wherein an attacker intercepts a token from one session and attempts to replay the token in a different session context. A token valid in one session context is rejected in a different session context. Token substitution attacks are prevented through transport-to-transaction binding [1022] wherein a token's nonce is bound to session-specific transcript data [1033], and mismatched sessions cause Gateway Detection [1034] to reject the attempt. (See FIG. 10.)

F. Performance and Operational Terms

"Deterministic Latency" means authorization processing wherein response time is bounded and predictable regardless of input variations. Latency remains bounded because validation, scoring, and budget enforcement execute in parallel paths [228, 230, 232] that complete within a predetermined time window. The disclosed system achieves authorization within a latency suitable for real-time transaction processing [638], enabled by parallel execution of validation operations [614, 616]. The authorization sequence from attestation token generation [610] through enforcement token receipt [634, 636] completes within a predetermined latency threshold. (See FIG. 6.)

"Feature Vector" means a structured array [800] of normalized agent performance metrics serving as input to qualification score computation. Feature vectors contain one or more behavioral dimensions including: $f_1$: Historical Transaction Performance [802] (such as completion rate, engagement quality, or success metrics); $f_2$: Quality Metrics [804] (such as compliance, alignment, or policy adherence); $f_3$: Collaboration Patterns [806] (such as coordination quality or data sharing behavior); and additional feature dimensions [808] (extensible to N dimensions as defined by policy). (See FIG. 8.)

"Gradient" means a mathematical representation [510-516] of a direction and magnitude of parameter adjustment based on observed versus expected outcomes. In closed-loop feedback, local gradients are computed representing performance deltas at each agent. These gradients aggregate through a Secure Aggregator [526] to produce a global update [538] indicating how parameters should change to improve future accuracy. (See FIG. 5.)

"Learning Rate" means a parameter controlling the magnitude of coefficient adjustments during policy refinement [536]. In some embodiments, the update formula comprises: $w\_new = w\_old + \alpha \times \Delta global$, where $\alpha$ represents the learning rate. Higher learning rates cause more rapid adaptation; lower rates provide more gradual refinement. (See FIG. 5.)

"Threshold Parameters" means policy-defined boundaries [840] governing authorization decision classification through comparison operations [842]. Threshold parameters include one or more of: an authorization threshold above which agents receive AUTHORIZE decisions; and a minimum threshold below which agents receive DENY decisions. Agents scoring between thresholds may receive THROTTLE decisions. Threshold values are configurable through policy mechanisms. (See FIG. 8.)

"Weight Coefficients" ($w_i$) means policy-defined multipliers [818, 820, 822] applied to feature values during qualification score computation, retrieved through a Policy Store [816]. In some embodiments, weight coefficients satisfy a normalization constraint [824] ensuring bounded score output. Coefficients are refined through closed-loop feedback via a Calibration Engine [CL-3]. (See FIG. 8, FIG. 111B.)

G. Three-Layer Architecture Component Designators

Parent-1 Foundation Components (P1-x): The following component designators reference the Parent-1 foundation layer as depicted in FIG. 11A: • P1-1: Qualification Engine (score computation, framework integration, threshold evaluation; produces deterministic outputs) • P1-2: Unity Framework (unified scoring formula, coefficient distribution, policy distribution; invariant to actor type) • P1-3: Behavioral Profile (historical performance, transaction patterns, engagement metrics) • P1-4: Context Analysis (quality signals, compliance assessment, alignment evaluation) • P1-5: Collaboration (multi-agent patterns, coordination quality, data sharing behavior) • P1-6: Fraud Detection (anomaly detection, validation, pattern recognition) • P1-7: Enforcement Proxy (pre-spend authorization gate, decision output) • P1-8: Reconciliation (signature verification, post-transaction signals, outcome validation) • P1-9: Token Service (authentication, authorization, session management) • P1-10: Audit System (immutable ledger, hash chains, tree structures) • P1-11: Privacy Layer (PII-free processing, tenant isolation, behavioral signals) • P1-12: Dashboard (analytics, monitoring) • P1-13: API Gateway (external integration, endpoints) • P1-14: System Proof (unified inventions, reduction-to-practice)

Parent-2 Closed-Loop Components (CL-x): The following component designators reference the Parent-2 closed-loop layer as depicted in FIG. 11B: • CL-1: Outcome Collector (post-transaction signals, metrics collection, performance observations) • CL-2: Decision Telemetry (decision stream, predicted values, authorization decisions) •

CL-3: Calibration Engine (delta computation, federated updates, privacy-preserving aggregation, threshold-based update triggering) • CL-4: Policy Registry (version control, configurable quorum requirements, version hashing, cryptographic attestation, policy distribution after quorum validation) • CL-5: Secure MPC (encryption, secret sharing, aggregation, privacy preservation; no participant can reconstruct another's input)

Continuation

AI-to-AI Components (AI-x): The following component designators reference the Continuation autonomous agent layer as depicted in FIG. 11C: • AI-1: Agent Attestation (attestation token generation including transaction identifier, policy hash, nonce, signature) • AI-2: Budget Registry (distributed budget verification including deterministic routing, atomic operations, double-spend prevention, cryptographic proof) • AI-3: Enforcement Gateway (attestation validation, deterministic score computation via P1-1, budget verification via AI-2, enforcement token generation, authorization decisions, real-time latency via parallel execution) • AI-4: Immutable Ledger (hash-linked records, tree-based batching, append-only storage, cryptographic binding hash linking attestation to enforcement) • AI-5: Closed-Loop Feedback (outcome collection, secure computation on encrypted data, policy parameter updates)

H. Relationship to Parent Application Terminology

For terms defined in the '365 patent application, the '443 patent application, and U.S. Provisional Application Nos. 63/792,381 and 63/818,574, unless otherwise specified herein, such terms retain their meanings as disclosed in the parent applications, with application to autonomous agent embodiments as appropriate.

Where this specification uses the term "Agent Qualification Score" (AQS), such term represents an autonomous agent implementation of the "Behavioral Qualification Score" (BQS) disclosed in the parent applications. AQS is a direct instantiation of BQS, applying identical mathematical coordination principles across non-human entities. The mathematical coordination framework and weighted scoring architecture apply equivalently to both human user qualification and autonomous agent qualification, with the specific feature vectors and behavioral signals adapted to the relevant entity type.

The terms "pre-spend enforcement," "closed-loop feedback," "signature-based reconciliation," and "cryptographic attestation" as used herein maintain continuity with the corresponding systems disclosed in the parent applications, extended to autonomous agent operational contexts as described in the Detailed Description.

I. Interpretation Provisions

Unless otherwise specified, references to specific cryptographic algorithms (such as SHA-256 or Ed25519) represent preferred embodiments and do not limit the scope of the claims to those specific algorithms. Alternative cryptographic algorithms providing equivalent security properties may be substituted without departing from the scope of the invention.

Unless otherwise specified, references to specific numerical values (such as threshold values, timing values, or coefficient values) represent exemplary embodiments and do not limit the scope of the claims to those specific values. Such values are configurable through policy mechanisms as described herein.

Unless otherwise specified, references to specific quantities of components (such as a number of nodes, agents, or processing paths) represent exemplary embodiments. The invention encompasses implementations with varying quantities of such components as would be understood by one of ordinary skill in the art.

The terms "one or more," "at least," "comprising," and "including" are open-ended and do not exclude additional elements, features, or steps beyond those explicitly recited.

References to "deterministic" computation or output mean that for a given set of inputs and parameters, the system produces a repeatable, predictable result, distinguishing the disclosed systems from probabilistic inference models or stochastic machine learning predictions.

SECTION VII: DETAILED DESCRIPTION

System Architecture Overview

The present invention extends the advertising waste prevention architecture disclosed in the '365 patent application and the '443 patent application by introducing autonomous agent-based interaction protocols that enable programmatic entities to operate within the behavioral qualification framework without requiring direct human intervention. As illustrated in FIGS. 11A, 11B, and 11C, the system implements a three-layer architecture where Parent-1's Qualification Engine (P1-1), Budget Management System (P1-3), and Unified User Profile (P1-4) provide foundational pre-spend prevention capabilities, Parent-2's Closed-Loop Feedback Mechanism (CL-1) and Gradient Aggregation System (CL-5) enable continuous policy refinement through privacy-preserving outcome collection, and the present continuation adds Agent Attestation Framework (AI-1), Agent Credential Registry (AI-2), and Gateway Authorization Layer (AI-3) to facilitate autonomous entity participation.

The architecture maintains the pre-spend prevention paradigm established in the parent applications, wherein behavioral qualification occurs before advertising expenditure rather than after-the-fact fraud detection. In some embodiments, the system may process authorization requests with sub-100ms latency by employing atomic compare-and-swap operations for budget enforcement (P1-3) and parallel validation pathways through the Gateway Authorization Layer (AI-3). The autonomous agent extensions disclosed herein preserve the privacy-first design principles of Parent-1's Cookie-Free Attribution Engine (P1-6) and PII-Free Profile Management (P1-4) by implementing cryptographic attestation chains rather than identity-based authentication, ensuring that programmatic entities can demonstrate behavioral qualification without exposing underlying user identities or behavioral patterns to intermediary systems.

As shown in FIG. 11A, the Agent Attestation Framework (AI-1) integrates with Parent-1's Session Management System (P1-5) to extend session validation capabilities to non-human entities, while FIG. 11B illustrates how the Gateway Authorization Layer (AI-3) coordinates with Parent-2's Budget Control Mechanism (CL-2) to enforce atomic spend authorization. FIG. 11C demonstrates the end-to-end data flow wherein autonomous agents submit attestation credentials through the Gateway (AI-3), which validates those credentials against the Agent Credential Registry (AI-2), consults the Qualification Engine (P1-1) for Agent Qualification Score (AQS) computation, performs atomic budget allocation via the Budget Management System (P1-3), and returns cryptographically signed enforcement tokens that authorize specific advertising interactions within defined parameters.

Component Interactions

The autonomous agent components disclosed in the present application interact with Parent-1 and Parent-2 systems through well-defined interfaces that preserve the architectural integrity of the foundational behavioral qualification framework. The Agent Attestation Framework (AI-1) generates cryptographic attestation packages that include agent identity credentials, behavioral history summaries, and scope declarations defining the parameters of requested advertising authorization, as described in connection with FIG. 1. These attestation packages are submitted to the Gateway Authorization Layer (AI-3), which serves as the central coordination point for validating autonomous entity requests against the established qualification policies maintained in Parent-1's Qualification Engine (P1-1) and Parent-2's Policy Evolution System (CL-3).

Upon receiving an attestation package, the Gateway Authorization Layer (AI-3) performs parallel validation operations as illustrated in FIG. 2. The Gateway first queries the Agent Credential Registry (AI-2) to verify that the requesting agent possesses valid, unexpired credentials and has not been subject to enforcement actions by Parent-2's Enforcement Mechanism (CL-4). In some embodiments, this credential validation may complete in sub-10ms by employing distributed caching strategies. Concurrently, the Gateway extracts behavioral signals from the attestation package and forwards them to the Qualification Engine (P1-1) for Agent Qualification Score (AQS) computation. The AQS calculation applies the same mathematical coordination framework (C, M, E parameters) disclosed in Parent-1, adapted to evaluate autonomous agent behavioral patterns rather than direct user interactions.

Following successful credential validation and AQS computation, the Gateway Authorization Layer (AI-3) coordinates with the Budget Management System (P1-3) to perform atomic spend authorization. As shown in FIG. 3, this interaction employs compare-and-swap (CAS) primitives to ensure that budget allocation occurs atomically—either the entire requested authorization succeeds with budget decremented accordingly, or the request fails without partial state modification. This atomic operation prevents race conditions in scenarios where multiple autonomous agents simultaneously request authorization against shared budget pools. The Gateway then generates an enforcement token incorporating the approved authorization parameters, agent identifier, timestamp, and cryptographic signature enabling downstream systems to verify authorization authenticity.

The Adaptive Agent Learning System (AI-5) continuously monitors authorization patterns and outcomes to refine agent-specific qualification policies. Consistent with Parent-2's Closed-Loop Feedback Mechanism (CL-1), the system collects encrypted outcome data indicating whether authorized advertising interactions achieved intended objectives. The Adaptive Learning System aggregates these outcomes across multiple agents using privacy-preserving techniques disclosed in Parent-2's Gradient Aggregation System (CL-5), deriving policy adjustments that improve qualification accuracy without exposing individual agent behavioral patterns. These learned adjustments propagate to the Qualification Engine (P1-1) and Policy Evolution System (CL-3), creating a continuous improvement cycle wherein autonomous agent participation enhances overall system effectiveness.

Authorization Request Flow

The complete authorization flow for autonomous agent advertising interactions begins with attestation package generation and proceeds through validation, qualification, budget enforcement, and token issuance, as illustrated in the sequence diagram of FIG. 6. When an autonomous agent determines that an advertising opportunity exists requiring authorization—for example, a chatbot interface identifying a contextually relevant product recommendation moment—the agent invokes the Agent Attestation Framework (AI-1) to construct a cryptographic attestation package. This package includes the agent's credential identifier, a summary of recent behavioral patterns derived from local interaction history, the specific scope of authorization requested (such as impression count, spend ceiling, and duration), and a timestamp ensuring request freshness to prevent replay attacks.

The attestation package is transmitted to the Gateway Authorization Layer (AI-3) through secure communication channels employing the transport protocols described in connection with FIG. 6. The Gateway performs initial request validation, verifying attestation package structural integrity, cryptographic signature validity, and timestamp recency. If initial validation succeeds, the Gateway initiates parallel processing pathways to optimize authorization latency. The credential validation pathway queries the Agent Credential Registry (AI-2) to confirm that the requesting agent holds current, valid credentials and has not been subject to recent enforcement actions recorded by Parent-2's Enforcement Mechanism (CL-4). In some embodiments, distributed credential caching may enable this validation to complete in sub-5ms for frequently active agents.

Simultaneously, the behavioral qualification pathway extracts behavioral signals from the attestation package and forwards them to the Qualification Engine (P1-1) for AQS computation. The Qualification Engine applies the coordination framework disclosed in Parent-1, evaluating the autonomous agent's behavioral patterns against established qualification criteria. For example, an agent with consistent positive outcome history may receive elevated AQS scores indicating higher trust levels, while agents demonstrating irregular patterns may receive lower scores triggering additional verification requirements. The AQS computation incorporates contextual factors such as requested authorization scope, historical performance metrics, and current system state, producing a numerical score indicating authorization appropriateness.

Upon completion of both validation pathways, the Gateway Authorization Layer (AI-3) coordinates with the Budget Management System (P1-3) to perform atomic budget allocation. The Gateway constructs a CAS operation specifying the current expected budget state, the requested decrement amount, and the new target budget state. If the CAS operation succeeds—indicating that sufficient budget existed and was successfully allocated—the Gateway generates an enforcement token. This token, as described in connection with FIG. 8, includes the authorized parameters (impression count, spend limit, duration), the agent identifier, issuance timestamp, expiration timestamp, and a cryptographic signature enabling downstream verification. The enforcement token is returned to the requesting agent, which may then present it to advertising execution systems to activate authorized interactions. If any validation pathway fails or budget allocation cannot be completed, the Gateway returns a failure response with diagnostic information indicating the specific rejection reason, enabling agents to adjust subsequent requests appropriately.

Closed-Loop Feedback Operation

The closed-loop feedback mechanisms disclosed in Parent Application No. 2 extend to autonomous agent interactions through integration between the Adaptive Agent Learning System (AI-5) and Parent-2's Closed-Loop Feedback Mechanism (CL-1). Following execution of advertising interactions authorized through the process previously described above, autonomous agents report outcome data back to the system through secure feedback channels illustrated in FIG. 5. These outcome reports include encrypted metrics indicating whether authorized interactions achieved defined objectives—such as user engagement, conversion events, or other success criteria—without exposing granular behavioral details or personally identifiable information consistent with Parent-1's privacy-first architecture.

The Closed-Loop Feedback Mechanism (CL-1) aggregates encrypted outcome data across multiple autonomous agents and advertising interactions using the privacy-preserving techniques disclosed in Parent-2's Gradient Aggregation System (CL-5). Rather than analyzing individual interaction outcomes, the system computes aggregate statistics indicating overall effectiveness patterns across agent populations. For example, the system may determine that agents operating in particular contextual domains achieve higher success rates when provided certain authorization parameters, or that specific behavioral patterns correlate with improved outcomes. These aggregate insights inform policy adjustments without requiring access to individual user data or specific agent interaction details.

The Policy Evolution System (CL-3) receives aggregated feedback insights and updates qualification policies accordingly. In some embodiments, policy updates may occur on time intervals ranging from hourly to weekly, balancing responsiveness to emerging patterns against stability requirements for consistent agent operation. Updated policies propagate to the Qualification Engine (P1-1), influencing subsequent AQS computations for future authorization requests. This creates a continuous improvement cycle wherein autonomous agent participation generates outcome data, outcome data informs policy refinement, refined policies improve qualification accuracy, and improved qualification enhances overall advertising effectiveness while reducing waste.

The Enforcement Mechanism (CL-4) disclosed in Parent-2 applies to autonomous agents that demonstrate persistent policy violations or outcome patterns indicating improper operation. When aggregate feedback indicates that a specific agent consistently fails to achieve intended outcomes despite receiving authorization, or when attestation anomalies suggest potential adversarial behavior, the Enforcement Mechanism may impose graduated consequences. These consequences range from temporary credential suspension requiring re-validation, to reduced authorization scopes limiting agent operational parameters, to complete credential revocation for agents demonstrating egregious violations. Enforcement actions are recorded in the Agent Credential Registry (AI-2), ensuring that the Gateway Authorization Layer (AI-3) accounts for enforcement history during future validation operations.

Alternative Embodiments

While the detailed description has focused on specific implementations integrating autonomous agent capabilities with the parent application architectures, numerous alternative embodiments and variations exist within the scope of the present invention. In some embodiments, the Agent Attestation Framework (AI-1) may support multiple attestation formats and cryptographic protocols, enabling heterogeneous autonomous agents employing different technical standards to participate in the behavioral qualification framework. For example, agents built on different AI platforms or employing varying cryptographic libraries may generate attestation packages using their native capabilities while maintaining compatibility with Gateway validation requirements through protocol translation layers.

Alternative Gateway Authorization Layer (AI-3) implementations may employ different architectural patterns for coordinating validation operations. Some embodiments may implement fully synchronous validation wherein credential checking, AQS computation, and budget allocation occur sequentially, prioritizing simplicity over latency optimization. Other embodiments may employ asynchronous message-passing architectures wherein validation components operate as independent microservices communicating through message queues, enabling horizontal scaling to accommodate varying authorization request volumes. Distributed Gateway deployments may position Gateway instances geographically proximate to agent populations to minimize network latency, with coordination protocols ensuring consistent budget enforcement across distributed components.

The Adaptive Agent Learning System (AI-5) may implement various machine learning approaches for deriving policy improvements from outcome feedback. Some embodiments may employ reinforcement learning techniques wherein agents receive numerical reward signals based on outcome quality, enabling agents to optimize behavioral patterns toward improved authorization likelihood. Other embodiments may implement collaborative filtering approaches identifying agent clusters with similar behavioral characteristics and applying successful patterns from high-performing agents to similar agents demonstrating suboptimal outcomes. The specific learning algorithms and update frequencies may be configured based on deployment context, operational requirements, and available computational resources.

Alternative deployment scenarios may integrate the disclosed autonomous agent capabilities with existing advertising technology infrastructure in varying configurations. Some deployments may position the Gateway Authorization Layer (AI-3) as a centralized service accessible to multiple independent agent populations, enabling cross-agent learning and shared qualification policies. Other deployments may implement distributed, organization-specific Gateway instances maintaining isolated agent populations with independent policies. Hybrid architectures may employ federated learning techniques wherein individual Gateway instances maintain local policies while contributing to collaborative model improvement through privacy-preserving gradient sharing consistent with Parent-2's Gradient Aggregation System (CL-5).

These and other variations, modifications, and alternative embodiments will be apparent to those skilled in the art without departing from the spirit and scope of the present invention as defined by the appended claims.

Architectural Benefits

Security Architecture

The security architecture of the present invention builds upon the foundational security mechanisms disclosed in Parent-1's Session Management System (P1-5) and Parent-2's Enforcement Mechanism (CL-4) by introducing cryptographic attestation protocols specifically designed for autonomous agent interactions. The Agent Attestation Framework (AI-1) employs multi-layer cryptographic verification wherein each attestation package includes digital signatures binding agent credentials to behavioral summaries and requested authorization scopes. This cryptographic binding prevents attestation package tampering or replay attacks, as any modification to the package content invalidates the digital signature, causing the Gateway Authorization Layer (AI-3) to reject the request during initial validation as described in connection with FIG. 6.

The enforcement token generation process previously described above provides end-to-end authorization security through cryptographically signed tokens that downstream advertising execution systems can independently verify without requiring real-time communication with the Gateway. In some embodiments, enforcement tokens may employ asymmetric cryptography wherein the Gateway signs tokens using a private key and execution systems verify signatures using the corresponding public key, enabling distributed verification without exposing signing capabilities. The token structure includes tamper-evident fields such as agent identifier, authorization parameters, issuance timestamp, and expiration timestamp, ensuring that any attempted modification renders the token cryptographically invalid.

The system resists common attack vectors through architectural design choices that eliminate single points of failure. The Agent Credential Registry (AI-2) maintains cryptographic credential revocation lists enabling rapid invalidation of compromised credentials across distributed Gateway deployments. The atomic budget enforcement mechanisms disclosed in Parent-1's Budget Management System (P1-3) prevent double-spend attacks wherein adversarial agents attempt to obtain multiple authorizations against the same budget allocation. The parallel validation pathways previously described above ensure that credential verification, behavioral qualification, and budget allocation all succeed atomically, preventing partial authorization states that could be exploited through timing attacks or race conditions.

The privacy-preserving feedback mechanisms inherited from Parent-2's Gradient Aggregation System (CL-5) provide security against inference attacks that might attempt to deduce individual agent behavioral patterns from aggregate policy updates. By collecting encrypted outcome data and performing aggregation operations on encrypted values, the system prevents unauthorized parties from accessing granular interaction details even if they compromise feedback transmission channels. This architectural approach ensures that security properties hold across the complete authorization lifecycle from initial attestation through outcome collection and policy evolution.

Performance Characteristics

The performance architecture achieves low-latency authorization processing through parallel execution strategies and optimized data structures that minimize computational overhead while maintaining strict correctness guarantees. As previously described above, the Gateway Authorization Layer (AI-3) initiates credential validation and behavioral qualification concurrently upon receiving an attestation package, enabling these independent validation operations to proceed simultaneously rather than sequentially. In some embodiments, this parallelization may reduce total authorization latency to sub-100ms by overlapping credential registry queries with qualification engine computations, effectively hiding validation latency behind parallel execution.

The atomic compare-and-swap operations employed by the Budget Management System (P1-3) provide efficient budget enforcement without requiring distributed locking mechanisms that would introduce coordination overhead. As illustrated in FIG. 3, the CAS primitive enables the Gateway to attempt budget allocation optimistically, succeeding immediately if no concurrent operations conflict or retrying with exponential backoff if contention occurs. In some embodiments, this optimistic concurrency approach may achieve budget allocation latencies of sub-10ms under normal operating conditions, scaling effectively to support thousands of concurrent authorization requests across distributed Gateway deployments.

Credential validation performance benefits from distributed caching strategies wherein the Agent Credential Registry (AI-2) replicates frequently accessed credential data across multiple cache tiers positioned proximate to Gateway instances. In some embodiments, cache hit rates may exceed 95% for actively operating agents, enabling credential validation to complete in sub-5ms by serving requests from local cache rather than querying centralized credential storage. The cache invalidation protocols ensure that credential revocations propagate rapidly across distributed deployments, maintaining security properties while preserving performance under high request volumes.

The Qualification Engine (P1-1) achieves efficient AQS computation by employing the coordination framework mathematical structure disclosed in Parent-1, wherein behavioral signals map to numerical parameters (C, M, E) enabling qualification scores to be computed through arithmetic operations rather than complex inference procedures. This mathematical efficiency enables the system to evaluate hundreds of behavioral signals and produce qualification scores within single-digit millisecond timeframes. The Adaptive Agent Learning System (AI-5) performs policy refinement operations asynchronously from the authorization request path, ensuring that learning overhead does not impact authorization latency even as the system continuously improves qualification accuracy through outcome feedback integration.

Privacy-Preserving Design

The privacy architecture extends Parent-1's Cookie-Free Attribution Engine (P1-6) and PII-Free Profile Management (P1-4) principles to autonomous agent interactions by ensuring that behavioral qualification occurs without requiring collection, storage, or transmission of personally identifiable information at any system layer. The Agent Attestation Framework (AI-1) enables autonomous agents to generate attestation packages containing behavioral summaries derived from local interaction histories without exposing underlying user identities to the Gateway Authorization Layer (AI-3) or any intermediary systems. This architectural separation ensures that even if Gateway systems were compromised, attackers would gain access only to aggregate behavioral patterns rather than individual user data.

The cryptographic attestation protocols previously described above employ zero-knowledge proof techniques wherein agents can demonstrate possession of valid credentials and conformance to behavioral qualification criteria without revealing the specific credential values or detailed behavioral patterns. In some embodiments, the attestation package may include cryptographic commitments to behavioral metrics that the Gateway can verify without learning the underlying values, preserving agent privacy while enabling qualification assessment. This approach maintains the privacy-first principles established in Parent-1 while extending them to autonomous agent operational contexts where traditional identity-based authentication would create privacy vulnerabilities.

The closed-loop feedback mechanisms previously described above employ the privacy-preserving aggregation techniques disclosed in Parent-2's Gradient Aggregation System (CL-5) to collect outcome data without exposing individual interaction details. Autonomous agents encrypt outcome reports using homomorphic encryption schemes that enable arithmetic operations on encrypted values, allowing the system to compute aggregate statistics across multiple agents without decrypting individual reports. In some embodiments, differential privacy techniques may add calibrated noise to aggregated outcomes, providing mathematical guarantees that individual agent outcome patterns cannot be inferred from published aggregate statistics even by adversaries with access to multiple policy update cycles.

The enforcement token structure previously described above maintains privacy by including only the minimum information necessary for authorization verification—agent identifier, authorization parameters, and cryptographic signatures—without embedding user identities, behavioral details, or other sensitive data. Downstream advertising execution systems can verify token authenticity and extract authorization parameters without gaining access to the behavioral qualification reasoning or user profiles that informed the authorization decision. This privacy-preserving token design enables the system to operate across organizational boundaries and third-party advertising infrastructure while maintaining strict user privacy protections throughout the advertising delivery chain.

Scalability Properties

The distributed architecture enables horizontal scalability through stateless Gateway deployments and partitioned data structures that eliminate coordination bottlenecks as system load increases. The Gateway Authorization Layer (AI-3) operates as a stateless service wherein each authorization request contains complete information necessary for validation, enabling requests to be distributed arbitrarily across multiple Gateway instances without requiring session affinity or shared state. In some embodiments, load balancing mechanisms may distribute incoming attestation packages across geographically distributed Gateway deployments based on agent location, network proximity, or current instance load, achieving linear scalability as Gateway capacity is added to accommodate growing authorization request volumes.

The Agent Credential Registry (AI-2) employs partitioning strategies wherein credential data distributes across multiple storage nodes based on credential identifier hashing, enabling credential lookups to be directed to specific nodes without requiring full registry scans. In some embodiments, the registry may implement consistent hashing schemes that enable storage capacity to scale dynamically as new nodes are added or removed without requiring complete data redistribution. The distributed caching layers previously described above further enhance scalability by serving the majority of credential validation requests from local cache without imposing load on centralized credential storage.

The Budget Management System (P1-3) supports scalable budget enforcement through hierarchical budget allocation wherein global budget pools decompose into regional or organizational sub-allocations, enabling budget operations to be processed locally within distributed Gateway deployments without requiring global coordination for every authorization request. In some embodiments, the system may employ periodic budget reconciliation protocols wherein local Gateway instances periodically synchronize budget state with centralized tracking systems, balancing consistency requirements against operational scalability. The atomic CAS operations prevent budget over-allocation even in distributed deployments by ensuring that each budget decrement operation succeeds or fails atomically based on current budget state.

The Adaptive Agent Learning System (AI-5) scales policy refinement operations independently from authorization processing through asynchronous learning pipelines that aggregate outcome feedback in batch processing cycles. In some embodiments, the system may employ distributed learning architectures consistent with Parent-2's federated learning approaches wherein multiple learning instances process outcome subsets in parallel, deriving local policy improvements that are subsequently aggregated into global policy updates. This distributed learning architecture enables the system to incorporate outcome feedback from millions of advertising interactions without creating computational bottlenecks that would constrain authorization throughput or latency.

Auditability and Compliance

The cryptographic verification trails maintained throughout the authorization lifecycle provide comprehensive auditability supporting regulatory compliance requirements and operational transparency. Each authorization request generates an immutable audit record including the agent identifier, attestation package cryptographic hash, credential validation results, computed AQS value, budget allocation decision, and enforcement token signature. In some embodiments, these audit records may be stored in append-only ledgers or distributed ledger technologies, ensuring that authorization histories cannot be retroactively modified without cryptographic evidence of tampering. This audit trail enables organizations to demonstrate compliance with advertising regulations, verify that authorization decisions followed established policies, and investigate anomalous patterns or suspected policy violations.

The enforcement token structure previously described above provides verifiable authorization chains wherein each token cryptographically binds to the authorization decision that generated it, creating tamper-evident records of approved advertising interactions. Downstream advertising execution systems that receive enforcement tokens can independently verify token authenticity through signature validation, enabling decentralized verification without requiring real-time communication with central authorization services. In some embodiments, token verification logs maintained by execution systems may be aggregated with Gateway authorization logs to create complete end-to-end audit trails spanning from initial authorization request through final advertising delivery.

The Policy Evolution System (CL-3) maintains versioned policy histories wherein each policy update includes metadata documenting the aggregated outcome data that informed the update, the specific policy parameters modified, and cryptographic signatures establishing policy provenance. In some embodiments, organizations may implement policy approval workflows wherein proposed policy updates require cryptographic signatures from designated administrators before propagating to production Qualification Engines, creating auditable records of policy governance and change management processes. This versioned policy history enables organizations to correlate authorization patterns with specific policy versions, supporting retrospective analysis and regulatory inquiries about authorization decision rationale.

The privacy-preserving aggregation mechanisms previously described above maintain auditability while protecting individual privacy through cryptographic techniques that enable verification of aggregate computations without exposing underlying individual data. In some embodiments, the system may generate zero-knowledge proofs demonstrating that published aggregate statistics were correctly computed from encrypted individual outcome reports, enabling external auditors to verify aggregation correctness without accessing sensitive data. This cryptographically verifiable aggregation ensures that organizations can demonstrate compliance with privacy regulations while maintaining transparent audit trails for advertising effectiveness measurements and policy evolution processes.

The Enforcement Mechanism (CL-4) maintains comprehensive enforcement action records documenting credential suspensions, authorization scope reductions, and credential revocations imposed on agents demonstrating policy violations or consistently poor outcomes. These enforcement records include timestamps, violation descriptions, and authorized administrator signatures, creating auditable documentation of enforcement decisions. In some embodiments, enforcement actions may require multi-party approval wherein multiple administrators must cryptographically sign enforcement proposals before they take effect, preventing unilateral enforcement decisions and ensuring that credential revocations follow established governance processes. This enforcement audit trail enables organizations to demonstrate that agents are held accountable for outcomes and that enforcement actions follow consistent, documented policies rather than arbitrary decisions.

Conclusion

The foregoing detailed description has disclosed systems and methods for enabling autonomous agent participation in behavioral qualification frameworks for advertising waste prevention. By introducing cryptographic attestation protocols, agent credential registries, and gateway authorization layers that extend the foundational architectures disclosed in the ’365 and ’443 patent applications, the present invention enables programmatic entities to operate within pre-spend behavioral qualification systems without requiring direct human intervention while maintaining the privacy-first, cookie-free architectural principles established in the parent applications.

The disclosed Agent Attestation Framework (AI-1), Agent Credential Registry (AI-2), Gateway Authorization Layer (AI-3), Enforcement Token Generation System (AI-4), and Adaptive Agent Learning System (AI-5) provide comprehensive infrastructure for autonomous agent authorization, validation, and continuous improvement through closed-loop feedback mechanisms. These components integrate seamlessly with Parent-1’s Qualification Engine (P1-1), Budget Management System (P1-3), and Unified User Profile (P1-4), as well as Parent-2’s Closed-Loop Feedback Mechanism (CL-1), Policy Evolution System (CL-3), Enforcement Mechanism (CL-4), and Gradient Aggregation System (CL-5), creating a unified behavioral qualification architecture spanning human user interactions and autonomous agent operations.

While specific embodiments have been described in detail to illustrate the invention, those skilled in the art will recognize that numerous modifications, variations, and alternative implementations are possible without departing from the fundamental principles disclosed herein. The specific cryptographic protocols, data structures, performance characteristics, and deployment architectures described represent exemplary implementations rather than limitations on the invention scope. Various combinations and permutations of the disclosed components may be employed to achieve behavioral qualification objectives across different operational contexts, deployment scales, and integration requirements.

The scope of the present invention is defined by the appended claims and their legal equivalents, rather than by the specific examples and embodiments described in this specification. All references to parent applications, figures, and specific component implementations are provided for illustrative purposes to enable those skilled in the art to practice the invention, and should not be construed as limiting the invention to the precise forms disclosed.

What is claimed is:

1. A system for autonomous-agent transaction authorization, comprising:

a plurality of autonomous artificial-intelligence agents executing on processors, each configured to generate, for a pending commercial transaction, a cryptographically bound agent-attestation token that includes a transaction identifier, a policy reference, and a digital signature derived from a transaction-specific ephemeral key, wherein said agent attestation token is bound to a commercial-entity credential, is generated independently of hardware-root or trusted-execution attestation mechanisms and operates independently of hardware-root or trusted-execution attestation mechanisms, wherein said agent attestation token attests to agent behavioral qualification rather than software code integrity;

an enforcement gateway including processor-executable modules configured to:

validate attestation tokens against an agent-registry, compute an agent-qualification score as a weighted function of stored feature vectors whose weighting parameters are referenced by a policy-version hash, and verify that an associated budget allocation remains unspent and within authorized limits, each verification recorded as a cryptographically verifiable budget state; and a decision-orchestration module configured to aggregate validation outputs and generate a pre-spend enforcement token representing an authorization outcome selected from any one of: authorize, deny, or throttle, wherein said decision-orchestration module is a module of said enforcement gateway.

2. The system of claim 1, further comprising an immutable-ledger module configured to record said authorization outcome in a tamper-evident, hash-linked data structure that provides cryptographic proof of each decision without disclosing transaction content, said immutable-ledger module implementing append-only semantics and cryptographic sealing; wherein each authorization outcome is cryptographically proven by generating any one of: a hash digest or digital signature over a decision record prior to ledger insertion.

3. The system of claim 1, further comprising a closed-loop feedback module configured to receive outcome data from participating agents and update qualification-policy parameters through any one of: secure multi-party computation, equivalent encryption of local updates prior to aggregation, by said decision orchestration module, thereby enabling privacy-preserving federated refinement of authorization policies, wherein said system improves computer-implemented authorization processing by performing deterministic, cryptographically verifiable pre-spend validation and local enforcement between autonomous agents without reliance on hardware-based trusted-execution, remote-attestation services, or device-identity mechanisms.

4. The system of claim 1, wherein said enforcement gateway achieves authorization outcome latency of less than 50 milliseconds from attestation token receipt to enforcement token generation through parallel execution of said validation, computation, and verification operations.

5. The system of claim 1, wherein validating attestation tokens comprises constant-time cryptographic comparison operations to prevent timing side-channel attacks, wherein signature verification completes in deterministic time independent of input values.

6. The system of claim 2, wherein said hash-linked data structure comprises a Merkle tree with batched root computation, wherein each batch contains a predetermined number of authorization outcomes and generates a Merkle root anchored to said immutable ledger.

7. The system of claim 1, wherein said budget allocation verification comprises one or more of: a. querying a distributed budget registry implementing consistent hashing across multiple nodes, b. performing atomic compare-and-swap operations to reserve budget allocation, and c. recording budget reservation state with cryptographic proof prior to generating said enforcement token, thereby preventing double-spend conditions in distributed environments.

8. The system of claim 1, wherein each of said pre-spend enforcement token is cryptographically chained to its originating attestation token through nonce linkage, preventing reuse of stale or superseded attestations.

9. The system of claim 8, wherein said nonce linkage comprises one or more of: a. extracting a unique nonce value from said originating attestation token, b. incorporating said nonce value into said enforcement token structure, and c. computing a cryptographic binding hash as SHA-256 (attestation_nonce||enforcement_token_id||timestamp), wherein said enforcement token is invalid without matching said originating attestation nonce.

10. The system of claim 1, wherein computing said agent-qualification score comprises calculating an Agent Qualification Score (AQS), wherein $AQS=\Sigma(w_i \times f_i)$ for i=1 to N, wherein: a. $w_i$ are weighting coefficients retrieved using said policy-version hash as an index, b. $f_i$ are normalized feature values representing agent performance metrics, and c. N represents number of feature dimensions defined by said policy version.

11. The system of claim 9, wherein said weighting coefficients comprise: $w_1$ for historical transaction performance ($0.4 \le w_1 \le 0.6$), $w_2$ for counterparty-specific quality metrics ($0.2 \le w_2 \le 0.4$), and $w_3$ for cross-agent collaboration patterns ($0.1 \le w_3 \le 0.3$), wherein $w_1+w_2+w_3=1.0$.

12. The system of claim 3, wherein said secure multi-party computation comprises one or more of: a. each participating agent computing a local gradient $\nabla_i$ based on observed transaction outcomes, b. encrypting said local gradient using homomorphic encryption or secret sharing, c. transmitting encrypted gradients to an aggregator node, d. computing a global update $\Delta global=\Sigma(\nabla_i)/n$ where n is number of participating agents, and e. updating policy parameters as $w_i$,new=$w_i$,old+$\alpha \times \Delta$global where $\alpha$ is a learning rate, wherein individual agent transaction data remains encrypted throughout said aggregation process.

13. The system of claim 1, wherein updating qualification-policy parameters comprises one or more of: a. generating a new policy-version hash upon parameter modification, b. requiring quorum consensus of at least $\lceil n/2 \rceil+1$ cryptographic signatures from participating agents before activating said new policy version, and c. invalidating attestation tokens that reference a prior policy-version hash, thereby automatically deprecating stale authorizations without maintaining explicit revocation lists.

14. The system of claim 1, wherein each authorization outcome is cryptographically proven by generating any one of: a hash digest, a digital signature over said authorization outcome record prior to ledger insertion.

15. A computer-implemented method for autonomous-agent pre-spend authorization, comprising, executing, on at least one processor configured to perform a predefined set of basic operations in response to receiving a corresponding basic computer executable instruction selected from a predefined native instruction set of codes, steps of:

generating, by a first autonomous artificial-intelligence agent executing on one or more processors, a cryptographically bound agent-attestation token that includes a transaction identifier, a policy reference, and a digital signature derived from a transaction-specific ephemeral key, said agent attestation token being bound to a commercial-entity credential and generated independently of hardware-root or trusted-execution attestation mechanisms;

transmitting said agent-attestation token to an enforcement gateway;

executing, by said enforcement gateway, processor-implemented operations comprising: (i) validating said agent-attestation token against an agent registry, (ii) computing an agent-qualification score as a weighted function of stored feature vectors identified by a policy-version hash, and (iii) verifying that an associated budget allocation is unspent and within authorized limits; wherein said agent attestation token operates independently of hardware-root or trusted-execution attestation mechanisms, wherein said agent attestation token attests to agent behavioral qualification rather than software code integrity; and generating, by a decision-orchestration module, a pre-spend enforcement token representing an authorization outcome selected from any one of: authorize, deny, or throttle, wherein said decision-orchestration module is configured to aggregate validation outputs, wherein said decision-orchestration module is a module of said enforcement gateway.

16. The computer-implemented method of claim 15, further comprising a step of recording, in an immutable ledger, said authorization outcome in a tamper-evident, hash-linked data structure that provides cryptographic proof of each decision without disclosing transaction content, said immutable ledger implementing append-only semantics and cryptographic sealing, wherein each authorization outcome is cryptographically proven by generating any one of: a hash digest or digital signature over a decision record prior to ledger insertion.

17. The computer-implemented method of claim 15, further comprising a step of asynchronously collecting, by a closed-loop feedback module, outcome data from prior transactions and updating qualification-policy parameters through secure multi-party computation or equivalent encryption of local updates prior to aggregation, wherein updated parameters affect subsequent authorization outcomes through said policy-version hash, wherein said computer-implemented method improves computer-implemented authorization processing by performing deterministic, cryptographically verifiable pre-spend validation and closed-loop policy refinement between autonomous agents through local validation and enforcement operations without reliance on hardware-based trusted-execution, remote-attestation services, or device-identity mechanisms.

18. The computer-implemented method of claim 15, wherein each of said pre-spend enforcement token is cryptographically chained to its originating attestation token through nonce linkage, thereby preventing reuse of stale or superseded attestations, and wherein each authorization outcome is cryptographically proven by generating a hash digest or digital signature over a decision record.

19. The computer-implemented method of claim 18, wherein said nonce linkage comprises one or more of: extracting a nonce value from said originating attestation token generated by said first autonomous artificial-intelligence agent, embedding said extracted nonce in said pre-spend enforcement token structure, and computing a cryptographic binding as SHA-256 (attestation_nonce||enforcement_token_id||timestamp), wherein said enforcement token is invalid without matching said originating attestation nonce.

20. The computer-implemented method of claim 15, wherein executing said processor-implemented operations by said enforcement gateway comprises performing attestation-validation, qualification-scoring, and budget-verification operations in any one of: parallel, partially parallel execution paths, thereby reducing authorization latency relative to sequential evaluation.

21. The computer-implemented method of claim 15, wherein validating said agent-attestation token comprises performing Ed25519 signature verification using constant-time cryptographic comparison operations that complete in deterministic time independent of input values to prevent timing side-channel attacks.

22. The computer-implemented method of claim 15, wherein said budget allocation verification comprises one or more of: querying a distributed budget registry using consistent hashing for node selection, performing atomic compare-and-swap operations to reserve said budget allocation, and generating a cryptographic budget-verification record, thereby preventing double-spend conditions in distributed environments.

23. The computer-implemented method of claim 16, wherein said authorization outcome recording in said immutable ledger comprises one or more of: a. generating a decision record containing decision id, agent_id, timestamp, and authorization_outcome, b. computing a record hash as SHA-256(previous_record_hash||current_decision_record), c. appending said decision record and record hash to said immutable ledger, and d. updating a Merkle tree root for batched integrity verification.

24. The computer-implemented method of claim 15, wherein computing said agent-qualification score comprises calculating $AQS=\Sigma(w_i \times f_i)$ for i=1 to N, where: $w_i$ are weighting coefficients retrieved using said policy-version hash, $f_i$ are normalized feature values representing agent performance metrics, and N is said number of feature dimensions defined by said current policy version.

25. The computer-implemented method of claim 15, wherein said updating of qualification-policy parameters comprises one or more of: a. computing local performance gradients for each participating agent, b. encrypting local gradients using homomorphic encryption or secret sharing, c. aggregating encrypted gradients to compute a global update, and d. updating policy parameters as $w_i$,new=$w_i$, old+$\alpha\times\Delta$global where $\alpha$ is a learning rate, wherein individual agent transaction data remains encrypted throughout said aggregation process.

26. The computer-implemented method of claim 15, wherein said updating parameters further comprises one or more of: generating a new policy-version hash upon parameter modification, requiring quorum consensus of at least $\lceil n/2 \rceil+1$ agent signatures before activating said new policy version, and invalidating attestation tokens referencing said prior policy-version hash, thereby automatically deprecating stale authorizations without explicit revocation lists.

27. The computer-implemented method of claim 15, wherein transmitting said attestation token comprises one or more of: a. establishing an authenticated, encrypted communication channel using TLS 1.3 or higher, b. performing mutual authentication with X.509 certificates, and c. embedding said attestation nonce and policy-version hash within said TLS 1.3 session transcript during said handshake, thereby cryptographically binding transport-layer security to transaction-layer authorization and preventing token substitution attacks.

28. A computer program product comprising a non-transitory computer readable medium having computer executable instructions stored therein for operation of an autonomous-agent pre-spend authorization system comprising executing, on at least one processor configured to perform a predefined set of basic operations in response to receiving a corresponding basic computer executable instruction selected from a predefined native instruction set of codes, computer readable program code for:

generating, by a first autonomous artificial-intelligence agent executing on one or more processors, a cryptographically bound agent-attestation token that includes a transaction identifier, a policy reference, and a digital signature derived from a transaction-specific ephemeral key, said agent attestation token being bound to a commercial-entity credential and generated independently of hardware-root or trusted-execution attestation mechanisms, wherein said agent attestation token operates independently of hardware-root or trusted-execution attestation mechanisms, wherein said agent attestation token attests to agent behavioral qualification rather than software code integrity;

transmitting said agent-attestation token to an enforcement gateway;

executing, by said enforcement gateway, processor-implemented operations comprising: (i) validating said agent-attestation token against an agent registry, (ii) computing an agent-qualification score as a weighted function of stored feature vectors identified by a policy-version hash, and (iii) verifying that an associated budget allocation is unspent and within authorized limits; wherein said agent attestation token operates independently of hardware-root or trusted-execution attestation mechanisms, wherein said token attests to agent behavioral qualification rather than software code integrity; and generating, by a decision-orchestration module, a pre-spend enforcement token representing an authorization outcome selected from any one of: authorize, deny, or throttle, wherein said decision-orchestration module is configured to aggregate validation outputs, wherein said decision-orchestration module is a module of said enforcement gateway.

29. The computer program product of claim 28, further comprising computer readable program code for recording, in an immutable ledger, said authorization outcome in a tamper-evident, hash-linked data structure that provides cryptographic proof of each decision without disclosing transaction content, said immutable ledger implementing append-only semantics and cryptographic sealing; wherein each authorization outcome is cryptographically proven by generating any one of: a hash digest or digital signature over said decision record prior to ledger insertion.

30. The computer program product of claim 28, further comprising computer readable program code for asynchronously collecting, by a closed-loop feedback module, outcome data from prior transactions and updating qualification-policy parameters through secure multi-party computation or equivalent encryption of local updates prior to aggregation, wherein updated parameters affect subsequent authorization outcomes through said policy-version hash, wherein said computer readable program code, as executed, improves authorization processing by performing deterministic, cryptographically verifiable pre-spend validation and closed-loop policy refinement between autonomous agents through local validation and enforcement operations without reliance on hardware-based trusted-execution, remote-attestation services, or device-identity mechanisms.

31. The computer program product of claim 28, wherein each of said enforcement token is cryptographically chained to its originating attestation token through nonce linkage, thereby preventing reuse of stale or superseded attestations, and wherein each authorization outcome is cryptographically proven by generating a hash digest or digital signature over a decision record.

32. The computer program product of claim 31, wherein said computer readable program code for nonce linkage comprises said computer readable program code for one or more of: a. extracting a nonce value from said originating attestation token generated by said first autonomous artificial-intelligence agent, embedding said extracted nonce in said pre-spend enforcement token structure, and computing a cryptographic binding as SHA-256 (attestation_nonce||enforcement_token_id||timestamp), wherein said enforcement token is invalid without matching said originating attestation nonce.

33. The computer program product of claim 28, wherein said computer readable program code for executing said processor-implemented operations by said enforcement gateway comprises computer readable program code for performing attestation-validation, qualification-scoring, and budget-verification operations in any one of: parallel, partially parallel execution paths, thereby reducing authorization latency relative to sequential evaluation.

34. The computer program product of claim 28, wherein said computer readable program code for validating said agent-attestation token comprises computer readable program code for performing Ed25519 signature verification using constant-time cryptographic comparison operations that complete in deterministic time independent of input values to prevent timing side-channel attacks.

35. The computer program product of claim 28, wherein said computer readable program code for budget allocation verification comprises said computer readable program code for one or more of: querying a distributed budget registry using consistent hashing for node selection, performing atomic compare-and-swap operations to reserve said budget allocation, and generating a cryptographic budget-verification record, thereby preventing double-spend conditions in distributed environments.

36. The computer program product of claim 29, wherein said computer readable program code for authorization outcome recording in said immutable ledger comprises computer readable program code for one or more of: a. generating a decision record containing decision_id, agent_id, timestamp, and authorization_outcome, b. computing a record hash as SHA-256(previous_record_hash||current_decision_record), c. appending said decision record and record hash to said immutable ledger, and d. updating a Merkle tree root for batched integrity verification.

37. The computer program product of claim 28, wherein said computer readable program code for computing said agent-qualification score comprises computer readable program code for calculating $AQS=\Sigma(w_i \times f_i)$ for i=1 to N, where: $w_i$ are weighting coefficients retrieved using said policy-version hash, $f_i$ are normalized feature values representing agent performance metrics, and N is said number of feature dimensions defined by said current policy version.

38. The computer program product of claim 28, wherein said computer readable program code for updating of qualification-policy parameters comprises said computer readable program code for one or more of: a. computing local performance gradients for each participating agent, b. encrypting local gradients using homomorphic encryption or secret sharing, c. aggregating encrypted gradients to compute a global update, and d. updating policy parameters as $w_i$,new=$w_i$,old+$\alpha\times\Delta$global where $\alpha$ is a learning rate, wherein individual agent transaction data remains encrypted throughout said aggregation process.

39. The computer program product of claim 28, wherein said computer readable program code for updating parameters further comprises said computer readable program code for one or more of: a. generating a new policy-version hash upon parameter modification, b. requiring quorum consensus of at least $\lceil n/2 \rceil+1$ agent signatures before activating said new policy version, and c. invalidating attestation tokens referencing said prior policy-version hash, thereby automatically deprecating stale authorizations without explicit revocation lists.

40. The computer program product of claim 28, wherein said computer readable program code for transmitting said attestation token comprises computer readable program code for one or more of: a. establishing an authenticated, encrypted communication channel using TLS 1.3 or higher, b. performing mutual authentication with X.509 certificates, and c. embedding said attestation nonce and policy-version hash within said TLS 1.3 session transcript during said handshake, thereby cryptographically binding transport-layer security to transaction-layer authorization and preventing token substitution attacks.

41. The computer program product of claim 28, wherein said non-transitory computer-readable medium comprises one or more of: solid-state storage devices, magnetic storage devices, or optical storage devices, wherein said computer readable code are executable on processors comprising one or more of x86 architectures, ARM architectures, or RISC-V architectures.

* * * * *